US012583120B2

(12) United States Patent
Kimura et al.

(10) Patent No.:  US 12,583,120 B2
(45) Date of Patent:  Mar. 24, 2026

(54) MANAGEMENT SERVER, REMOTE OPERATION SYSTEM, REMOTE OPERATION METHOD, AND STORAGE MEDIUM

(71) Applicant: Honda Motor Co., Ltd., Tokyo (JP)

(72) Inventors: Yuta Kimura, Saitama (JP); Tomohiro Kawakami, Saitama (JP); Takahide Yoshiike, Saitama (JP); Kenichiro Sugiyama, Saitama (JP); Masaaki Muromachi, Saitama (JP); Yoichi Taniguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 334 days.

(21) Appl. No.: 17/720,271

(22) Filed: Apr. 13, 2022

(65) Prior Publication Data

US 2022/0331967 A1      Oct. 20, 2022

(30) Foreign Application Priority Data

Apr. 15, 2021    (JP) ................................. 2021-069233
Apr. 15, 2021    (JP) ................................. 2021-069234
Apr. 15, 2021    (JP) ................................. 2021-069235

(51) Int. Cl.
B25J 9/16              (2006.01)
(52) U.S. Cl.
CPC ................................... B25J 9/1689 (2013.01)
(58) Field of Classification Search
CPC ... B25J 9/1689; B25J 9/16; B25J 13/00; B25J 9/1602; B25J 9/1628; B25J 9/163;
(Continued)

(56) References Cited

U.S. PATENT DOCUMENTS 11,541,546 B2    1/2023  Fernando et al.
11,850,758 B2 *  12/2023  Hashimoto ............ B25J 9/1682
(Continued)

FOREIGN PATENT DOCUMENTS

CN        105959618        9/2016
CN        107430738        12/2017
(Continued)

OTHER PUBLICATIONS

"Office Action of China Counterpart Application", issued on Apr. 29, 2023, with English translation thereof, pp. 1-51.
(Continued)

*Primary Examiner* — Esvinder Singh
(74) *Attorney, Agent, or Firm* — JCIPRNET

(57)                    ABSTRACT

A management server according to an embodiment includes a communication part, an acquisition part, an intention estimation part, and a motion control part. The communication part communicates with one or more robot devices and one or more operation terminals that remotely operate at least one of the one or more robot devices via a network. The acquisition part acquires an operation content inputted by the operation terminal. The intention estimation part estimates an intention of an operator of the operation terminal based on the operation content acquired by the acquisition part. The motion control part controls a motion of the robot device based on an intention result estimated by the intention estimation part.

9 Claims, 27 Drawing Sheets

(58) Field of Classification Search
CPC ................. B25J 9/1661; B25J 9/1697; G05B
2219/40122; G05B 2219/40146; G05B
2219/35414; G05B 2219/40123; G05B
2219/40161; G05B 2219/40169; G05B
2219/40176; G05B 2219/40174; G05B
2219/40183; G05B 2219/40184; H04L
67/125
See application file for complete search history.

(56) References Cited

U.S. PATENT DOCUMENTS

| | | | |
|---|---|---|---|
| 2013/0218336 A1 | 8/2013 | David et al. | |
| 2015/0100461 A1* | 4/2015 | Baryakar | G06Q 30/0601 |
| | | | 901/1 |
| 2015/0224647 A1 | 8/2015 | Dumora et al. | |
| 2018/0373852 A1* | 12/2018 | Tsubota | G05D 1/0055 |
| 2019/0359424 A1* | 11/2019 | Avraham | G06Q 10/08 |
| 2020/0016767 A1* | 1/2020 | Song | B25J 13/06 |
| 2020/0078950 A1 | 3/2020 | Fernando et al. | |
| 2020/0234160 A1 | 7/2020 | Naim et al. | |
| 2021/0001487 A1* | 1/2021 | Ohtsuka | B25J 9/1689 |
| 2021/0002860 A1 | 1/2021 | Otani et al. | |
| 2021/0046655 A1* | 2/2021 | Deyle | B25J 9/1664 |
| 2021/0072759 A1* | 3/2021 | Baek | G05D 1/0214 |
| 2021/0178581 A1* | 6/2021 | Yamamoto | G06V 20/20 |
| 2021/0220990 A1* | 7/2021 | Hasunuma | B25J 9/1664 |
| 2021/0373576 A1* | 12/2021 | Sohn | B25J 9/1669 |
| 2022/0297300 A1* | 9/2022 | Hashiguchi | B25J 9/1697 |
| 2022/0297303 A1* | 9/2022 | Khansari Zadeh | B25J 13/06 |
| 2023/0053995 A1* | 2/2023 | Yahata | H04M 11/00 |
| 2023/0390937 A1* | 12/2023 | Fukabori | B25J 9/1689 |

FOREIGN PATENT DOCUMENTS

| | | |
|---|---|---|
| CN | 110442232 | 11/2019 |
| CN | 110678300 | 1/2020 |
| CN | 111837382 | 10/2020 |
| CN | 112187845 | 1/2021 |
| JP | H10171337 | 6/1998 |
| JP | 2000244886 | 9/2000 |
| JP | 2003092749 | 3/2003 |
| JP | 2011152593 | 8/2011 |
| JP | 2013521137 | 6/2013 |
| JP | 6007377 | 10/2016 |
| JP | 2019168971 | 10/2019 |
| JP | 2020214232 | * 12/2020 |
| JP | 2021013159 | 2/2021 |
| WO | 2020189143 | 9/2020 |

OTHER PUBLICATIONS

Thomas Feix et al., "The GRASP Taxonomy of Human Grasp Types", IEEE Transactions On Human-Machine Systems, Feb. 2016, pp. 66-77.
"Office Action of Japan Counterpart Application", issued on Jul. 16, 2024, with English translation thereof, pp. 1-8.
"Notice of Reasons for Refusal of Japan Counterpart Application", issued on Aug. 6, 2024, with English translation thereof, p. 1-p. 15.

* cited by examiner

174

| Operation content | Estimated intention | ... |
|---|---|---|
| Turn visual line to object and move arm | Grip object present in visual line direction | ... |
| Change visual line direction while holding object | Move object along visual line direction | ... |
| ... | ... | ... |

Each company

| Authentication information | | | Name | Authority | Priority | Image information | ... |
|---|---|---|---|---|---|---|---|
| User ID | Password | ... | | | | | |
| 0001 | * * * | ... | A | * * * | 1 | * * * | ... |
| 0002 | * * * | ... | B | * * * | 2 | * * * | ... |
| ... | ... | ... | ... | ... | ... | ... | ... |

Each company

| Robot ID | Date/time | Operator ID | Operation parts | Sensor information | ... |
|---|---|---|---|---|---|
| 0001 | * * * | * * * | Arm | * * * | ... |
| 0002 | * * * | * * * | Leg | * * * | ... |
| ... | ... | ... | ... | ... | ... |

| Authentication information | | | Name | Authority | Priority | Image information | ... |
|---|---|---|---|---|---|---|---|
| User ID | Password | ... | | | | | |
| 0001 | * * * | ... | A | * * * | 1 | * * * | ... |
| 0002 | * * * | ... | B | * * * | 2 | * * * | ... |
| ... | ... | ... | ... | ... | ... | ... | ... |

| Robot ID | Date/time | Operator ID | Operation parts | Sensor information | ... |
|---|---|---|---|---|---|
| 0001 | * * * | * * * | Arm | * * * | ... |
| 0002 | * * * | * * * | Leg | * * * | ... |
| ... | ... | ... | ... | ... | ... |

| User ID | Date/time | Seat information | Robot ID | Parts information | ... |
|---|---|---|---|---|---|
| 0001 | * * * | * * * | * * * | * * * | ... |
| 0002 | * * * | * * * | – | – | ... |
| ... | ... | ... | ... | ... | ... |

MANAGEMENT SERVER, REMOTE OPERATION SYSTEM, REMOTE OPERATION METHOD, AND STORAGE MEDIUM

CROSS-REFERENCE TO RELATED APPLICATION

This application claims the priority benefit of Japan application serial no. 2021-069233, filed on Apr. 15, 2021, Japan application serial no. 2021-069234, filed on Apr. 15, 2021, and Japan application serial no. 2021-069235, filed on Apr. 15, 2021. The entirety of the above-mentioned patent applications is hereby incorporated by reference herein and made a part of this specification.

BACKGROUND

Technical Field

The disclosure relates to a management server, a remote operation system, a remote operation method, and a storage medium.

Related Art

Conventionally, a technique has been disclosed to remotely operate a remote operation object such as a robot by using data transmitted from a monitor terminal or another terminal to operate an experimental instrument or an experimental device. For example, it has been disclosed that by switching the remote operation authority, a plurality of operators take turns to remotely operate a same robot (see, for example, Patent Document 1 (Japanese Patent Application Laid-Open No. 2003-092749)). Further, conventionally, a technique has been disclosed to arrange and display live-action images of classmates in each person's evaluation area and display seats in a visual line direction (see, for example, Patent Document 2 (Japanese Patent Application Laid-Open No. 10-171337) and Patent Document 3 (Japanese Patent No. 6007377)).

However, in conventional techniques, since there are restrictions on the content that can be instructed from the terminal device, only specific work can be performed by the robot, and there are cases where the robot cannot be appropriately operated. In addition, it has not been possible for multiple people to operate a same remote operation target and feel an operation on the same remote operation target performed by another operator. Also, during remote operation, a sense of loneliness may occur because the work is performed by one person. Further, it has not been considered to make one feel as if other people are actually present and moving during remote operation.

SUMMARY

A management server, a remote operation system, a remote operation method, and a program according to the disclosure have the following configurations.

(1): According to one aspect of the disclosure, a management server includes a communication part, an acquisition part, an intention estimation part, and a motion control part. The communication part communicates with one or more robot devices and one or more operation terminals that remotely operate at least one of the one or more robot devices via a network. The acquisition part acquires an operation content inputted by the operation terminal. The intention estimation part estimates an intention of an operator of the operation terminal based on the operation content acquired by the acquisition part. The motion control part controls a motion of the robot device based on an intention result estimated by the intention estimation part.

(2): In the aspect of (1) above, the acquisition part acquires robot control information related to a motion of the robot device and sensor information detected by a sensor provided in the robot device. The management server further includes a management part which sets different access rights to the robot control information and the sensor information acquired by the acquisition part, and is capable of acquiring any of the robot control information and the sensor information when the set access right is confirmed.

(3): In the aspect of (2) above, the management part makes a strength of the access right of the sensor information greater than a strength of the access right of the robot control information.

(4): In any one aspect of (1) to (3) above, when controlling a motion of one robot device based on operation contents acquired from a plurality of operation terminals, the motion control part generates motion control information of the robot device based on a priority of the operator who operates the operation terminal.

(5): In the aspect of (4) above, when a same or similar operation contents are acquired from the plurality of operation terminals by the acquisition part, the motion control part controls a motion of the robot device by prioritizing an operation content from an operator having a high priority.

(6): In the aspect of (4) or (5) above, the intention estimation part estimates an intention of each of operators of a plurality of operation terminals operating the one robot device. The management server further includes an output control part which outputs an intention estimation result of each of the operators estimated by the intention estimation part to each of the plurality of operation terminals.

(7): According to another aspect of the disclosure, a remote operation system includes the management server according to any one aspect of (1) to (6), the one or more robot devices, and the one or more operation terminals.

(8): According to another aspect of the disclosure, in a remote operation method, a computer communicates with one or more robot devices and one or more operation terminals which remotely operate at least one of the one or more robot devices via a network, acquires an operation content inputted by the operation terminal, estimates an intention of an operator of the operation terminal based on the acquired operation content, and controls a motion of the robot device based on an estimated intention result.

(9): According to another aspect of the disclosure, a program causes a computer to communicate with one or more robot devices and one or more operation terminals which remotely operate at least one of the one or more robot devices via a network, acquire an operation content inputted by the operation terminal, estimate an intention of an operator of the operation terminal based on the acquired operation content, and control a motion of the robot device based on an estimated intention result.

(10): According to one aspect of the disclosure, a management server includes a communication part, an acquisition part, an intention estimation part, a management part, and an output control part. The communication part communicates with one or more operation terminals via a network. The acquisition part acquires information related to an action of an operator of the operation terminal. The intention estimation part estimates an intention of the operator of the operation terminal based on the information acquired by the acquisition part. The management part manages an arrangement location of the operator in space. Based on an intention result estimated by the intention estimation part, the output control part arranges information based on information representing the operator and information related to the action to the arrangement location of the operator in space managed by the management part, and outputs the arranged information to the operation terminal.

(11): In the aspect of (10) above, the management part generates an image in which the operator selects the arrangement location, transmits the generated image to the operation terminal, and manages the arrangement location of the operator based on the arrangement location selected using the image.

(12): In the aspect of (10) or (11) above, the operation terminal includes a terminal which remotely operates one or more robot devices.

(13): In any one aspect of (10) to (12) above, the management part acquires an arrangement position of a robot device operated by the operator in a real space, and when an image including a robot device arranged at the acquired arrangement position is outputted to the operation terminal, the management part superimposes an image representing the operator on a display area of the robot device.

(14): In any one aspect of (10) to (12) above, the management part manages the arrangement location of the operator in correspondence with seat information assigned in advance in a virtual space, and when an image showing the virtual space is outputted to the operation terminal, the management part superimposes an image representing the operator in correspondence with a position of an image of a seat in the virtual space.

(15): In any one aspect of (10) to (14) above, the output control part acquires a voice of the operator, and performs sound image localization on the acquired voice to the arrangement location to output the voice.

(16): According to another aspect of the disclosure, a remote operation system includes the management server according to any one aspect of (10) to (15), the one or more operation terminals, and one or more robot devices remotely operated by the one or more operation terminals.

(17): According to another aspect of the disclosure, in a remote operation method, a computer communicates with one or more operation terminals via a network, acquires information related to an action of an operator of the operation terminal, estimates an intention of the operator of the operation terminal based on the acquired information, manages an arrangement location of the operator in space, and arranges, based on an estimated intention result, information based on information representing the operator and information related to the action to the managed arrangement location of the operator in space, and outputs the arranged information to the operation terminal.

(18): According to another aspect of the disclosure, a program causes a computer to communicate with one or more operation terminals via a network, acquire information related to an action of an operator of the operation terminal, estimate an intention of the operator of the operation terminal based on the acquired information, manage an arrangement location of the operator in space, and arrange, based on an estimated intention result, information based on information representing the operator and information related to the action to the managed arrangement location of the operator in space, and output the arranged information to the operation terminal.

(19): According to one aspect of the disclosure, a remote operation control system, in which an operator remotely operates a remote operation target that is an object of reality or a virtual object of a virtual world, includes an information acquisition part, a control information generation part, and a feedback information generation part. The information acquisition part acquires first operation information indicating an operation inputted by a first operator via a first controller that receives an operation on the remote operation target, and second operation information indicating an operation inputted by a second operator via a second controller that receives an operation on the remote operation target. The control information generation part generates control information for causing the remote operation target to move based on the first operation information and the second operation information acquired by the information acquisition part. Based on the control information, the feedback information generation part generates first feedback information that feeds back a motion content of the remote operation target to the first controller and generates second feedback information that feeds back a motion content of the remote operation target to the second controller.

(20): In the aspect of (19) above, the feedback information generation part generates the first feedback information for transmitting an operation content performed by the first operator to the second operator via the second controller based on a motion of the remote operation target executed based on the operation inputted by the first operator, and generates the second feedback information for transmitting an operation content performed by the second operator to the first operator via the first controller based on a motion of the remote operation target executed based on the operation inputted by the second operator.

(21): In the aspect of (19) or (20) above, the remote operation control system further includes a comparison image generation part which generates a comparison image that is an image data to be displayed on a first display part for the first operator or a second display part for the second operator and shows a comparison result between the operation inputted by the first operator and the operation inputted by the second operator.

(22): In any one aspect of (19) to (21) above, the control information generation part generates the control information based on a result of synthesizing a content of remote operation performed by the first operator and a content of remote operation performed by the second operator.

(23): In the aspect of (22) above, when synthesizing the content of remote operation performed by the first operator and the content of remote operation performed by the second operator, the control information generation part generates the control information in which the operation of the second operator is prioritized as compared to the first operator.

(24): In any one aspect of (19) to (23) above, the feedback information generation part generates third feedback information for transmitting a feeling or a sense obtained on a remote operation target side to the first operator via the first controller based on a detection result by a sensor mounted on the remote operation target, and generates fourth feedback information for transmitting a feeling or a sense obtained on the remote operation target side to the second operator via the second controller based on a detection result by the sensor mounted on the remote operation target.

(25): Another aspect of the disclosure provides a remote operation control method. In remote operation control in which an operator remotely operates a remote operation target that is an object of reality or a virtual object of a virtual world, a computer acquires first operation information indicating an operation inputted by a first operator via a first controller that receives an operation on the remote operation target, and second operation information indicating an operation inputted by a second operator via a second controller that receives an operation on the remote operation target, generates control information for causing the remote operation target to move based on the acquired first operation information and the acquired second operation information, and generates, based on the control information, first feedback information which feeds back a motion content of the remote operation target to the first controller, and generates second feedback information which feeds back a motion content of the remote operation target to the second controller.

(26): Another aspect of the disclosure provides a program. In remote operation control in which an operator remotely operates a remote operation target that is an object of reality or a virtual object of a virtual world, the program causes a computer to acquire first operation information indicating an operation inputted by a first operator via a first controller which receives an operation on the remote operation target, and second operation information indicating an operation inputted by a second operator via a second controller which receives an operation on the remote operation target, generate control information for causing the remote operation target to move based on the acquired first operation information and the acquired second operation information, and generate, based on the control information, first feedback information which feeds back a motion content of the remote operation target to the first controller, and generate second feedback information which feeds back a motion content of the remote operation target to the second controller.

According to the aspects of (1) to (9) above, it is possible to operate a robot more appropriately.

According to the aspects of (2) to (3) above, confidentiality of data is protected. Therefore, for example, it is possible to prevent the sensor information from being stolen or tampered by a company that does not have the access right and improve the security of the entire system. Further, by managing provided information according to the access right, various companies and the like can use the service without worry.

According to the aspects of (4) to (5) above, the robot can be appropriately operated even when it is operated by a plurality of operators.

According to the aspect of (5) above, it is possible for a plurality of operators to more accurately learn about a status of the operation performed by other operators. Therefore, it is possible to operate the robot device by inputting more appropriate operation contents.

According to the aspects of (10) to (18) above, it is possible to provide information that makes one feel as if he/she is in the work space even at the time of remote operation.

According to the aspect of (11) above, information based on information representing the operator and information related to the action can be arranged at a position in space desired by the operator.

According to the aspects of (12) and (13) above, since an image representing the operator is displayed at a position where the robot device is displayed, it is possible to prevent a sense of loneliness from occurring.

According to the aspect of (14) above, even in a work location in a virtual space, it is possible to learn about a status in the surroundings and provide information that makes one feel as if he/she is in the work space.

According to the aspect of (15) above, since the operator can hear a voice corresponding to an arrangement location, it is possible to make the operator feel more realistically as if he/she is in the work space.

According to the aspects of (19) to (26) above, it is possible to feel an operation on a same remote operation target performed by another operator.

According to the aspect of (20) above, it is possible to transmit a motion of the robot or the like executed by remote operation of one operator to another operator.

According to the aspect of (21) above, it is possible for one operator to confirm with the image his/her own erroneous operation modified by another operator and a difference between his/her own operation and the operation performed by the another operator.

According to the aspect of (22) above, the remote operation target can be caused to move according to the remote operation performed by two or more operators, and for example, a skilled person can instruct the work of a novice in real time.

According to the aspect of (23) above, compared to the remote operation performed by one operator, the remote operation performed by another operator can be reflected more closely in the motion of the remote operation target, and the remote operation of the one operator can be modified to the remote operation of the another operator.

According to the aspect (24) above, it is possible to transmit to the operator a feeling or a sense obtained when the operator actually operates an operation object rather than a remote operation using the remote operation target.

BRIEF DESCRIPTION OF THE DRAWINGS

FIG. 4 is a view for illustrating a content of intention estimation information 174.

FIG. 5 is a view for illustrating a content of company-specific user information 171A.

FIG. 6 is a view for illustrating a content of company-specific sensor information 175A.

FIG. 7 is a view for illustrating a content of user information 171.

FIG. 8 is a view for illustrating a content of sensor information 175.

FIG. 9 is a view for illustrating a content of usage status information 172.

DESCRIPTION OF THE EMBODIMENTS

Embodiments of the disclosure provide a management server, a remote operation system, a remote operation method, and a program capable of operating a robot more appropriately, feeling an operation on a same remote operation target performed by another operator, or providing information that makes one feel as if he/she is in the work space even during remote operation.

Hereinafter, embodiments of a management server, a remote operation system, a remote operation method, and a program of the disclosure will be described with reference to the drawings.

[System Configuration]

Figure 1A:
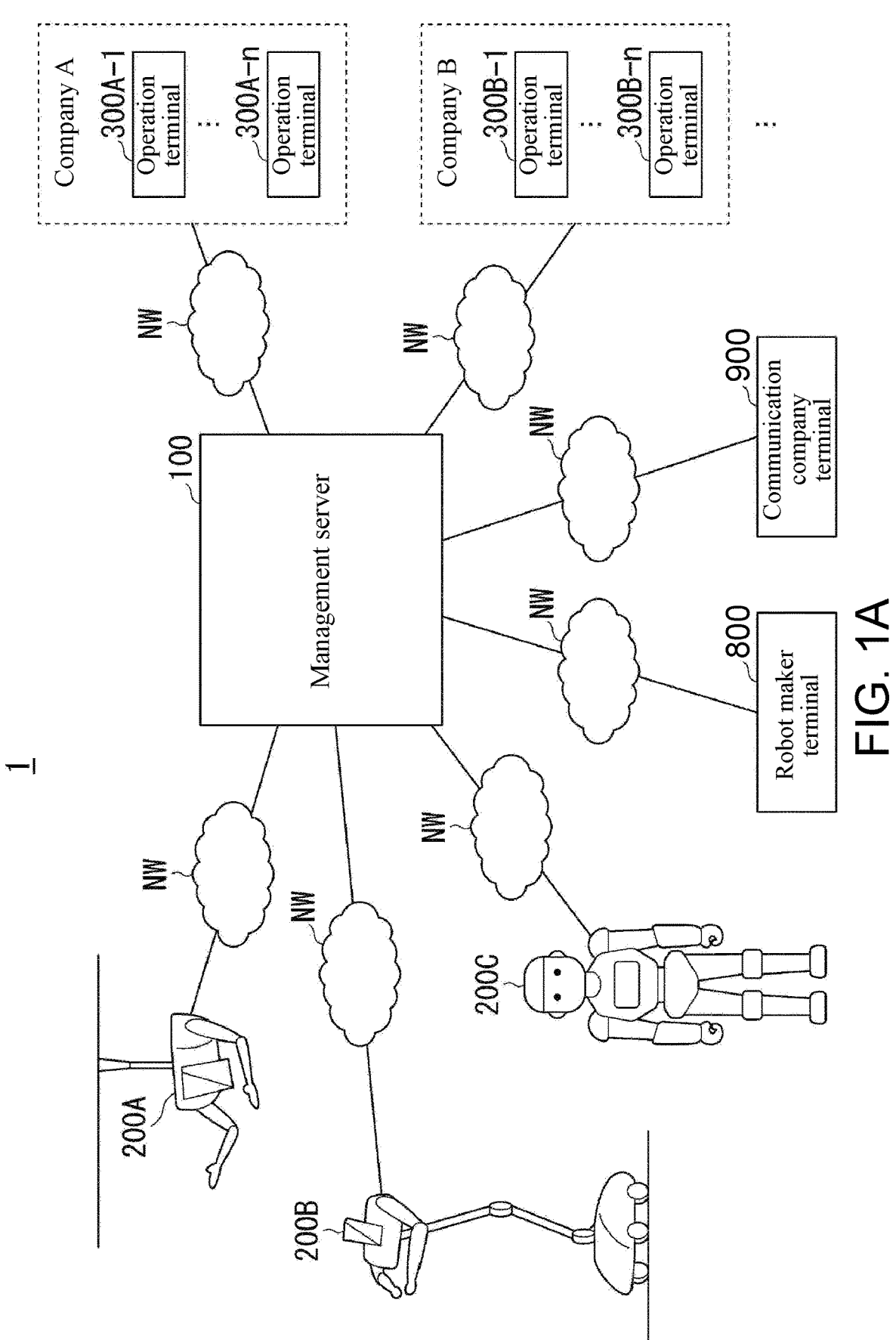
FIG. 1A and FIG. 1B are views showing examples of a configuration of a remote operation system 1 according to an embodiment.
Figure 1B:
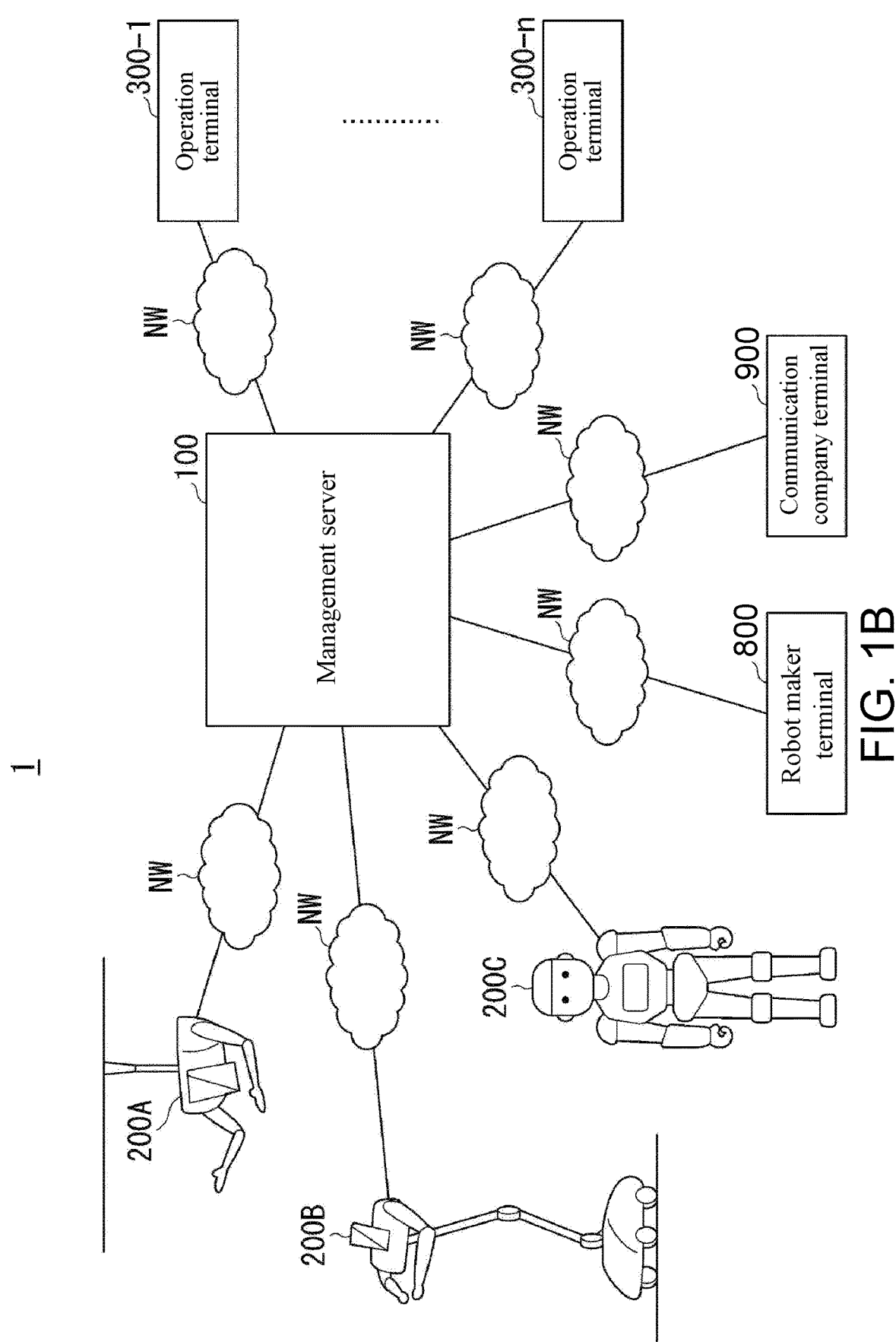

FIG. 1A and FIG. 1B are views showing examples of a configuration of a remote operation (information providing) system 1 according to an embodiment. A remote operation system 1 shown in FIG. 1A and FIG. 1B includes, for example, a management server (information providing server) 100, a robot device 200, and an operation terminal 300. Further, the management server 100 may include a robot maker terminal 800 and a communication company terminal 900 in addition to the above configuration. The management server 100 is communicably connected to the robot device 200, the operation terminal 300, the robot maker terminal 800, and the communication company terminal 900 via a network NW. The network NW includes, for example, the Internet, a cellular network, a Wi-Fi (registered trademark) network, a WAN (wide area network), a LAN (local area network), a provider device, a wireless base station, etc. In the remote operation system 1, one or more robot devices 200 and one or more operation terminals 300 may be respectively included. The example of FIG. 1A and FIG. 1B shows robot devices 200A, 200B, and 200C, but the number and types of the robot devices are not limited thereto. Further, the example of FIG. 1A shows operation terminals 300A-1 to 300A-n (n is a natural number of 2 or more) and 300B-1 to 300B-n managed respectively for a plurality of companies A and B, but the number is not limited thereto. Further, the example of FIG. 1B shows a plurality of operation terminals 300-1 to 300-*n* (n is a natural number of 2 or more). Hereinafter, when the robot device and the operation terminal are not particularly identified, they will be simply referred to as the "robot device 200" and the "operation terminal 300". The management server 100 is an example of a "server".

The management server 100 manages one or more operation terminals 300 and one or more robot devices 200 (i.e., operation targets) in correspondence with each other. In this case, the management server 100 may associate one robot device 200 for each operation terminal 300, may associate one robot device 200 with a plurality of operation terminals 300, or may associate a plurality of robot devices 200 with one operation terminal 300. Further, the management server 100 acquires an operation content inputted from the operation terminal 300 and transmits motion control information corresponding to the operation content to the robot device 200 to thereby execute remote operation of the robot device 200. Further, the management server 100 transmits information acquired by the robot device 200 to the operation terminal 300. Further, the management server 100 which serves as the management server generates information for making one feel as if he/she is in the work space (e.g., around the remotely operated robot device 200) even at the time of remote operation, and provides the generated information to the operation terminal 300.

The robot device 200 executes a predetermined motion based on control information transmitted from the management server 100 via the network NW. The robot device 200 includes, for example, a moving mechanism capable of moving by driving a wheel, a carriage, a crawler, a crane, etc. In the example of FIG. 1A and FIG. 1B, the robot device 200A is a robot having two arms and movable at least by a crane. The robot device 200B is a robot having two arms and movable by wheels provided at a lower part. The robot device 200C is a robot having two arms and movable by a bipedal walking motion. Further, the robot device 200 includes an arm part which executes a work such as gripping, moving, and operating an object. Further, the robot device 200 is provided with various sensors such as a vibration sensor, a temperature sensor, a pressure sensor, and a tactile sensor, and transmits data detected by each sensor to the management server 100 at a predetermined cycle or at a timing of receiving a request. Further, the robot device 200 may include a camera which captures images of the surroundings, a monitor which displays images, a speaker which outputs sounds, a microphone which acquires sounds of the surroundings, etc.

For example, one or more operation terminals 300 are provided for each company that uses the robot device 200. The operation terminal 300 inputs an operation content of the robot device 200 and notifies an operator of the information acquired by the robot device 200. The operation terminal 300 may operate one or more robot devices 200. Further, the operation terminal 300 may operate a part (e.g., a right arm or a left arm) of the robot device 200. Further, the operation terminal 300 may be provided with, for example, an HMD (head-mounted display), an operation device, and an environment sensor which detects a movement of the operator. The operation terminal 300 is not limited to one provided in the facility in a company, but may be a terminal provided at the operator's home, or may be a terminal provided at a telework station installed at a train station, a department store, a public facility, an Internet cafe, etc.

The robot maker terminal 800 is, for example, a terminal used by a manufacturer or a management company of the robot device 200. The robot maker terminal 800, for example, updates a version of software (program) installed in each robot device 200, acquires error information from the robot device 200, and performs remote operation, stop control, etc. of the robot device 200 based on the acquired error information.

The communication company terminal 900 is, for example, a terminal used by a communication service provider or the like that manages communication on the network NW. The communication company terminal 900 manages an amount of data communicated for remote operation, manages communication delays, and performs maintenance and the like of the communication environment in the system for the remote operation system 1. Further, the communication company terminal 900 may take measures when a failure occurs on the network NW.

Next, the functions of the management server 100, the robot device 200, and the operation terminal 300 will be specifically described.

[Management Server]

Figure 2:
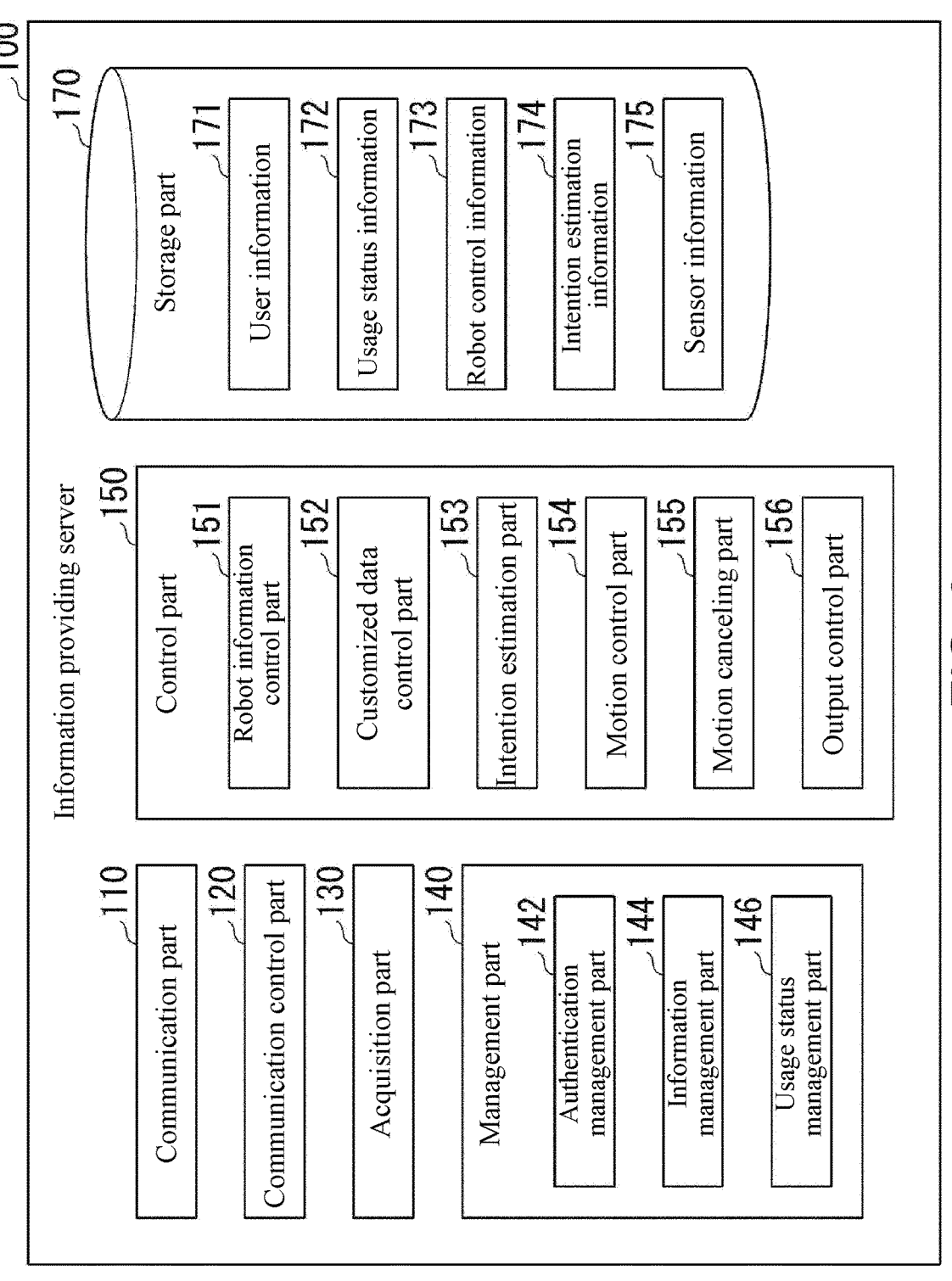
FIG. 2 is a view showing an example of a configuration of a management server 100 according to an embodiment.

FIG. 2 is a view showing an example of a configuration of the management server 100 according to an embodiment. The management server 100 includes, for example, a communication part 110, a communication control part 120, an acquisition part 130, a management part 140, a control part 150, and a storage part 170. The communication control part 120, the acquisition part 130, the management part 140, and the control part 150 are each realized by executing a program (software) by a hardware processor such as a CPU (central processing unit). A part or all of these components may be realized by hardware (circuit part; including a circuitry) such as an LSI (large scale integration), an ASIC (application specific integrated circuit), an FPGA (field-programmable gate array), a GPU (graphics processing unit), etc., or may be realized by collaboration of software and hardware. A part or all of the functions of these components may be realized by a dedicated LSI. The program may be stored in advance in a storage device (a storage device including a non-transient storage medium) such as an HDD (hard disk drive) or a flash memory included in the management server 100, or the program may be stored in a removable storage medium (non-transient storage medium) such as a DVD or a CD-ROM and installed to the HDD or the flash memory included in the management server 100 by attaching the storage medium to a drive device included in the management server 100. The management server 100 may be realized in a server device or a storage device incorporated in a cloud computing system. In this case, the function of the management server 100 may be realized by a plurality of server devices and storage devices in the cloud computing system.

According to control of the communication control part 120, the communication part 110 communicates with one or more robot devices 200, an operation terminal 300 which remotely operates the one or more robot devices 200, and other external devices via the network NW. The communication control part 120 controls the communication in the communication part 110.

The communication control part 120 controls the communication in the communication part 110. The communication control part 120, for example, receives an operation content of the robot device 200 inputted from the operation terminal 300 and transmits motion control information corresponding to the operation content to the robot device 200. Further, the communication control part 120 receives information such as detection results of sensors and camera images transmitted from the robot device 200, and transmits provided information based on the received information to the operation terminal.

The acquisition part 130 acquires various information from the robot device 200 or the operation terminal 300. For example, the acquisition part 130 acquires operation information for operating the robot device 200 from the operation terminal 300. Information related to action includes, for example, information related to the operator's action, information related to the operator's voice, etc. Further, the acquisition part 130 acquires information from the sensor or the camera provided in the robot device 200. Further, the acquisition part 130 may acquire information from an external device connected to the network NW.

The management part 140 includes, for example, an authentication management part 142, an information management part 144, and a usage status management part 146. The authentication management part 142 manages authentication and usage authority of the operator (system user) who operates the robot device 200. Further, the authentication management part 142 manages the robot device 200 operated by the operation terminal 300 in correspondence with each other based on the authentication result.

The information management part 144 manages information which may be used for each user. For example, the information management part 144 stores, to the storage part 170, robot control information for controlling the robot and information (sensor information) acquired from the sensor provided in the robot device 200, and, for example, sets different access rights and transmits information to the operation terminal 300 having corresponding providable authority when the set access right is confirmed. Further, the information management part 144 may, for example, increase a strength of the access right of the sensor information to be greater than that of the robot control information. Increasing the strength of the access right refers to, for example, storing to a storage area which cannot be accessed unless a specific authentication is permitted, or encrypting and managing data itself, and increasing the number and types of authentication conditions such as passwords for acquiring the data. Accordingly, confidentiality of the data can be protected. Therefore, for example, it is possible to prevent the sensor information from being stolen or tampered by a company that does not have the access right and improve the security of the entire system. Further, by managing provided information according to the access right, various companies and the like can use the remote operation system 1 without worry.

The usage status management part 146 manages a usage status of the remote operation system 1 of each user. For example, the usage status management part 146 manages an arrangement location in space for each user. The space refers to, for example, a work space and may be a real space or a virtual space. In the following, the description will be mainly focused on the real space. Further, the usage status management part 146 manages an arrangement position of the operator with respect to seats assigned in advance in space, and manages a usage status of information provided to the operation terminal 300.

The control part 150 includes, for example, a robot information control part 151, a customized data control part 152, an intention estimation part 153, a motion control part 154, a motion canceling part 155, and an output control part 156. The robot information control part 151, for example, manages what kind of operation the robot device 200 actually performed with respect to the motion control information generated for the robot device 200 by the motion control part 154. Further, the robot information control part 151 causes the robot device 200 to execute a basic motion based on robot control information 173 stored in the storage part 170. The basic motion refers to, for example, a motion of moving the robot device 200, changing a posture, or holding or placing an object. The control information of these basic motions is stored in the robot control information 173.

The customized data control part 152 generates, for example, a customized data for causing the robot device 200 to execute a specific motion (e.g., an object assembling work, a soldering work, screwing, various process works in cooking, etc.) for each company.

The intention estimation part 153 estimates an intention of the operator based on at least a part of the information of an operation content inputted by the operation terminal 300. The intention of the operator not only includes the intention of the action (motion) that the operator wants the robot device 200 to perform, but also includes, for example, predicting an action and assisting in driving of the robot device 200. For example, in remote operation, there is a discrepancy between a feeling instructed by the operator by communication and a motion of the robot device 200. Therefore, the intention estimation part 153 does not cause the robot device 200 to directly execute the operation content from the operator, but by estimating the intention of the operator based on the operation content and generating the motion control information of the robot device 200 based on the estimation result, it is possible to more appropriately assist in the movement of the robot device 200 and realize remote operation with less incompatibility. The intention estimation part 153, for example, refers to a learning model (intention estimation information 174) trained using teacher data, and estimates the intention corresponding to the operation content. At the time of learning, for example, the learning is performed using the teacher data for inputting an operation content and outputting correct intention information set by the operator or the like for the operation content.

Further, the intention estimation part 153 may update the intention estimation information 174 based on history information indicating the operation content inputted from the operator and the actual motion content of the robot device 200. Accordingly, it is possible to realize more appropriate intention estimation.

Further, the intention estimation part 153 may estimate the motion intention of the operator according to, for example, a GRASP taxonomy method (see, for example, Reference Document 1). In the embodiment, for example, by classifying a posture of the operator or the robot device 200, i.e., a gripping posture, according to the GRASP taxonomy method, an operator state is classified and a motion intention of the operator is estimated.

Reference Document 1: Thomas Feix, Javier Romero, et al., "The GRASP Taxonomy of Human Grasp Types", IEEE Transitions on Human-Machine Systems (Volume: 46, Issue: 1, February 2016), IEEE, p 66-77.

The motion control part 154 generates motion control information for causing the target robot device 200 to move based on the operator's intention estimated by the intention estimation part 153, and transmits the generated motion control information to the robot device 200 which is the operation target to control the motion of the robot device 200. In addition to (or in place of) the intention of the operator, the motion control part 154 may acquire information related to the motion of the robot device 200 obtained by the robot information control part 151, the customized data control part 152, etc. to generate the motion control information based on the acquired information. Further, when a plurality of operators operate two arms at the same time, for example, the motion control part 154 may perform synthetic processing such as addition and subtraction of forces based on sensor information such as the tactile sense information to perform motion control for working in coordination. Accordingly, even when one robot device 200 is operated by a plurality of operators, a well-balanced motion can be realized.

Among the motions to be executed by the robot device 200 according to the motion control part 154, the motion canceling part 155 selects a motion different from the intention of the operator and cancels execution of the selected motion. In this case, the motion canceling part 155 inquires the operator whether the operation content inputted from the operator is the content to be operated by the robot device 200, and based on the inquiry result, the motion canceling part 155 causes the motion control part 154 to generate motion control information and updates the intention estimation information 174.

The output control part 156 generates information to be provided to the operator who operates the operation terminal 300 based on the sound or the image acquired from the robot device 200. The information to be provided includes images and sounds. Further, the output control part 156 outputs sensor information and the like based on the result of the authentication process performed by the authentication management part 142. Further, the output control part 156 generates information to be provided to each user based on the contents managed by the usage status management part 146.

The storage part 170 may be realized by various storage devices described above, or an SSD (solid state drive), an EEPROM (electrically erasable programmable read only memory), a ROM (read only memory), a RAM (random access memory), etc. The storage part 170 stores, for example, user information 171, usage status information 172, robot control information 173, intention estimation information 174, sensor information 175, programs, and other information.

Figure 3:
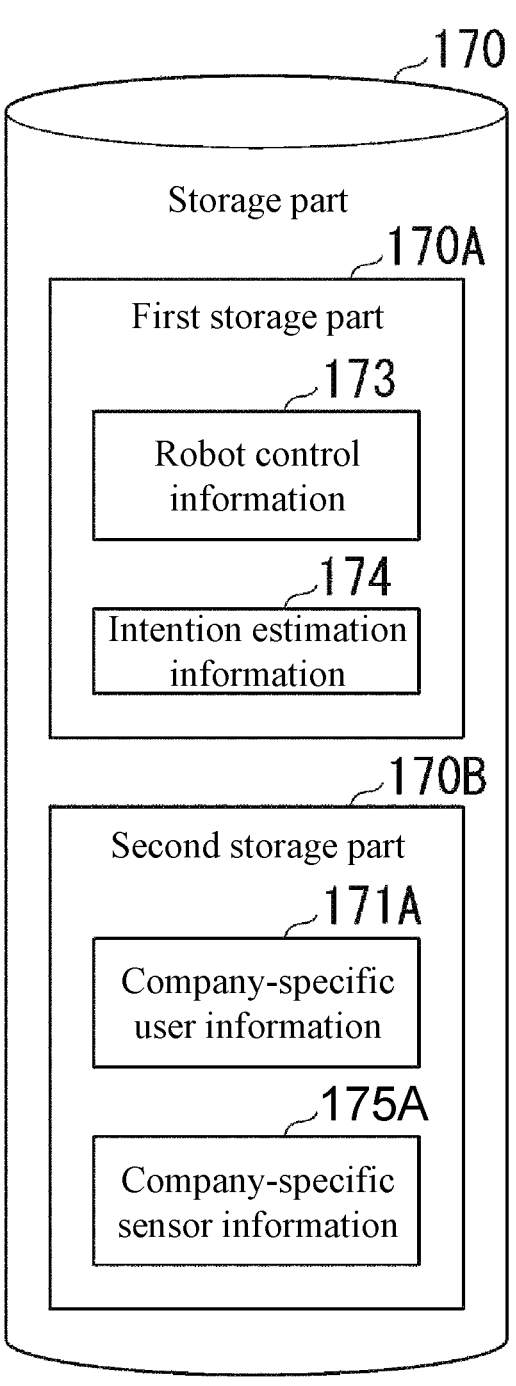
FIG. 3 is a view showing an example of another configuration of a storage part 170 of the management server 100 according to an embodiment.

FIG. 3 is a view showing an example of another configuration of the storage part 170 of the management server 100 according to an embodiment. In the example of FIG. 3, the storage part 170 includes, for example, a first storage part 170A and a second storage part 170B. The first storage part 170A and the second storage part 170B are storage areas having different access right strengths. The first storage part 170A stores, for example, information that can be used by all users of the remote operation system 1. The second storage part 170B stores, for example, information that can be acquired only by a company or a user whose preset access right has been confirmed. Further, the second storage part 170B may be an area which stores, for example, encrypted data for each company and cannot be viewed without decryption using a key assigned to each company. The setting of the access rights of the first storage part 170A and the second storage part 170B is managed by the authentication management part 142. Further, the first storage part 170A and the second storage part 170B may be different storage parts, or one or both of them may be managed by an external device such as a data server.

For example, the first storage part 170A stores the robot control information 173 and the intention estimation information 174. The robot control information 173 is basic control information for causing the robot device 200 to execute a predetermined motion. The predetermined motion is, for example, a motion such as moving, turning, moving an arm, holding (gripping) an object, or placing an object. These may be set for each type of the robot device 200, for example.

FIG. 4 is a view for illustrating a content of the intention estimation information 174 of FIG. 2 and FIG. 3. The intention estimation information 174 is, for example, information related to the intention estimation result estimated by the intention estimation part 153. FIG. 4 is a view for illustrating the content of the intention estimation information 174. In the intention estimation information 174, for example, information related to an estimated intention is associated with an operation content acquired from the operation terminal 300. Such information may be managed for each operator, or the intention estimation information 174 of a plurality of operators may be integrated to store only information related to the intention estimation with high frequency, and the information may be updated based on history information or the like.

The second storage part 170B stores information that can be accessed by a user whose predetermined access right has been confirmed. The second storage part 170B stores, for example, company-specific user information 171A, company-specific sensor information 175A, etc.

FIG. 5 is a view for illustrating a content of the company-specific user information 171A. In the example of FIG. 5, user information for each company is stored, and each information is managed so that it cannot be accessed unless the access right of each company is confirmed. In the company-specific user information 171A, for example, information such as a name, an authority, a priority, and image information is associated with authentication information for authenticating a user when using a service provided by the remote operation system 1. The authentication information includes, for example, a user ID, a password, etc., which are identification information for identifying the user. Further, the authentication information may include biometric authentication information such as fingerprint information, iris information, etc. The authority includes, for example, authority information such as an access right assigned to the user. Based on this authority information, sensor information or the like acquired by the robot device 200 may be acquired. By referring to the information stored in the authority, the information management part 144 may manage who can access which data, which data cannot be accessed, etc. The priority information stores, for example, a priority when a plurality of operators remotely operate the robot device 200 and the respective operation contents are the same or similar. The image information is image information representing a user and is an image for recognizing the user. For example, it includes a face image or an entire image of a user, or an avatar image or an illustration image created to imitate a user so that the user can be identified. Further, the image information may also include an image of a user taken from 360 degrees or an image of only each part (e.g., an arm or a leg).

FIG. 6 is a view for illustrating a content of the company-specific sensor information 175A. In the example of FIG. 6, sensor information for each company is stored, and each information is managed so that it cannot be accessed unless the access right of each company is confirmed. The company-specific sensor information 175A stores a date and time, an operator ID, an operation part, sensor information, etc. to a robot ID which is identification information for identifying the robot device 200. The operator ID stores a user ID of an operator who performed operation. The operation part stores a part of the robot ID operated by the operator. Accordingly, even when one robot device 200 is operated by a plurality of operators, the respective operation history can be managed.

FIG. 7 is a view for illustrating a content of the user information 171 of FIG. 2. In the user information 171, for example, information such as a name, an authority, a priority, and image information is associated with authentication information for authenticating a user when using a service provided by the remote operation system 1. Basically, the content of the user information 171 is similar to the content of the company-specific user information 171A.

FIG. 8 is a view for illustrating a content of the sensor information 175 of FIG. 2. The sensor information 175 stores a date and time, an operator ID, an operation part, sensor information, etc. to a robot ID which is identification information for identifying the robot device 200. Basically, the content of the sensor information 175 is similar to the content of the company-specific sensor information 175A.

FIG. 9 is a view for illustrating a content of the usage status information 172 of FIG. 2. In the usage status information 172, for example, the user ID is associated with a date and time, seat information, a robot ID which is identification information for identifying the robot device 200, and part information. The date and time may be, for example, a start date and time of use, and may include information such as a usage time. The seat information is information of a seat used by a user among seats arranged in a space where the robot device 200 works. This seat may store information of a location (seat) where an actual operator rather than the robot device 200 is working. The part information is information related to a responsible part when the robot device is operated by a plurality of users (operators). The usage status information 172 is managed by the usage status management part 146 and updated according to the status.

[Robot Device]

Figure 10:
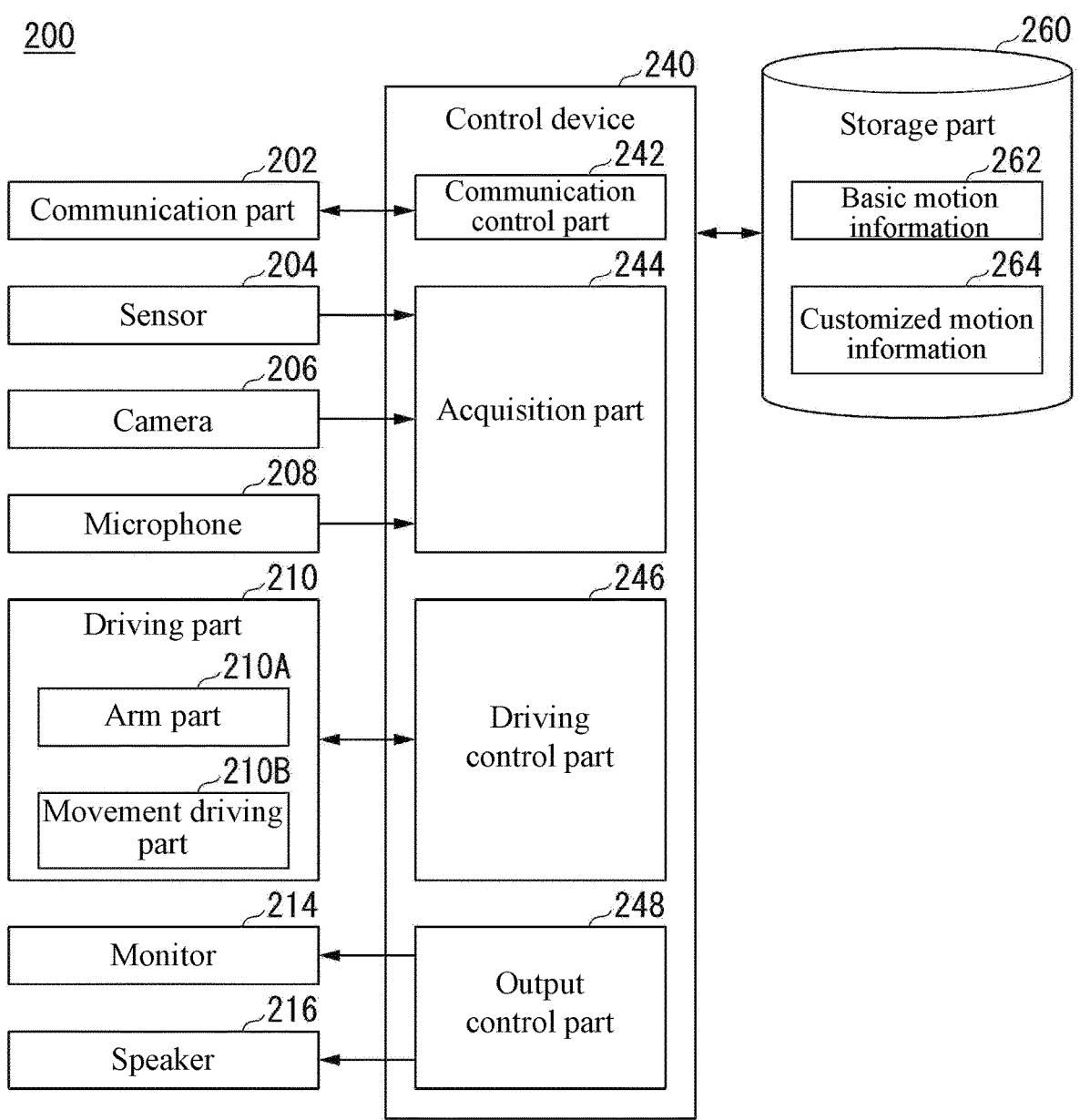
FIG. 10 is a view showing an example of a configuration of a robot device 200 according to an embodiment.

FIG. 10 is a view showing an example of a configuration of the robot device 200 according to an embodiment. The robot device 200 includes, for example, a communication part 202, a sensor 204, a camera (an example of an imaging part) 206, a microphone 208, a driving part 210, a monitor 214, a speaker 216, a control device 240, and a storage part 260. The driving part 210 includes, for example, an arm part 210A and a movement driving part 210B. The control device 240 includes, for example, a communication control part 242, an acquisition part 244, a driving control part 246, and an output control part 248. The communication control part 242, the acquisition part 244, the driving control part 246, and the output control part 248 are each realized by, for example, executing a program (software) by a hardware processor such as a CPU. A part or all of these components may be realized by hardware (circuit part; including a circuitry) such as an LSI, an ASIC, an FPGA, and a GPU, or may be realized by collaboration of software and hardware. A part or all of the functions of these components may be realized by a dedicated LSI. The program may be stored in advance in a storage device (a storage device including a non-transient storage medium) such as an HDD or a flash memory included in the robot device 200, or the program may be stored in a removable storage medium (non-transient storage medium) such as a DVD or a CD-ROM and installed to an HDD or a flash memory included in the robot device 200 by attaching the storage medium to a drive device included in the robot device 200.

According to the control of the communication control part 242 to be described later, the communication part 202 communicates with the management server 100 and other external devices via the network NW. Further, the communication part 202 may communicate with another robot device 200, and may communicate with the operation terminal 300.

The sensor 204 includes a position sensor which detects a position of the robot device 200, a speed sensor which detects a speed, and a temperature sensor which detects a temperature at a specific position such as in the surroundings of the robot device 200 or at a tip part of the arm part 210A. The position sensor receives information from, for example, a GPS (global positioning system) receiving device and obtains location information (longitude/latitude information) based on the received information. Further, the sensor 204 may include a humidity sensor which detects a humidity in the surroundings and a vibration sensor which detects vibration of an object operated by the robot device 200. Further, the sensor 204 may include an object detection sensor which detects an object in the surroundings. The object in the surroundings is, for example, another robot device 200, a person, an obstacle, etc.

The camera 206 is, for example, a digital camera using a solid-state imaging element such as a CCD (charge coupled device) or a CMOS (complementary metal oxide semiconductor). The camera 206, for example, captures an image of the surroundings of the robot device 200 at a predetermined timing. The number of the camera 206 is not limited to one, but a plurality of the cameras 206 may be provided in the robot device 200. For example, the camera 206 is provided at a head part of the robot device 200. Further, the camera 206 may be provided near a tip of the arm part 210A.

Accordingly, since a work target object can be photographed at a short distance, more detailed work can be easily performed.

The sound in the surroundings of the robot device 200 is inputted to the microphone 208. The microphone 208 outputs information based on the inputted sound to the control device 240.

The arm part 210A grips a target object and performs a predetermined work on the target object. The arm part 210A is, for example, an articulated robot arm, and includes, for example, an actuator, a gear, an artificial muscle, etc. For example, the arm part 210A includes a first arm part at which one end of an articulated robot arm is connected to the vicinity of the right side of a robot device main body, and a second arm part at which one end of another articulated robot arm is connected to the vicinity of the left side of the robot device main body. Further, the arm part 210A may include another arm part in addition to the first arm part and the second arm part. Hereinafter, when each arm is not distinguished, it will be simply referred to as the "arm part 210A". Another end of the arm part is configured with a grip part capable of gripping a predetermined object. The arm part 210A is driven based on the control of the control device 240. Further, the arm part may move in the same manner as a movement of a human arm.

The movement driving part 210B is a driving part for moving the robot device 200 on the floor surface or the ground. The movement driving part 210B may be, for example, two leg parts, or may be provided with a moving mechanism such as a wheel, a carriage, or a crawler. For example, when the movement driving part 210B is the leg parts, the leg parts move to enable the robot device 200 to walk based on the control of the control device 240. Further, the movement driving part 210B may have a structure which is movable along a ceiling or a rail by driving a crane or the like. With these configurations, the robot device 200 can move in a desired direction. The driving part 210 may be provided with a mechanism for driving other joints such as the waist and the head in addition to the arm part 210A or the movement driving part 210B. The driving part 210 is driven based on the control performed by the driving control part 246.

The monitor 214 is, for example, an LCD (liquid crystal display), an organic EL (electroluminescence) display device, etc. The monitor 214 displays information outputted by the output control part 248 as an image. A plurality of monitors 214 may be provided in the robot device 200. The monitor 214 may be provided at the head part, for example, or may be provided at an abdomen part or a back surface. The speaker 216 outputs information outputted by the output control part 248 as a sound.

The control device 240 includes, for example, a communication control part 242, an acquisition part 244, a driving control part 246, and an output control part 248. The communication control part 242, the acquisition part 244, the driving control part 246, and the output control part 248 are realized by, for example, executing a program (software) by a hardware processor such as a CPU. A part or all of these components may be realized by hardware (circuit part) such as an LSI, an ASIC, an FPGA, or a GPU, or may be realized by collaboration of software and hardware. The program may be stored in advance in a storage device (non-transient storage medium) such as an HDD or a flash memory, or the program may be stored in a removable storage medium (non-transient storage medium) such as a DVD or a CD-ROM and installed by attaching the storage medium to a drive device.

The communication control part 242 communicates with the management server 100 by wireless communication, for example, via the communication part 202 to perform transmission/reception of information. Further, the communication control part 242 may communicate with another robot device 200 via the communication part 202.

The acquisition part 244 acquires a detection result (sensor information) of the sensor 204 provided in the robot device 200. Further, the acquisition part 244 acquires an image captured by the camera 206. Further, the acquisition part 244 acquires information based on a sound inputted from the microphone 208.

The driving control part 246 causes the arm part 210A and the movement driving part 210B to move based on motion control information acquired from the management server 100. Further, based on the motion control information, the driving control part 246 drives other parts (e.g., head, torso, waist, etc.) of the robot device 200 to change a posture or the like. Further, the driving control part 246 may drive the robot device 200 based on basic motion information 262 and customized motion information 264 stored in the storage part 260. The basic motion information 262 is driving control information for executing a basic motion according to the type or the like of the robot device 200. The customized motion information 264 is, for example, driving control information for causing the robot device 200 to execute a specific motion registered in advance for each operator.

The output control part 248 causes the monitor 214 to output an image based on the information acquired from the management server 100. Further, the output control part 248 causes the speaker 216 to output a voice, a warning sound, etc. based on the information acquired from the management server 100.

The storage part 260 is realized by, for example, an HDD, a flash memory, an EEPROM, a ROM, a RAM, etc. The storage part 260 stores, for example, the basic motion information 262, the customized motion information 264, programs, and other information.

[Operation Terminal]

Figure 11:
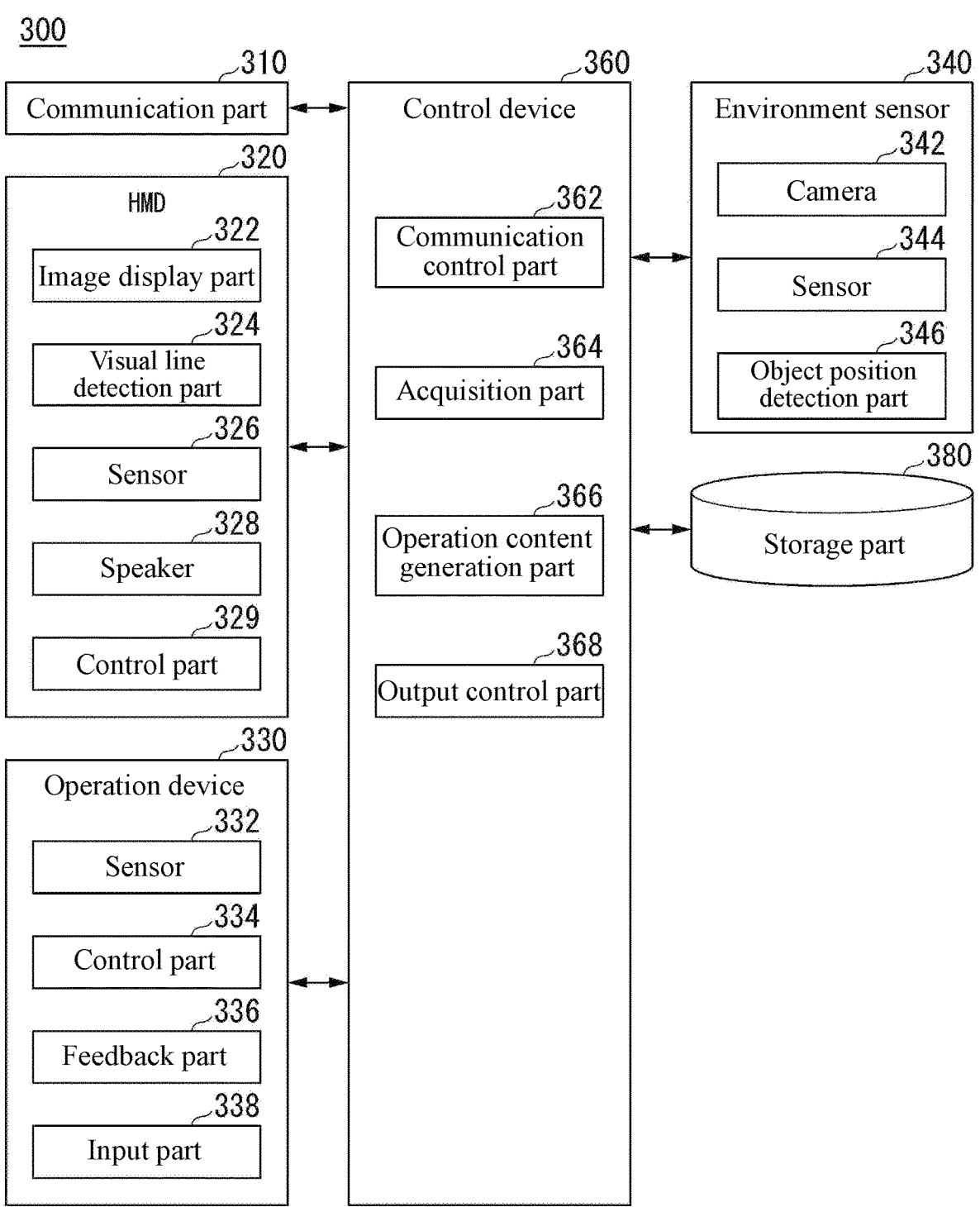
FIG. 11 is a view showing an example of a configuration of an operation terminal 300 according to an embodiment.

FIG. 11 is a view showing an example of a configuration of the operation terminal 300 according to an embodiment. The operation terminal 300 includes, for example, a communication part 310, a visual device (HMD) 320, an operation device 330, an environment sensor 340, a control device 360, and a storage part 380. The HMD 320, the operation device 330, and the environment sensor 340 are an example of an "HMI (human machine interface)".

The communication part 310 communicates with the management server 100 via the network NW according to the control of the control device 360. Further, the communication part 310 may communicate with another operation terminal 300 or the robot device 200.

The HMD 320 includes, for example, an image display part 322, a visual line detection part 324, a sensor 326, a speaker 328, and a control part 329. The HMD 320 outputs a state image, sound, etc. of the robot device 200 received by the control device 360 from the management server 100, or detects a movement of a visual line of the operator.

The image display part 322 is, for example, an LCD, an organic EL display, etc. The image display part displays an image outputted by the output control part 368 (to be described later) according to the control of the control part 329.

The visual line detection part 324 detects a visual line of the operator equipped with the HMD 320 according to the control of the control part 329, and outputs detected visual line information (operator sensor value) to the control device

360. The visual line information is, for example, information including a visual line vector.

The sensor 326 is, for example, an acceleration sensor, a gyroscope sensor, a magnetic force sensor, etc. The sensor 326 detects a tilt and a rotation of the head part of the operator equipped with the HMD 320, and outputs detected head motion information (operator sensor value) to the control device 360.

The speaker 328 outputs a voice, a warning sound, etc. outputted by the output control part 368.

Based on the control information from the control device 360, the control part 329 controls execution of visual line detection performed by the visual line detection part 324, controls detection performed by the sensor 326, controls image display on the image display part 322, or receives an input of information from the operator via the HMD 320.

The operation device 330 includes, for example, a sensor (operator sensor) 332, a control part 334, a feedback part 336, and an input part 338. The operation device 330 includes, for example, a tactile data glove equipped on the operator's hand.

The sensor 332 is, for example, an acceleration sensor, a gyroscope sensor, a magnetic force sensor, etc. The sensor 332 includes a plurality of sensors. The sensor 332 tracks the movement of each finger by, for example, two sensors. According to the control of the control part 334, the sensor 332 detects, for example, operator arm information (operator sensor value) which is information related to a posture or a position of the operator's arm, such as an orientation or a movement of each finger and a movement of a hand of the operator. Further, the operator arm information (operator sensor value) includes information over the entire human arm such as hand position/posture information, finger angle information of each finger, elbow position/posture information, and information tracking a movement of each part.

The control part 334 outputs the operator arm information detected by the sensor 332 to the control device 360. Further, the control part 334 controls the feedback part 336 based on feedback information acquired from the control device 360.

The feedback part 336 feeds back the feedback information to the operator according to the control of the control part 334. According to the feedback information, the feedback part 336 feeds back a feeling to the operator by, for example, a means (not shown) for applying vibration, a means (not shown) for applying air pressure, a means (not shown) for restraining a movement of the hand, a means (not shown) for enabling feeling a temperature, a means (not shown) for enabling feeling firmness or softness, a means (not shown) for enabling feeling vibration, etc., attached to the arm part 210A of the robot device 200.

The input part 338 is, for example, various input devices such as a keyboard, a mouse, a lever, a touch panel, and a microphone other than the tactile data glove. The input part 338 receives input of an operation content for the robot device 200 by each input device.

The environment sensor 340 detects, for example, a motion of the operator. The environment sensor 340 includes, for example, a camera (an example of an imaging part) 342, a sensor 344, and an object position detection part 346. The camera 342 captures an image including the operator. The camera 342 is, for example, an RGB camera. The camera 342 outputs the captured image to the object position detection part 346. In the environment sensor 340, the positional relationship between the camera 342 and the sensor 344 is known.

The sensor 344 is, for example, a depth sensor. The sensor 344 outputs a detection result to the object position detection part 346. The camera 342 and the sensor 344 may also be distance sensors.

Based on the image captured by the camera 342 and the detection result detected by the sensor 344, the object position detection part 346 detects a three-dimensional position, a size, a shape, etc. of a target object in the captured image according to a known method. Referring to a pattern matching model or the like stored in the object position detection part 346, the object position detection part 346 performs image processing (edge detection, binarization processing, feature amount extraction, image enhancement processing, image extraction, pattern matching processing, etc.) on the image captured by the camera 342 to estimate the position of the object. When detecting a plurality of objects from the captured image, the object position detection part 346 detects the position of each object. The object position detection part 346 transmits detected object position information to the control device 360. The data transmitted by the environment sensor 340 may be, for example, a point group having position information.

The control device 360 includes, for example, a communication control part 362, an acquisition part 364, an operation content generation part 366, and an output control part 368. The communication control part 362, the acquisition part 364, the operation content generation part 366, and the output control part 368 are realized by, for example, executing a program (software) by a hardware processor such as a CPU. A part or all of these components may be realized by hardware (circuit part) such as an LSI, an ASIC, an FPGA, a GPU, etc., or may be realized by collaboration of software and hardware. The program may be stored in advance in a storage device (non-transient storage medium) such as an HDD or a flash memory, or the program may be stored in a removable storage medium (non-transient storage medium) such as a DVD or a CD-ROM and installed by attaching the storage medium to a drive device.

The communication control part 362 communicates with the management server 100 by wireless communication, for example, via the communication part 310 to perform transmission/reception of information. Further, the communication control part 362 may communicate with another operation terminal 300 via the communication part 310. Further, the communication control part 362 communicates with the HMD 320, the operation device 330, and the environment sensor 340.

The acquisition part 364 acquires information obtained from the HMD 320, the operation device 330, and the environment sensor 340. The operation content generation part 366 generates an operation content for the robot device 200 based on the information acquired by the acquisition part 364. For example, the operation content generation part 366 generates an operation content related to visual line information and a head orientation based on the information acquired from the HMD 320. Further, the operation content generation part 366 generates an operation content related to a motion of the arm part 210A of the robot device 200 based on the information acquired from the operation device 330. Further, the operation content generation part 366 generates an operation content related to a posture, a movement direction, or a movement amount of the robot device 200 based on the information acquired from the environment sensor 340. The information generated by the operation content generation part 366 is transmitted to the management server 100 via the communication part 310.

The output control part 368 outputs provided information acquired from the management server 100 to the HMD 320 or the operation device 330. For example, the image acquired from the management server 100 is outputted on the image display part 322 of the HMD 320. Further, the output control part 368 causes the speaker 328 to output a voice, a warning sound, etc. based on the information acquired from the management server 100. Further, the output control part 368 causes the operation device 330 to output feedback information for transmitting information related to the tactile sense acquired from the management server 100 to the operator.

The storage part 380 is realized by, for example, an HDD, a flash memory, an EEPROM, a ROM, a RAM, etc. The storage part 380 stores, for example, programs and other information.

Remote Operation of Robot Device According to an Embodiment

Figure 12:
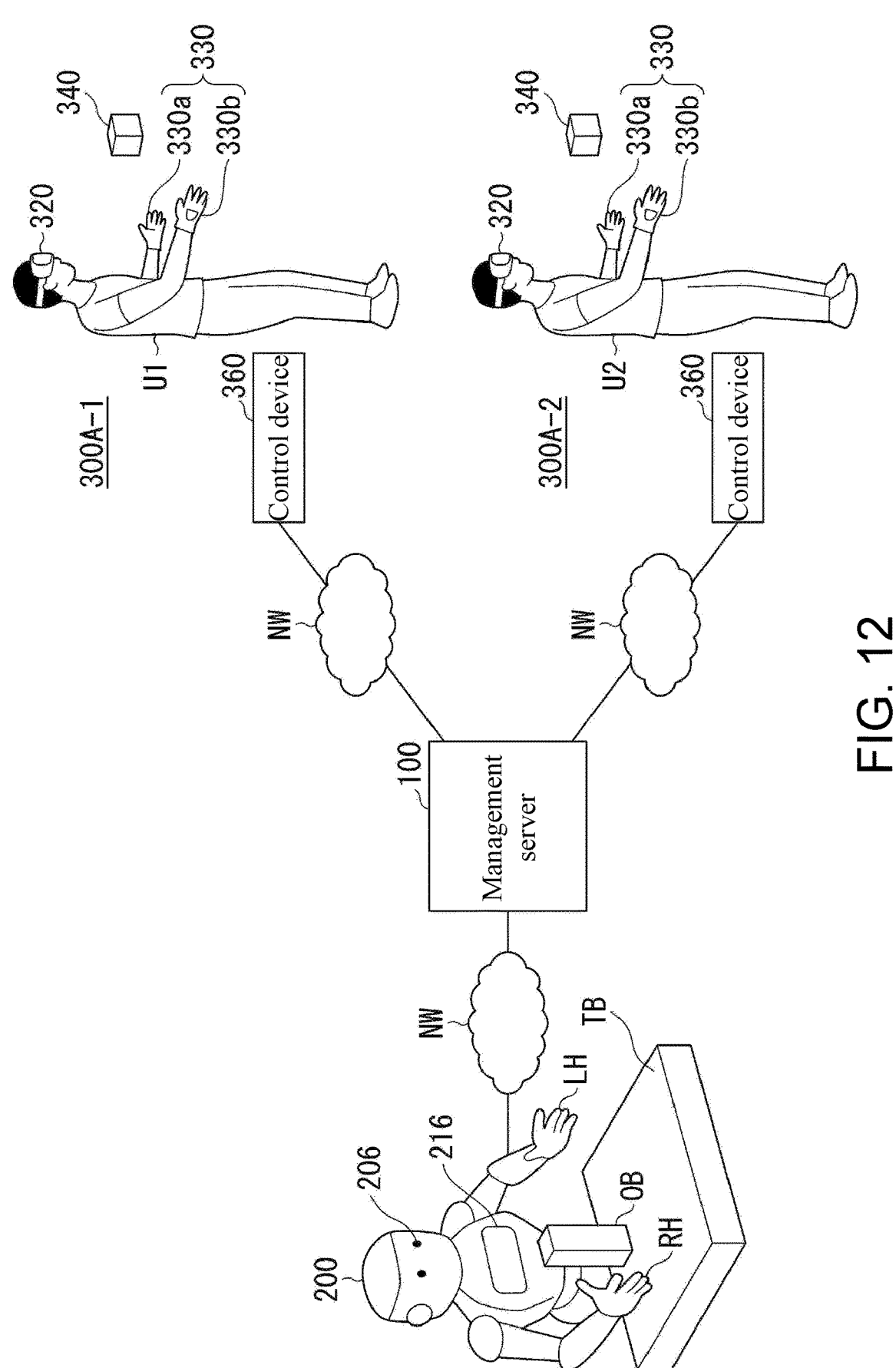
FIG. 12 is a view for illustrating a remote operation of the robot device 200 according to this embodiment.

Next, a remote operation of the robot device 200 performed by the remote operation system 1 according to an embodiment will be specifically described. FIG. 12 is a view for illustrating a remote operation of the robot device 200 according to this embodiment. FIG. 12 shows an example of operating one robot device 200 based on operation contents of two operators U1 and U2. The operators U1 and U2 are respectively equipped with the HMD 320 and the operation device 330, as shown in FIG. 12. Operation terminals 300A-1 and 300A-2 are terminals of the same company (e.g., company A) but may be installed at different locations. Further, in place of the operation terminals 300A-1 and 300A-2, the operation terminals 300-1 and 300-2 of FIG. 1B may be used.

Further, the operators U1 and U2 are provided with the environment sensor 340 which measures a motion of the operator and the surrounding environment. A same configuration as the environment sensor 340 may be attached to, for example, the robot device 200. Further, the operation device 330 includes, for example, an operation device 330a equipped on the left hand of the operator and an operation device 330b equipped on the right hand. The operation contents respectively inputted from the operation devices 330a and 330b are used for motion control of a left hand LH and a right hand RH of the robot device 200. An arm position, a face orientation, etc. of the operator are detected by the environment sensor 340. Each detected data is transmitted to the management server 100 via the network.

The management server 100 estimates intentions of the respective users based on the operation contents obtained from the operation terminals 300A-1 and 300A-2. Herein, an example of information estimated by the intention estimation part 153 will be specifically described. The intention estimation part 153 estimates a motion intention of the operator based on the acquired operation content from the operator. By classifying a posture of an arm part of the operator based on an operator sensor value of the operation terminal 300, the intention estimation part 153 classifies a posture of an arm including a grip part of the robot device. Further, the intention estimation part 153 estimates the motion intention which the operator wants the robot device 200 to perform based on the classification result. The intention estimation part 153 estimates, for example, a work purpose to be performed by the robot device 200, a work content, a movement of a hand or a finger for each time point, etc. as a motion intention of the operator. The work purpose is, for example, gripping an object, moving an object, etc. The work content is, for example, gripping and lifting an object, gripping and moving an object, etc.

Further, the intention estimation part 153 may, for example, input an operation content into a trained model or the intention estimation information 174 stored in the storage part 170 to estimate the motion intention of the operator. In the embodiment, the motion intention of the operator can be estimated with high accuracy by performing intention estimation according to the classification of the gripping posture. In addition, another method may be used for classification of the gripping posture.

Further, the intention estimation part 153 may perform integrated estimation using the visual line and the movement of the arm part. In this case, the intention estimation part 153 may input visual line information, hand movement information, and position information of an object OB on a table TB into the trained model to estimate the motion intention of the operator.

In the example of FIG. 12, the intention estimation part 153 estimates, for example, an object to be gripped based on the visual line information. Next, the intention estimation part 153 estimates a posture of the operator's hand based on the estimated object to be gripped. Further, the intention estimation part 153 may first estimate a posture of the operator's hand based on the operation content, and then estimate the object to be gripped based on the estimated posture of the operator's hand. When the same or similar operation contents are inputted from the operators U1 and U2, intention estimation is performed based on the operation content from the operator having a high priority. Further, when operations of different parts are assigned to the operators U1 and U2, the intention estimation part 153 estimates the intention based on the respective operation contents. Hereinafter, it will be assumed that the operator U1 operates the arm part 210A of the right hand and the operator U2 operates the arm part 210A of the left hand.

For example, when the object OB is placed on the table TB as shown in FIG. 12, the intention estimation part 153 estimates that the object OB is to be gripped based on the posture of the hand. Further, the intention estimation part 153 may estimate in advance a future trajectory of the hand intended by the operator based on the operation content and state information of the robot device 200. The intention estimation part 153 may also estimate the object to be gripped and a position of the object by using a detection result detected by the sensor, an image processing result of the image captured by the environment sensor 340, etc.

Further, since the coordinate system is different between the environment in which the operator operates and the motion environment of the robot, for example, when the robot device 200 is activated, the operation environment of the operator and the motion environment of the robot may be calibrated. Further, at the time of gripping, the management server 100 may determine a gripping position based on a gripping force of the robot device, a frictional force between the object and the grip part, etc., in consideration of the error in the gripping position at the time of gripping.

When the robot device 200 is not remotely operated, its motion is controlled according to the control of the control device 240, and when remotely operated, its motion is controlled according to the motion control information generated by the management server 100 based on the estimated intention or the like.

The control device 240 of the robot device 200 controls the driving part 210 based on the motion control information from the management server 100. Further, the robot device 200 outputs, to the management server 100, information such as sensor information detected by the sensor 204, an image captured by the camera 206, and a sound outputted by the microphone 208. The management server 100 generates provided information to be provided to the company operation terminals 300A-1 and 300A-2 (or the operation terminals 300-1 and 300-2) based on the acquired sensor information, image, sound, etc. In this case, the management server 100 may generate an image in which at least a part of the sensor information is superimposed on the image. The management server 100 generates provided information including information for transmission by the tactile sense. Further, since the robot device 200 may be operated by a plurality of operators, an image in which information for specifying an operator of each part of the robot device 200 is superimposed on a camera image may be generated. The operation terminal 300 displays the image outputted from the management server 100. Accordingly, when a plurality of operators operate the robot device 200, it is possible to learn about a status of the robot operated by another operator.

Figure 13:
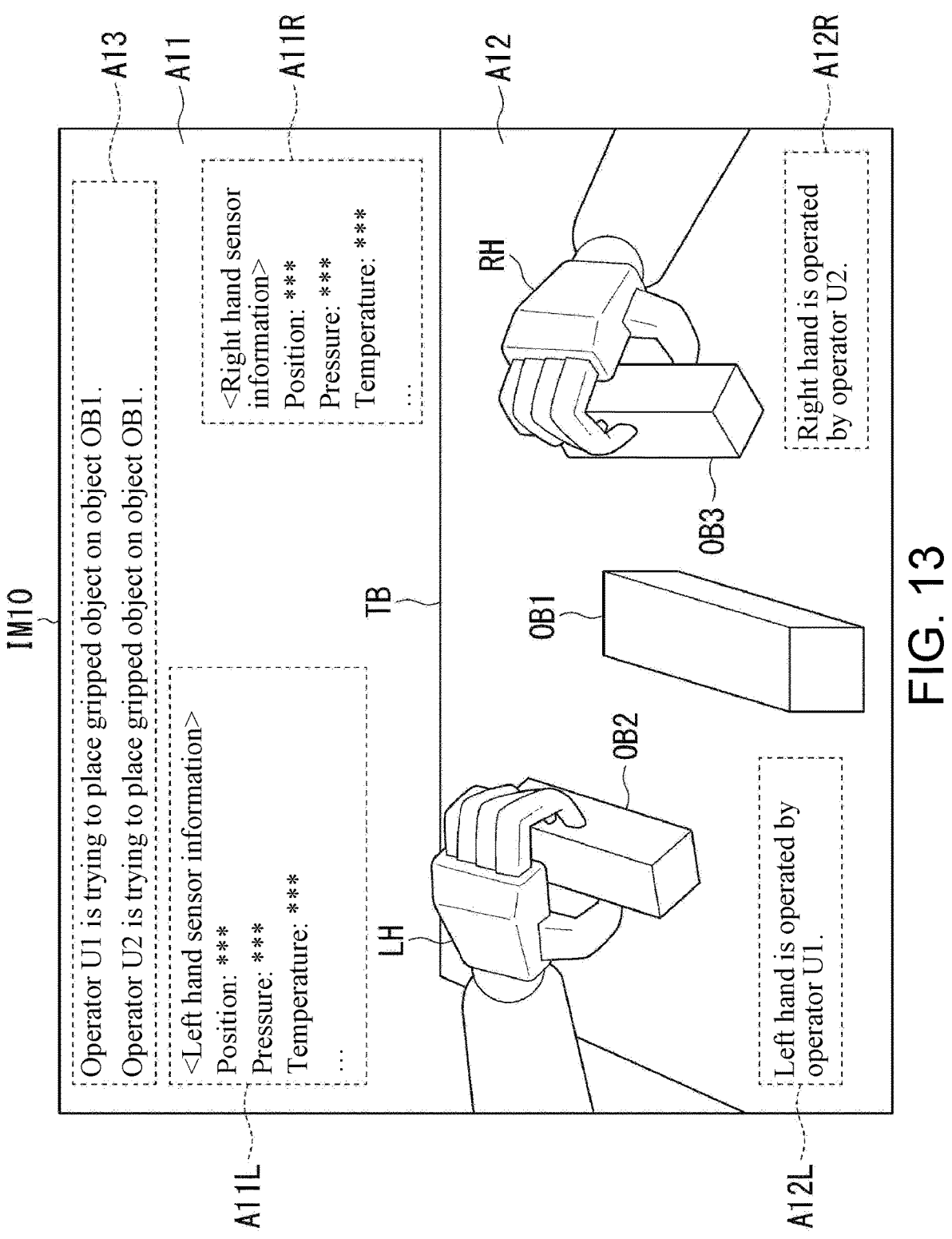
FIG. 13 is a view showing an example of an image IM10 displayed by the operation terminal 300.

FIG. 13 is a view showing an example of an image IM10 displayed by the operation terminal 300. A display mode such as a layout or a display content of the image IM10 is not limited to the example of FIG. 13. The same applies to display modes of other images to be described below. In the image IM10 shown in FIG. 13, a sensor information display area A11, an operator information display area A12, and a work status display area A13 are superimposed and displayed on the image IM10 including the arm parts (the left hand LH and the right hand RH) of the robot device 200 captured by the camera 206. Further, in the example of FIG. 13, the object OB1 is placed on the table TB in front of the robot device 200. Further, it is assumed that the left hand LH of the robot device 200 lifts while gripping an object OB2, and the right hand RH of the robot device 200 lifts while gripping an object OB3. The sensor information display area A11, the operator information display area A12, and the work status display area A13 may be displayed with a predetermined transmittance so that an object in the real space is not shielded.

In the example of FIG. 13, sensor information related to the left hand of the robot device 200 is displayed in a sensor information display area A11L. Further, sensor information (e.g., a position, a pressure, a temperature, etc.) related to the right hand of the robot device 200 is displayed in a sensor information display area A11R. Further, in the example of FIG. 13, information related to the operator of the left hand of the robot device 200 is displayed in an operator information display area A12L. Information related to the operator of the right hand of the robot device 200 is displayed in an operator information display area A12R. Accordingly, for example, when the robot device 200 is operated by a plurality of people, the operator of each part of the robot device 200 can be accurately learned about by another operator. Further, since it is possible to learn about not only the sensor information of the part operated by oneself but also the information related to the operation of another operator, more accurate processing can be executed.

The result of each intention estimation is displayed in the work status display area A13. In the example of FIG. 13, information related to the intentions estimated based on the operation contents of the operators U1 and U2 is displayed. Further, when the management server 100 estimates according to intention estimation that each operator performs the same or similar processing, one of the intentions is preferentially executed based on priority information. Further, in this case, another operator may be presented with a warning or the like by displaying in the work status display area A13 and changing a sound or a display mode. In the example of FIG. 13, since both the operators U1 and U2 are trying to place the gripped object on the object OB1, warning information is presented. The warning mode may be different depending on the degree of danger.

In this case, the motion control part 154 refers to, for example, the priority of each operator, and causes the robot device 200 to execute a motion based on the intention of the operator having a high priority. Further, when the processing is executed based on priority, the management server 100 causes the display part of the operation terminal 300 to display an image including the processing content.

Figure 14:
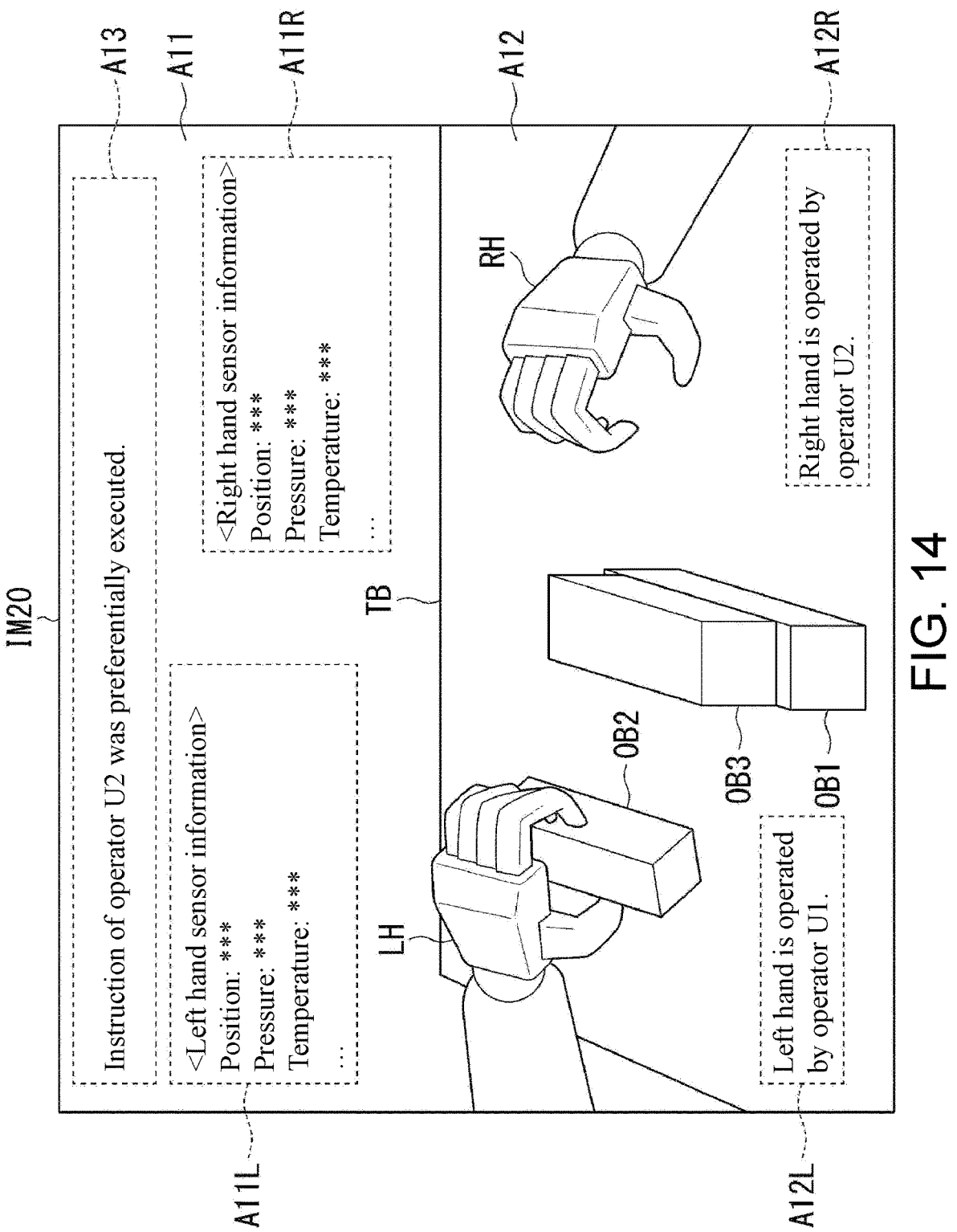
FIG. 14 is a view showing an example of an image IM20 displayed on the operation terminal 300 when a work based on priority is executed.

FIG. 14 is a view showing an example of an image IM20 displayed on the operation terminal 300 when a work based on priority is executed. In the example of FIG. 14, the content displayed in the work status display area A13 is different as compared to the image IM10 shown in FIG. 13. Therefore, in the following, the work status display area A13 will be mainly described. In the example of FIG. 14, information indicating that an instruction of the operator U2 has been preferentially executed based on priority is displayed in the work status display area A13. Accordingly, the operators U1 and U2 can more accurately learn about the intention estimation result for each operation instruction and the actual work status.

Further, the intention estimation part 153 may store the estimated result to the storage part and use it in the next and subsequent intention estimation. Further, when detecting an unknown motion, the intention estimation part 153 may inquire the operator whether to cause the robot device 200 to execute this motion.

Figure 15:
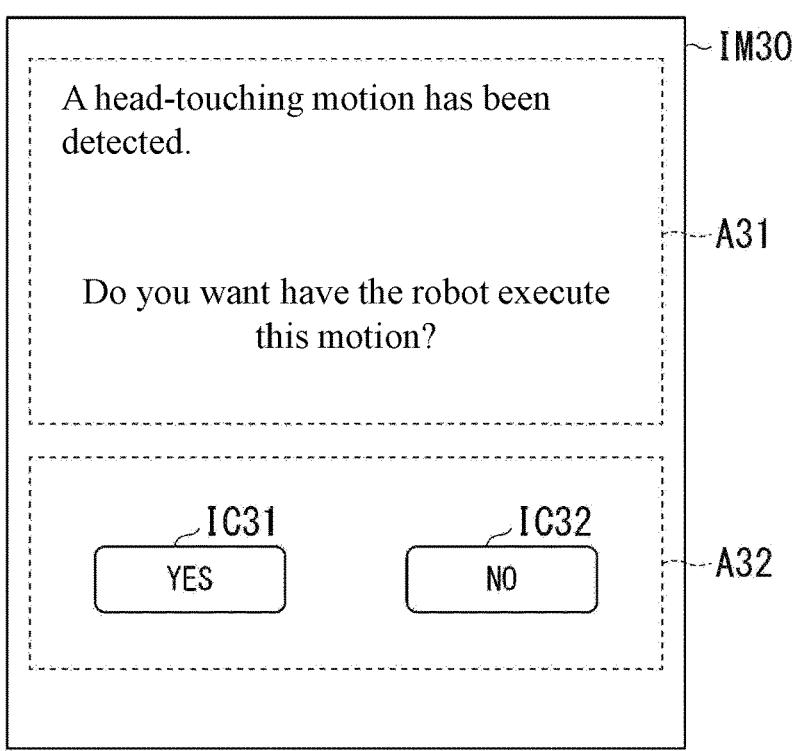
FIG. 15 is a view showing an example of an image IM30 inquiring an operator about a motion to be executed by the robot device.

FIG. 15 is a view showing an example of an image IM30 inquiring an operator about a motion to be executed by the robot device. The image IM30 includes, for example, a motion inquiry information display area A31 and a switch display area A32. The motion inquiry information display area A31 displays information for inquiring whether to cause the robot device 200 to execute a motion among the operation contents inputted by the operation device 330. For example, when a head-touching motion is detected but the intention of this motion cannot be estimated, the intention estimation part 153 causes the operation terminal 300 to display an image showing text information such as "A head-touching motion has been detected. Do you want to have the robot execute this motion?" as shown in the motion inquiry information display area A31 of FIG. 15.

The switch display area A32 displays, for example, icons IC31 and IC32. The icons IC31 and IC32 are, for example, GUI (graphical user interface) switches. When the icon IC31 is selected, the management server 100 generates motion control information for causing the robot device 200 to execute the instructed operation content. Further, when the icon IC32 is selected, the management server 100 does not cause the robot device 200 to execute the instructed operation content. Further, the management server 100 may execute a process so that even if the same operation is inputted in the future, it will not be inputted to the robot device. Accordingly, it is possible to suppress causing the robot to execute a motion that is unconsciously executed due to a habit of the operator or the like, and it is possible to prevent the robot from executing an unnecessary motion.

Further, an operator who is present in the surroundings of the robot device 200 may feel uneasy because he/she does not know who is operating the robot device 200. Therefore, the management server 100 may display information related to the operator of the robot device 200 on the monitor of the robot device 200. In this case, when the robot device 200 is operated by a plurality of operators, the operator of each part may be presented.

Figure 16:
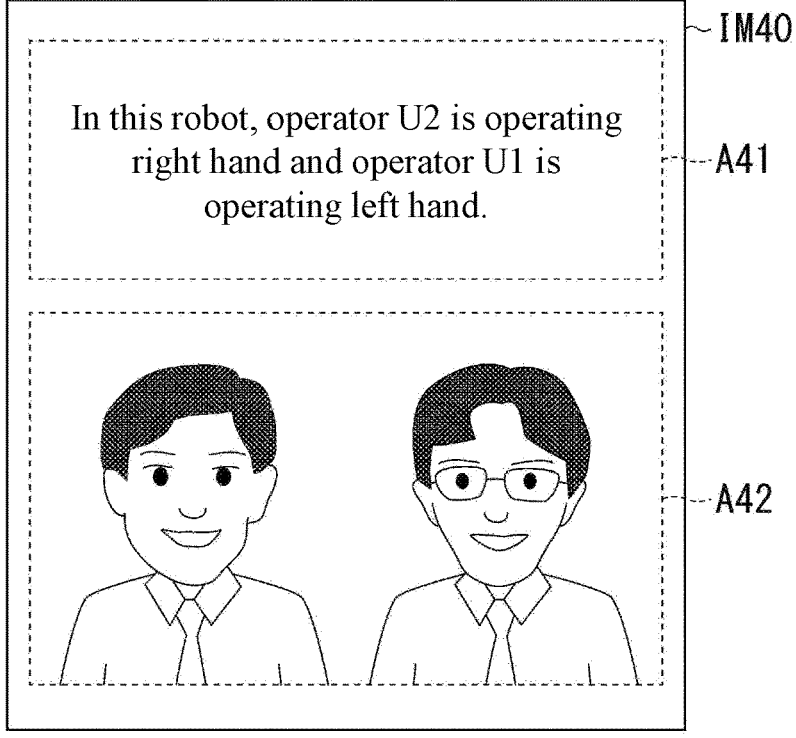
FIG. 16 is a view showing an example of an image IM40 displayed on a monitor 214 of the robot device 200.

FIG. 16 is a view showing an example of an image IM40 displayed on the monitor 214 of the robot device 200. The image IM40 includes, for example, one or both of operator information display areas A41 and A42. The operator information display area A41 displays text information related to the operator who operates the robot device 200. Further, the operator information display area A41 may include information related to the part of the robot device 200 operated by the operator. In the example of FIG. 16, text information "In this robot, operator U2 is operating right hand and operator U1 is operating left hand." is displayed in the operator information display area A41. Further, an avatar image registered in a user database (DB) is displayed in the operator information display area A42. Accordingly, the operators in the surroundings can more accurately recognize the person who is remotely operating the robot or the responsible part.

[Processing Sequence]

Figure 17:
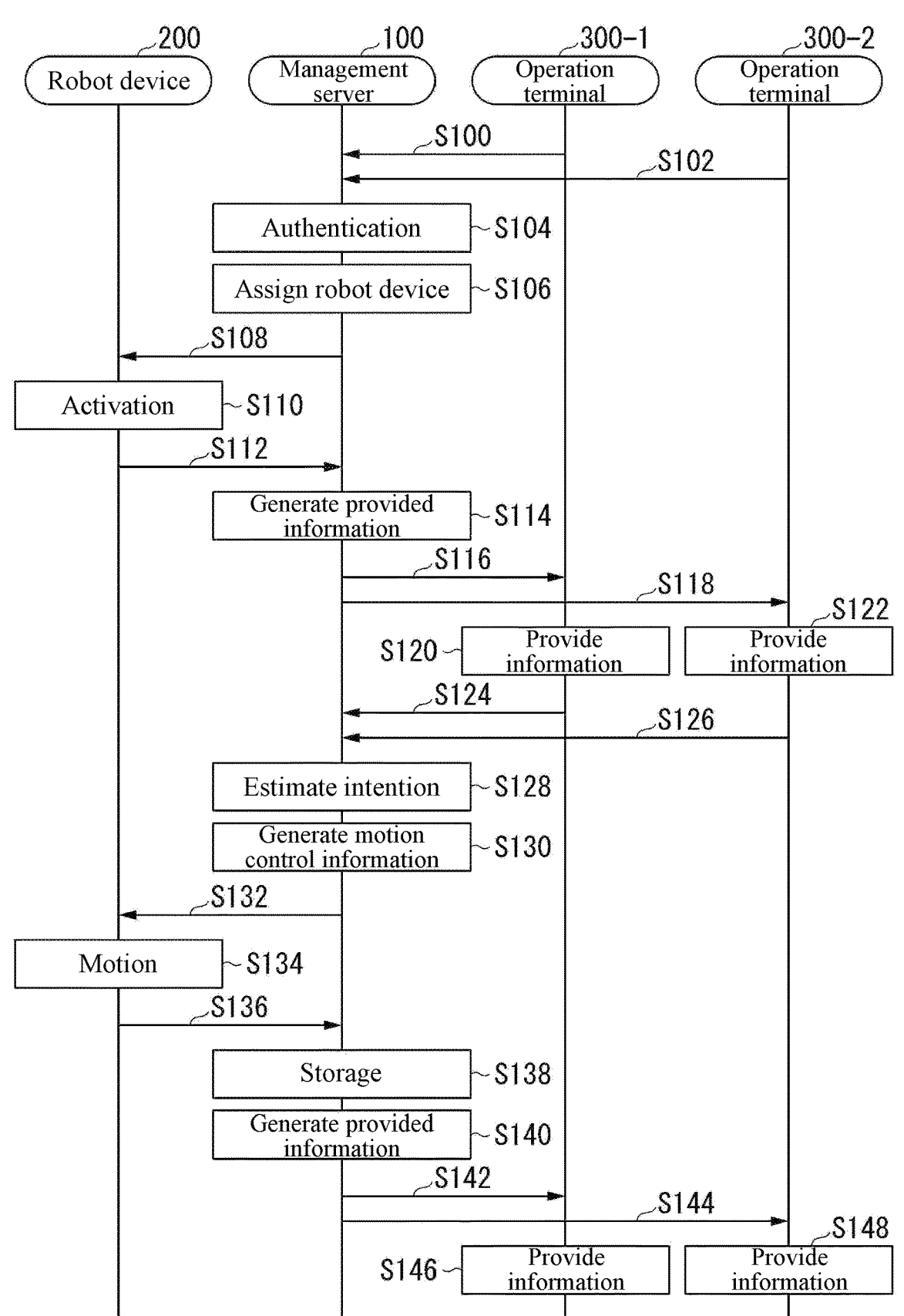
FIG. 17 is a sequence diagram for illustrating a processing executed by the remote operation system 1 according to an embodiment.

Next, a processing executed by the remote operation system according to an embodiment will be described with reference to a sequence diagram. FIG. 17 is a sequence diagram for illustrating the processing executed by the remote operation system 1 according to an embodiment. In the example of FIG. 17, the management server 100, the robot device 200, and the operation terminals 300-1 and 300-2 will be used for description. Further, in FIG. 17, an example in which the robot device 200 is operated by the two operation terminals 300-1 and 300-2 will be described.

The operation terminal 300-1 and the operation terminal 300-2 respectively access the management server 100 to remotely operate the robot device 200 (steps S100 and S102). The management server 100 performs an authentication process of whether the remote operation system 1 may be used based on authentication information or the like inputted from the operation terminals 300-1 and 300-2 (step S104). The following describes the case where the use is permitted by authentication. When the use is permitted, the management part of the management server 100 assigns the robot device 200 to be operated by the operation terminals 300-1 and 300-2 (step S106), and makes a request for activation control to the assigned robot device (step S108).

The robot device 200 activates the machine based on the activation request from the management server 100 (step S110), and outputs a detection result of the sensor of the robot device 200, an image captured by the camera, etc. to the management server 100 (step S112).

The management server 100 acquires the information transmitted from the robot device 200, and generates information (provided information) to be provided to the operation terminals 300-1 and 300-2 based on the acquired information (step S114). Then, the management server 100 transmits the generated provided information to the operation terminals 300-1 and 300-2, respectively (steps S116 and S118).

Each of the operation terminals 300-1 and 300-2 receives the provided information transmitted from the management server 100, and outputs the received information from the HMD, the operation device to provide the information (steps S120, S122).

Next, the operation terminals 300-1 and 300-2 transmit an operation content related to the robot device 200 to the management server 100 (steps S124 and S126). The management server 100 performs intention estimation based on the operation contents obtained from each of the operation terminals 300-1 and 300-2 (step S128), generates motion control information based on each intention estimation result (step S130), and transmits the generated motion control information to the robot device 200 (step S132).

The robot device 200 performs a motion based on the motion control information (step S134), and transmits information (sensor information) obtained from the sensor, a camera image, etc. during the motion or at the end of the motion to the management server 100 (step S136).

The management server 100 stores the received information to the storage part 170 (step S138), generates provided information for transmitting the acquired information to the operation terminals 300-1 and 300-2 (step S140), and transmits the generated provided information to the operation terminals 300-1 and 300-2 (steps S142 and S144). Each of the operation terminals 300-1 and 300-2 outputs the obtained information to provide the information to the operator (steps S146 and S148). Afterwards, the processes of steps S124 to S148 are continuously performed until the operation on the robot device 200 is ended.

Further, when executing remote operation, the operators may feel lonely since they are operating the operation terminal 300 at different locations. Therefore, the management server 100 generates information which makes the operator feel that he/she is in the work space where the robot device 200 is present (feel an illusion or a simulated experience), and provides the generated image to the operation terminal 300.

Figure 18:
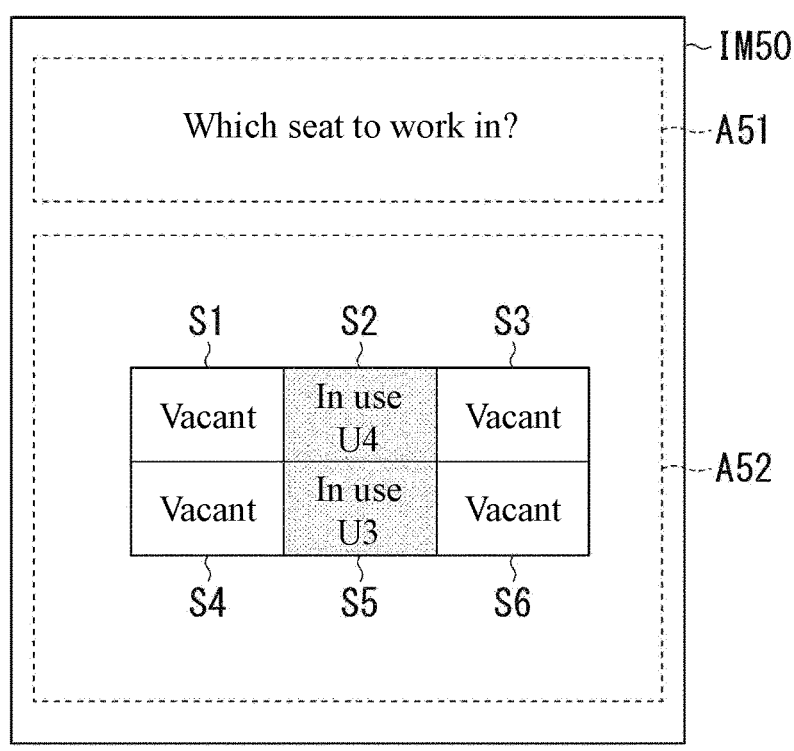
FIG. 18 is a view showing an example of an image IM50 for a user to select a seat.

For example, when receiving an instruction from a user to remotely operate the robot device 200, the management server 100 transmits, to the operation terminal 300, information (image) for selecting an arrangement location in the space where the robot device 200 works. The arrangement location is, for example, positioned based on seat information in space. FIG. 18 is a view showing an example of an image IM50 for a user to select a seat. A display mode such as a layout or a display content of the image IM50 is not limited to the example of FIG. 18. The same applies to display modes of other images to be described below. Further, the content of the image IM50 is generated by, for example, the output control part 156.

The image IM50 includes, for example, a text display area A51 and a seat selection area A52. Text information prompting the user to select a seat is displayed in the text display area A51. In the example of FIG. 18, text information "Which seat to work in?" is displayed. The management server 100 may generate a voice data corresponding to the text information and output the generated data from the operation terminal 300.

For example, the seat selection area A52 displays information related to a usage status of seats present in the work space in which the robot device 200 operated by the user will operate. In the example of FIG. 18, six seats S1 to S6 are displayed corresponding to, for example, positions of seats in the real space. When seats are set in a virtual space, such seat positions may have different seat arrangements, sizes, numbers, etc., depending on, for example, a normal business mode, a conference mode, etc. As for the seat arrangement, for example, in the conference mode, the seats may be arranged in a circle. Further, the seat arrangement may be the same as a seat arrangement in the company, for example, or may be a mixture of the real world and the virtual world by displaying, for example, "at work" on seats of employees who are at work. The management server 100 refers to the usage status information 172 managed by the usage status management part 146 and displays information including the information related to the seat being used in the seat selection area A52. In the example of FIG. 18, the seat selection area A52 displays an image showing that the seats S2 and S5 are in use and the seats S1, S3, S4 and S6 are vacant. Further, the management server 100 may display information for identifying the user currently using the seat in the seat selection area A52. In the example of FIG. 18, it is shown that the seat S2 is used by a user U4 and the seat S5 is used by a user U3. Accordingly, the user may select the seat he/she desires based on the usage status. Hereinafter, it will be assumed that the user has selected the seat S4.

When the seat is specified, the management server 100 updates the usage status information 172, generates motion control information for moving the robot device 200 moved by the user to the position of the seat S4, and transmits the generated motion control information to the robot device 200. The robot device 200 moves to the position of S4 based on the received motion control information, and transmits an image or the like captured by the camera 206 to the management server 100. The management server 100 transmits the image obtained from the robot device 200 to the operation terminal 300 and displays it on the visual device 320.

Figure 19:
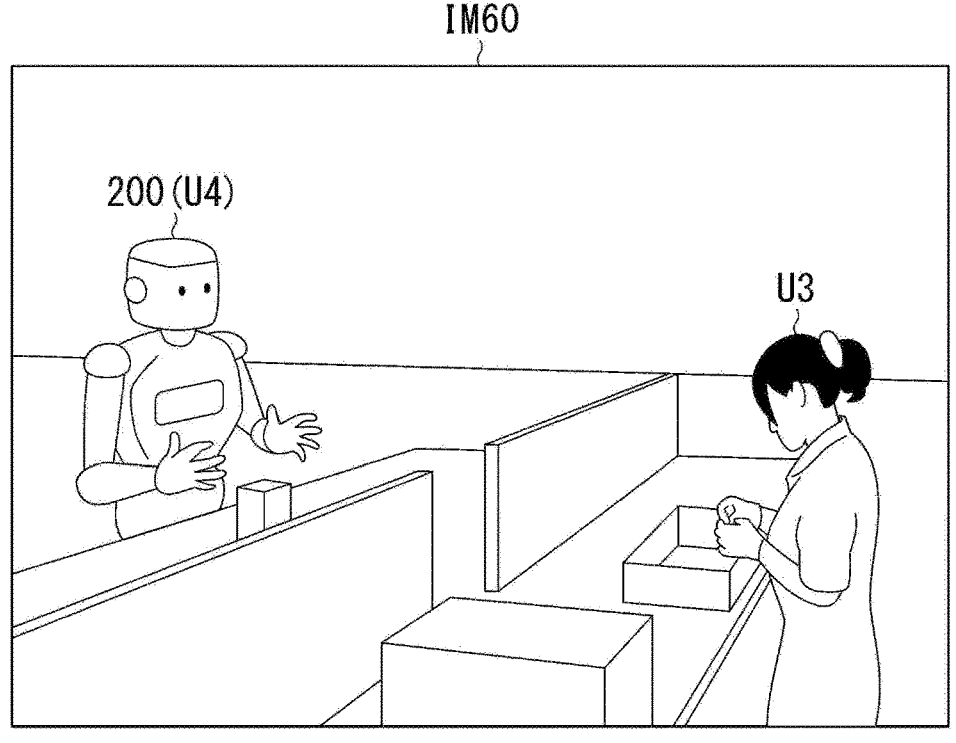
FIG. 19 is a view showing an example of an image IM60 captured by the robot device 200.

FIG. 19 is a view showing an example of an image IM60 captured by the robot device 200. The image IM60 is a view in a virtual space seeing the right side from the seat S4. In the example of FIG. 19, the user U3 and another robot device 200 (U4) operated by the user U4 are displayed. Accordingly, it is possible to learn about the operators or other robot devices present in the surroundings.

Further, as far as the image IM60 is directly viewed, it is not possible to learn about who is operating the another robot device 200 (U4). Further, when remote work using other robot devices 200 continues in the future, it is likely that there may be only a plurality of robot devices 200 in the surroundings, which may cause a sense of loneliness. Therefore, the management server 100 acquires an image representing the user U4 operating the another robot device 200 (U4) from the image information stored in the user information 171, and generates an image obtained by superimposing the acquired image on the another robot device 200 (U4).

Figure 20:
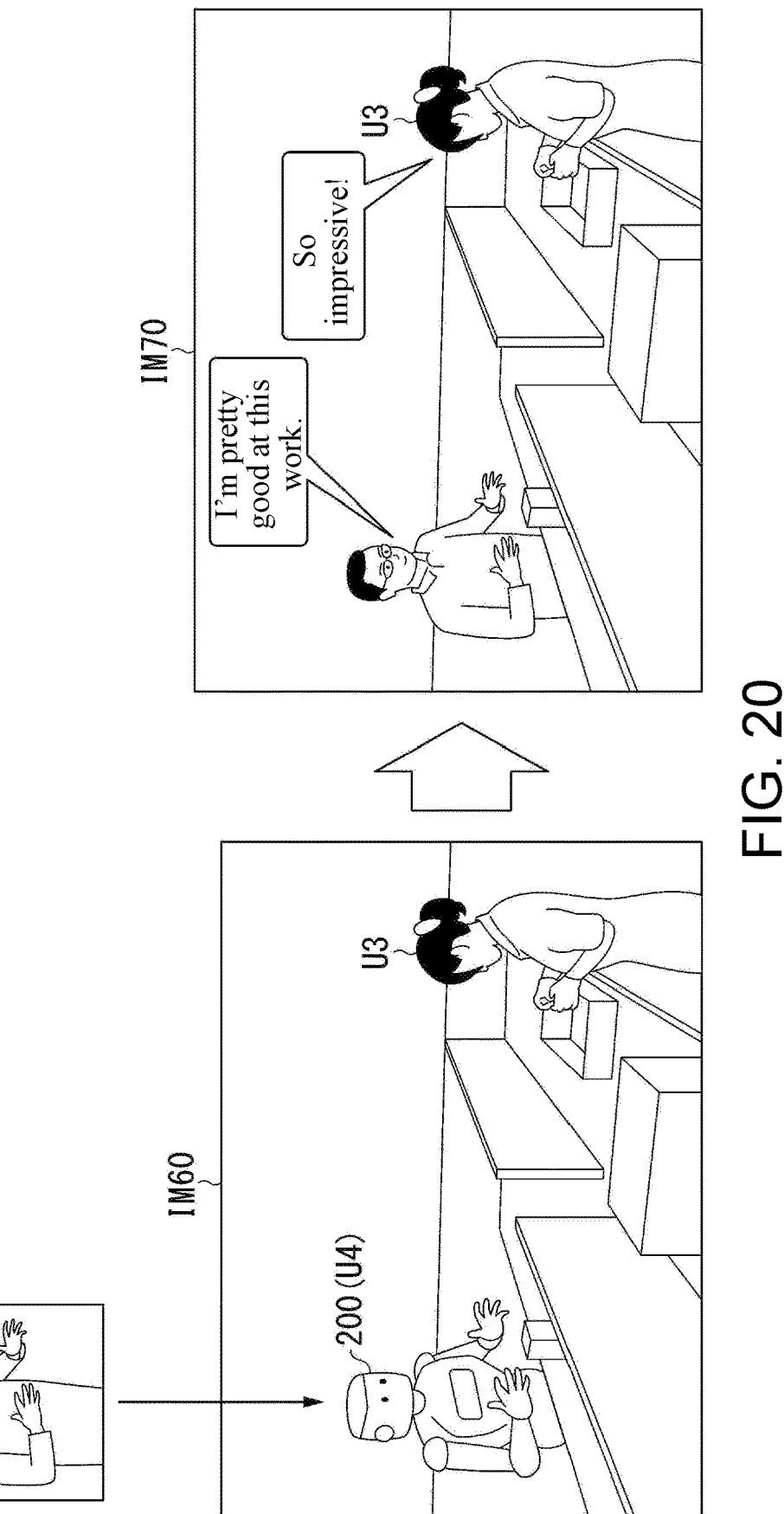
FIG. 20 is a view for illustrating superimposing image information of a user on another robot device 200 (U4) present in the surroundings.

FIG. 20 is a view for illustrating superimposing image information of a user on another robot device 200 (U4) present in the surroundings. In the example of FIG. 20, an image IM70 is generated by superimposing an image IM (U4) of the user U4 operating the another robot device 200 (U4) on the image IM60. For example, the management server 100 detects an orientation of the another robot device 200 (U4) included in the image captured by the camera 206 of the robot device 200, and acquires image information captured at an angle corresponding to the detected angle from the user information 171. Further, the acquired image is enlarged or reduced and superimposed corresponding to the size of the another robot device 200 (U4) included in the image IM60 so as to hide the another robot device 200 (U4). Further, according to the action (motion of arms and legs) of the another robot device 200 (U4), the management server 100 partially moves the position of the arm or leg of the image of the user U4 to display information related to the action of the operator. As described above, when the image provided to the operation terminal 300 includes another robot device 200, by superimposing and displaying an image representing a user who operates the another robot device 200 while moving the image according to an action, it is possible to make one feel as if the operator is present and moving at that position, and even during remote operation, it is possible to work while learning about the state of operators in the surroundings without feeling lonely. Further, since information related to the action is displayed, it is possible to determine a busy state and a free state based on the image.

Further, the management server 100 acquires not only an image but also voices of a conversation and the like in the surroundings as shown in FIG. 20, and provides the acquired voices to the operation terminal 300. In this case, the management server 100 performs, for example, sound image localization on the voice acquired from the operation terminal which operates the another robot device 200 (U4) to the arrangement location of the another robot device 200 (U4) and outputs the voice. Further, the voice of the operator U3 is an outputted voice that is inputted by the microphone 208. Accordingly, since the operator can hear the voice according to the arrangement location, it is possible to make the operator more realistically feel as if he/she is in the work space. Further, in the real space, since the work performed by the another robot device 200 (U4) or the operator can be recognized from the image, the user can manage his/her work and progress while directly checking the work status of other operators.

Further, when the visual line direction (face orientation) of the robot device changes, the management server 100 provides information such as the image or the voice described above also to other robot devices arranged in seats in the changed direction. Accordingly, it is possible to display the operator who operates the robot device 200 present in the surroundings when not only turning to the left and right but also turning back.

Figure 21:
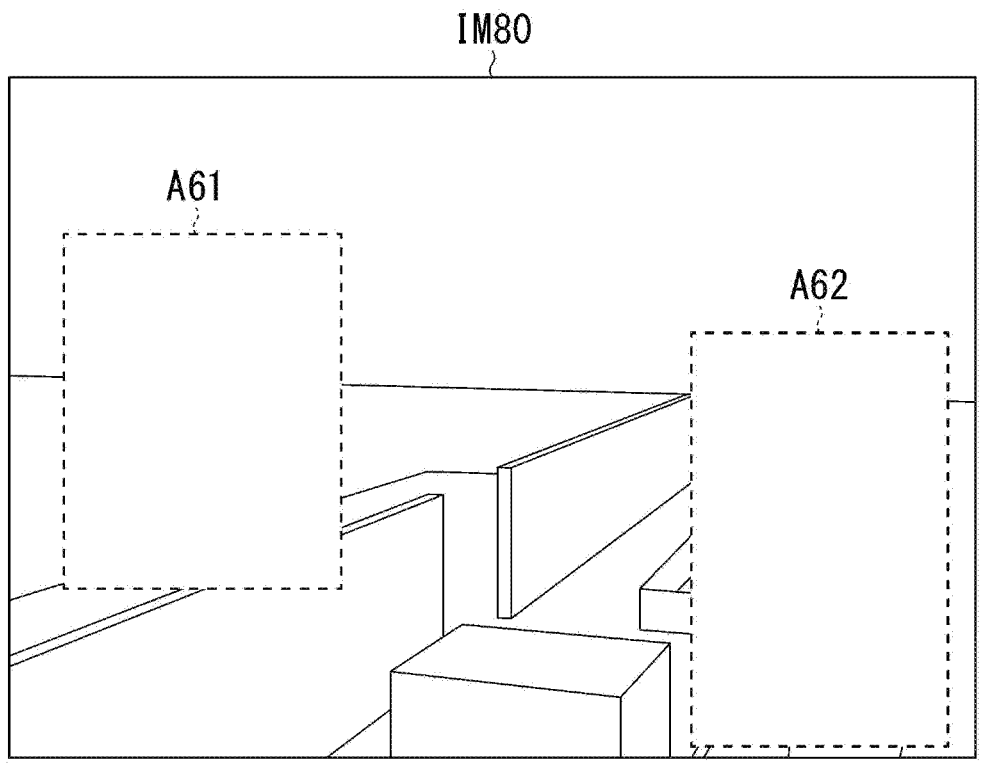
FIG. 21 is a view showing an example of an image IM80 in which images of the operator and the robot device 200 present in the surroundings are deleted.

Further, if images or voices of other operators are provided during work, such information may be annoying. Therefore, the management server 100 may provide an image in which the operators or robot devices present in the surroundings are deleted upon request from the operation terminal 300. FIG. 21 is a view showing an example of an image IM80 in which images of the operator and the robot device 200 present in the surroundings are deleted. In the example of FIG. 21, the image IM80 in which the another robot device 200 and the operator displayed in areas A61 and A62 are deleted is displayed. In the deleted areas A61 and A62, a background image captured when the another robot device 200 and the operator are not present may be superimposed, or another mask image may be displayed. Further, the management server 100 may delete only other robot devices or only a specific user (operator) according to the user's request. In addition to the image, the corresponding voice may be deleted (mute function). Accordingly, it is possible to switch the provided contents of the surrounding status according to the work status and perform the work in an environment of one's preference.

Figure 22:
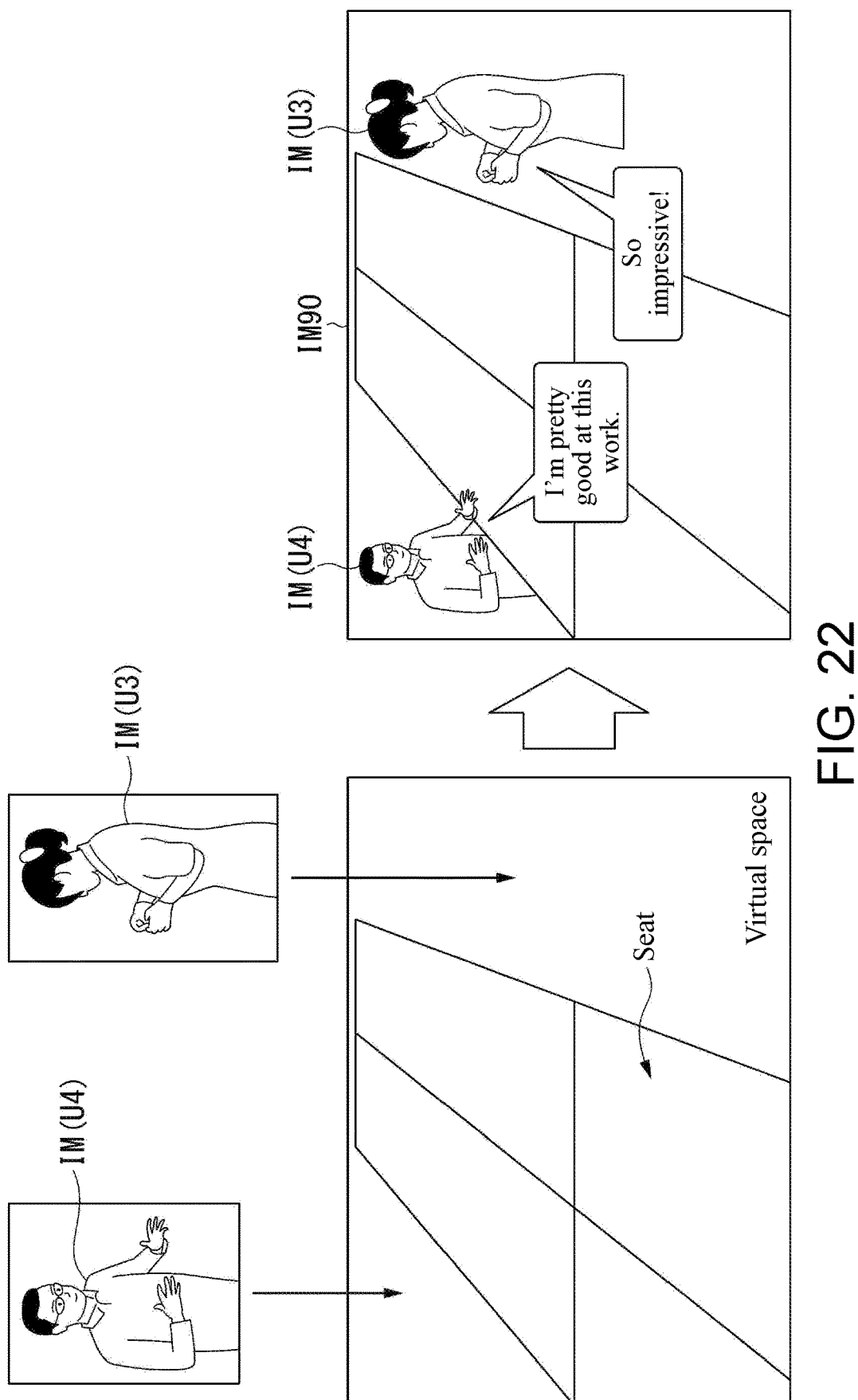
FIG. 22 is a view showing an example in which information based on information representing an operator and information related to an action is arranged in a virtual space.

In an embodiment, when seats are assigned in advance in a virtual section, the arrangement location of the operator may be managed in association with the assigned seat information, and an image showing the managed virtual space may be outputted to the operation terminal. FIG. 22 is a view showing an example in which information based on information representing an operator and information related to an action is arranged in a virtual space. As shown in FIG. 22, in an image showing positions of seats in a virtual space, the management server 100 generates an image IM90 by superimposing an image IM(U3) and an image IM(U4) representing the operators U3 and U4 at positions associated with positions of the images indicating the respective used seats. Further, the management server 100 outputs, from the operation terminal 300, information obtained by performing sound image localization on the voice of each operator at the positions where the image IM(U3) and the image IM(U4) are superimposed. Accordingly, it is possible to provide information which makes one feel as if he/she is in the work space even in the virtual space.

[Processing Sequence]

Figure 23:
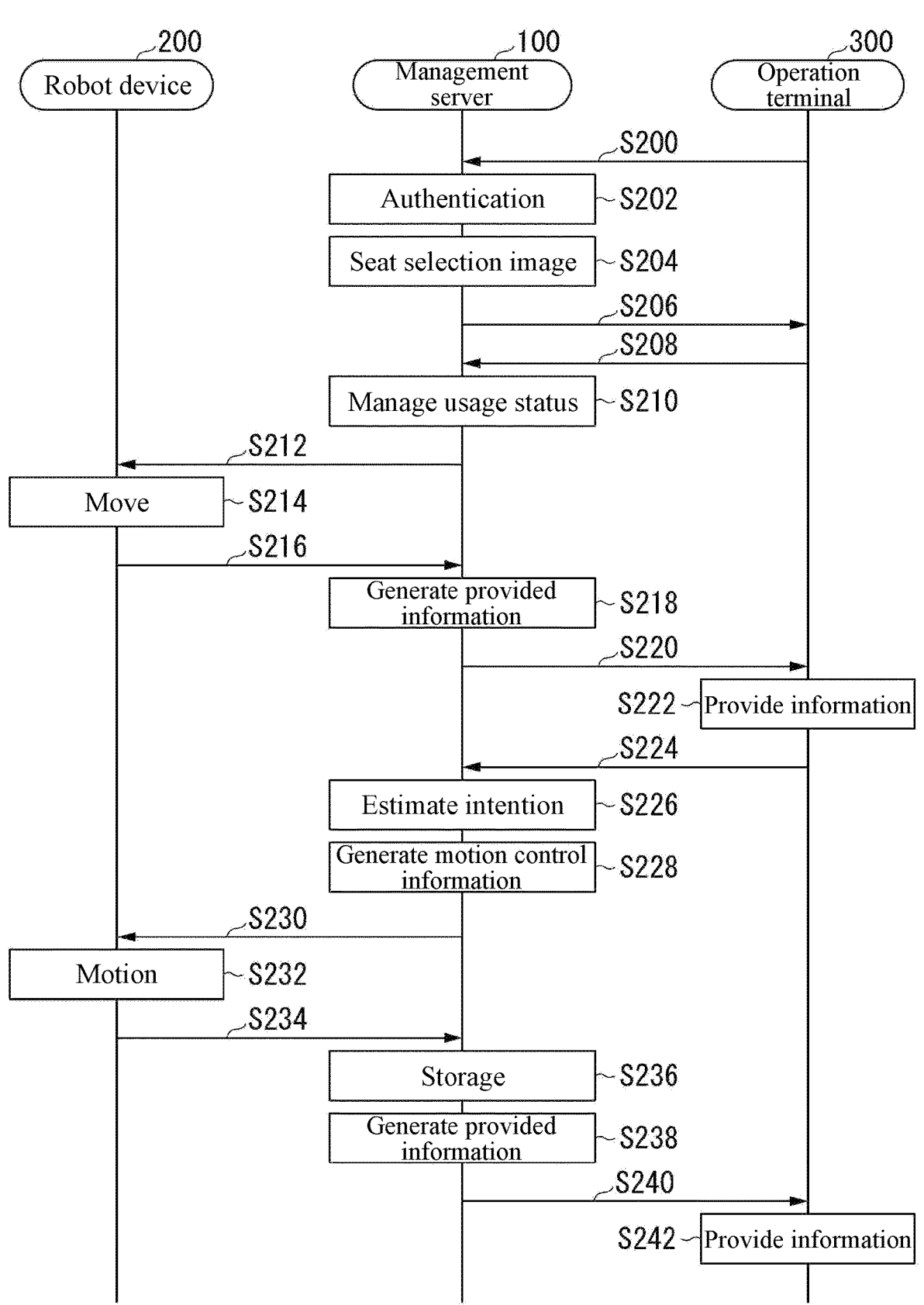
FIG. 23 is a sequence diagram for illustrating a processing executed by the remote operation system 1 according to an embodiment.

Next, a processing executed by the remote operation system according to an embodiment will be described with reference to a sequence diagram. FIG. 23 is a sequence diagram for illustrating the processing executed by the remote operation system 1 according to an embodiment. In the example of FIG. 23, the management server 100, the robot device 200, and the operation terminal 300 will be used for description.

The operation terminal 300 accesses the management server 100 to remotely operate the robot device 200 (step S200). The management server 100 performs an authentication process of whether the remote operation system 1 may be used based on authentication information inputted from the operation terminal 300 (step S202). The following describes the case where the use is permitted by authentication. When the use is permitted, the management server 100 generates an image (e.g., an image IM50) for selecting a seat (step S204). The generated image IM50 is displayed on the operation terminal 300 (step S206). Further, the management server 100 acquires seat information selected by the operation terminal 300 (step S208) and manages a usage status (step S210). Further, the management server 100 generates motion control information of moving to the selected seat, and transmits the generated motion control information to the robot device 200 (step S212).

The robot device 200 moves to a position of the selected seat based on the motion control information from the management server 100 (step S214). A detection result of the sensor, an image captured by the camera, etc. of the robot device 200 are outputted to the management server 100 (step S216).

The management server 100 acquires the information transmitted from the robot device 200 and generates information (provided information) to be provided to the operation terminal 300 based on the acquired information (step S218). Then, the management server 100 transmits the generated provided information to the operation terminal 300 (step S220).

The operation terminal 300 receives the provided information transmitted from the management server 100, and outputs the received information from the visual device 320 and the operation device 330 to provide the information (step S222). Next, the operation terminal 300 transmits an operation content related to the robot device 200 to the management server 100 (step S224).

The management server 100 performs intention estimation based on the operation contents obtained from each of the operation terminals 300 (step S226), generates motion control information based on an intention estimation result (step S228), and transmits the generated motion control information to the robot device 200 (step S230).

The robot device 200 performs a motion based on the motion control information (step S232), and transmits information (sensor information) obtained from the sensor, camera images, etc. during the motion or at the end of the motion to the management server 100 (step S234).

The management server 100 stores the received information to the storage part 170 (step S236), generates provided information for transmitting the acquired information to the operation terminal 300 (step S238), and transmits the generated provided information to the operation terminal 300 (step S240). The operation terminal 300 outputs the obtained information and provides the information to the operator (step S242). Afterwards, the processes of steps S224 to S242 are continuously performed until the operation on the robot device 200 is ended.

Hereinafter, another embodiment of a remote operation control system, a remote operation control method, and a program of the disclosure will be described with reference to the drawings. In the drawings used in the following description, the scale of each member may be appropriately changed in order to make each member recognizable.

Figure 24:
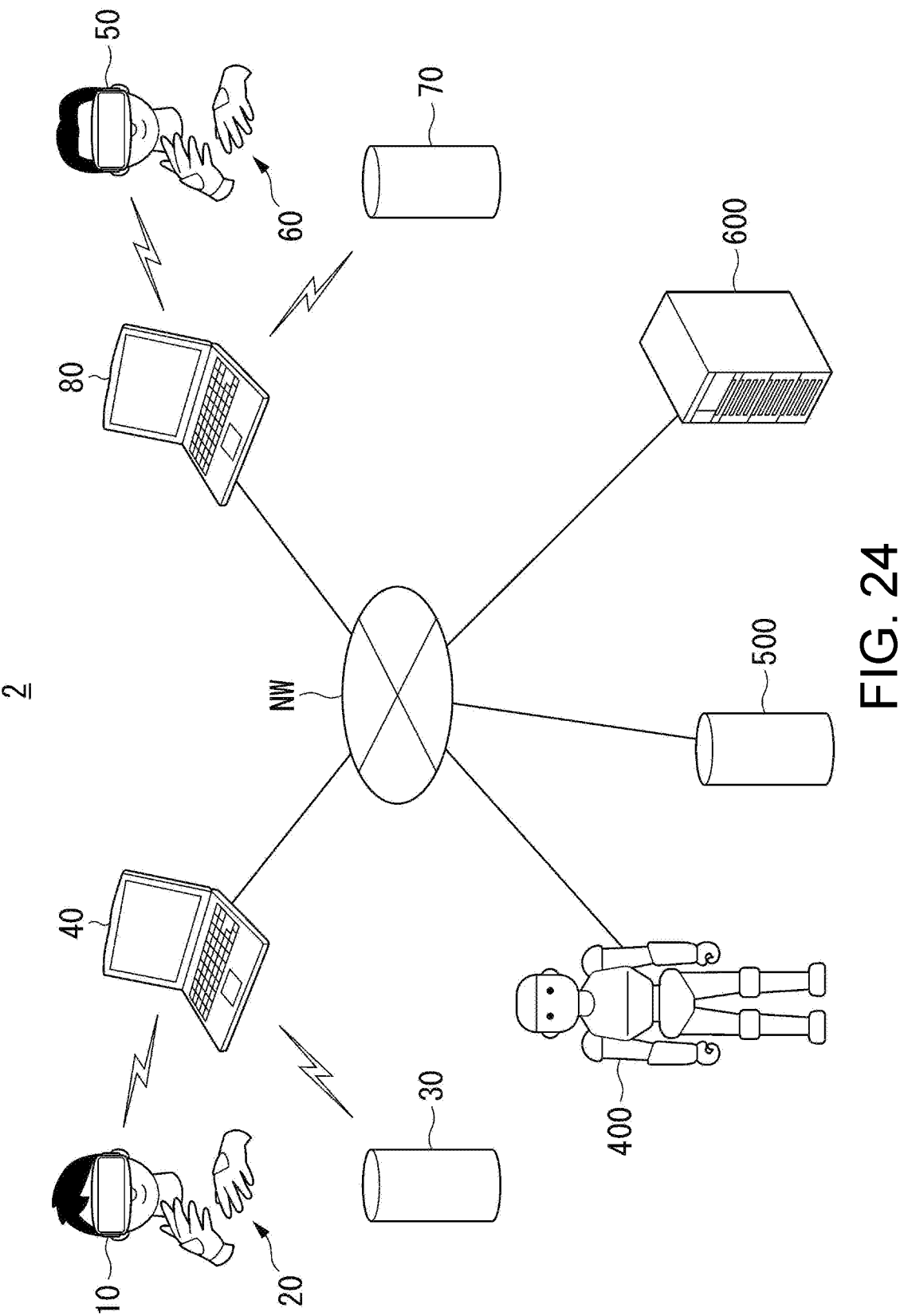
FIG. 24 is a view showing an outline of a remote operation control system according to this embodiment.

FIG. 24 is a view showing an outline of a remote operation control system 2 according to this embodiment. The remote operation control system 2 includes, for example, a first HMD (head-mounted display) 10, a first controller 20, a first environment sensor 30, a first terminal device 40, a second HMD 50, a second controller 60, a second environment sensor 70, a second terminal device 80, a robot 400, a third environment sensor 500, and a robot remote operation control device 600.

For example, the first HMD 10, the first controller 20, and the first environment sensor 30 are connected to the first terminal device 40 via short-range wireless communication. The first terminal device 40 is connected to the robot 400, the third environment sensor 500, and the robot operation control device 600 via a network NW. Further, the second HMD 50, the second controller 60, and the second environment sensor 70 are connected to the second terminal device 80 via, for example, short-range wireless communication. The second terminal device 80 is connected to the robot 400, the third environment sensor 500, and the robot remote operation control device 600 via the network NW. The network NW includes, for example, the Internet, a WAN (wide area network), a LAN (local area network), a provider device, a wireless base station, etc.

The configuration is not limited thereto, and the first terminal device 40 and the second terminal device 80 may be omitted. In this case, the first HMD 10, the first controller 20, the first environment sensor 30, the second HMD 50, the second controller 60, and the second environment sensor 70 may be directly connected to the robot 400, the third environment sensor 500, and the robot remote operation control device 600 via the network NW.

The robot 400, the third environment sensor 500, and the robot remote operation control device 600 are connected via, for example, a wireless or wired communication network. The disclosure is not limited thereto, and the robot 400, the third environment sensor 500, and the robot remote operation control device 600 may be directly connected by wire without going through a communication network.

The first HMD 10 and the first controller 20 are devices equipped by, for example, a novice A (an example of a first operator), and the second HMD 50 and the second controller 60 are devices equipped by, for example, a skilled person B (an example of a second operator). The first controller 20 and the second controller 60 are, for example, tactile data gloves, and are equipped on the operator's hands. The first controller 20 and the second controller 60 detect an orientation, a movement of each finger, a movement of the hand, a movement of the arm, etc. by sensors provided therein, and transmit information (hereinafter referred to as operation information) indicating detection results to the robot remote operation control device 600. The operation information includes information indicating an operation performed by the novice A and information indicating an operation performed by the skilled person B.

For example, the first environment sensor 30 and the first terminal device 40 are installed in a work space where the novice A works. The first environment sensor 30 is, for example, a dedicated device including a communication function, an RBG camera, and a depth sensor. The first environment sensor 30 is installed at a position where the work of the novice A can be photographed and detected. The first terminal device 40 is, for example, a tablet terminal or a personal computer having a communication function. The disclosure is not limited thereto, and the first environment sensor 30 may be attached to, for example, the first terminal device 40, or the first environment sensor 30 may be configured to have the function of the first terminal device 40.

For example, the second environment sensor 70 and the second terminal device 80 are installed in a work space where the skilled person B works. The second environment sensor 70 is, for example, a dedicated device including a communication function, an RBG camera, and a depth sensor. The second environment sensor 70 is installed at a position where the work of the skilled person B can be photographed and detected. The second terminal device 80 is, for example, a tablet terminal or a personal computer having a communication function. The disclosure is not limited thereto, and the second environment sensor 70 may be attached to, for example, the second terminal device 80, or the second environment sensor 70 may be configured to have the function of the second terminal device 80.

The third environment sensor 500 is, for example, a dedicated device including a communication function, an RBG camera, and a depth sensor, and is installed at a position where the work of the robot 400 can be photographed and detected. The third environment sensor 500 may be provided in the robot 400 or may be attached to the robot 400.

For example, the novice A remotely operates the robot 400 by moving the hand or finger equipped with the first controller 20 while looking at the image displayed on the first HMD 10. Further, the skilled person B remotely operates the robot 400 by moving the hand or finger equipped with the second controller 60 while looking at the image displayed on the second HMD 50. In this embodiment, the novice A is an operator who remotely operates the robot 400 to perform a work of creating an object such as a craft product that requires skill for production. The skilled person B is an instructor who gives guidance such as letting the novice A feel an example created by the skilled person B and modifying the work created by the novice A by remotely operating the robot 400 during, before, or after the operation of the novice A. In remote operation, the novice A and the skilled person B cannot directly see the motion of the robot 400, but can indirectly see an image of the robot 400 side with the first HMD10 and the second HMD50.

The robot 400 is an example of a remote operation target which is an object of reality. The remote operation target is not limited thereto, and may be a virtual object in a virtual world. For example, a robot or an avatar of a virtual object which appears in a virtual world such as a two-dimensional or three-dimensional animation may be a remote operation target. Hereinafter, an example in which the remote operation target is the robot 400 will be described. In the example in which the remote operation target is a virtual object, the processing for causing the robot 400 to move may be read as a processing for causing the virtual object to move in the virtual world. In other words, the robot remote operation control device 600 may include a configuration such as an image processing part for causing a virtual object to move in a virtual world, and the first controller 20 and the second controller 60 may include a configuration for operating the virtual object in the virtual world.

The robot remote operation control device 600 feeds back a motion of the robot 400 remotely operated by the novice A or the skilled person B to the first controller 20 or the second controller 60. Accordingly, the first controller 20 reproduces the motion of the robot 400 according to the remote operation of the skilled person B, and the second controller 60 reproduces the motion of the robot 400 according to the remote operation of the novice A. For example, in a scene where the skilled person B instructs to apply more force when the novice A performs a remote operation of deforming an operation object, the robot 400 executes a motion of applying more force to the operation object when the robot arm is attached to the operation object of the robot 400 according to the remote operation of the skilled person B. By feeding back such a motion executed by the robot 400 to the first controller 20 or the second controller 60, the content of the remote operation by the skilled person B can be fed back to the novice A, and the novice A can be given a feeling or a sense as if the skilled person B is directly instructing the work of the novice A with his/her hands.

Accordingly, the skilled person B can feel the operation of the novice A via the second controller 60, and the skilled person B can input an operation for modifying the operation of the novice A to the second controller 60. Therefore, the novice A feels the operation of the skilled person B via the first controller 20, and can remotely operate the robot 400 under the guidance of the skilled person B while being away from the skilled person B or the robot 400.

Although the details will be described later, the robot remote operation control device 600 may feed back a feeling or a sense obtained on the robot 400 side to the novice A or the skilled person B.

Figure 25:
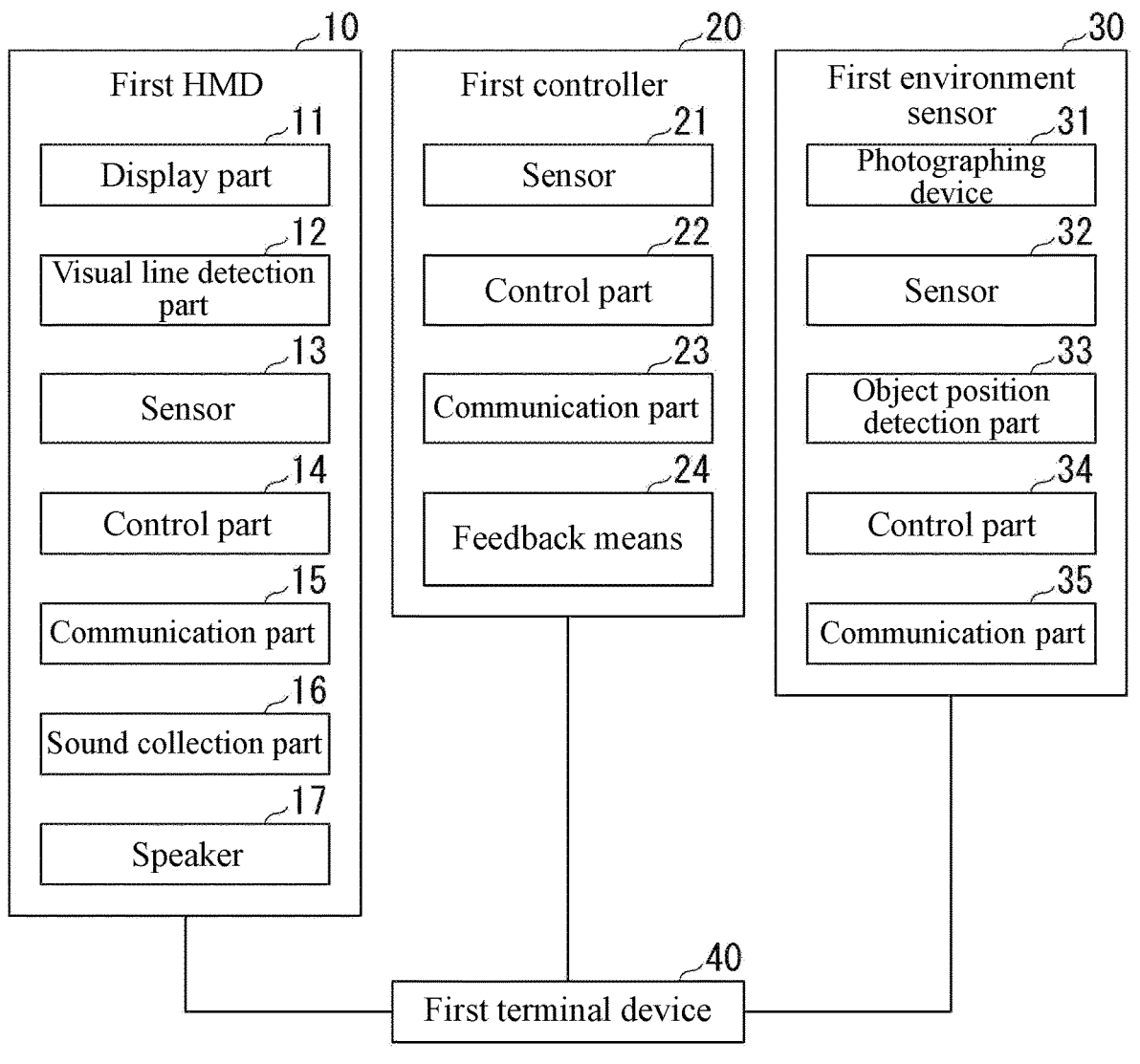
FIG. 25 is a functional block diagram of configurations installed in a work space where a first operator works.

FIG. 25 is a functional block diagram of configurations installed in a work space where the first operator works. Each configuration installed in a work space where the skilled person B works also has the same function, and detailed descriptions thereof will be omitted.

<HMD>

The first HMD 10 includes, for example, a display part 11, a visual line detection part 12, a sensor 13, a control part 14, a communication part 15, a sound collection part 16, and a speaker 17. The first HMD 10 displays an image for remotely operating the robot 400 based on an image data received from the robot remote operation control device 600. For example, the first HMD 10 displays a state image of the robot 400. The state image of the robot 400 is an image showing a motion of the robot 400 and includes, for example, an image of the hand of the robot 400.

The display part 11 is, for example, an LCD or an organic EL display device. The visual line detection part 12 detects a movement of a visual line of the novice A. The visual line detection part 12 may include a visual line detector which detects visual line information of the novice A. The sensor 13 is, for example, an acceleration sensor, a gyroscope, etc. The sensor 13 detects a movement or an inclination of the head part of the novice A.

For example, the control part 14 causes the display part 11, for example, to display a state image of the robot based on the image data transmitted by the robot remote operation control device 600.

For example, the control part 14 generates information (hereinafter referred to as visual line information) indicating the movement of the visual line of the novice A based on a detection result of the visual line detection part 12. Further, the control part 14 generates information (hereinafter referred to as head motion information) indicating the movement or the inclination of the head part of the novice A based on a detection result of the sensor 13. The visual line information and the head motion information are information included in an operator sensor value to be described later. The control part 14 transmits the generated visual line information and head motion information to the robot remote operation control device 600 via the first terminal device 40.

The communication part 15 is a wireless module for using Bluetooth (registered trademark) or the like, and has an antenna and a transmission/reception device. The communication part 15 communicates with the first terminal device 40 via short-range wireless communication according to the control of the control part 14. The disclosure is not limited thereto, and the communication part 15 may include a communication interface such as an NIC, and may communicate with the first terminal device 40, the robot 400, or the robot remote operation control device 600 via the network NW.

The sound collection part 16 is, for example, a microphone, and outputs a collected acoustic signal to the control part 14. Using the communication part 15, the control part 14 transmits the acoustic signal to the robot remote operation control device 600. When receiving voice information from the robot remote operation control device 600, the control part 14 outputs the voice information from the speaker 17. When acquiring an acoustic signal of a conversation of the novice A via the first HMD 10, for example, the robot remote operation control device 600 provides a voice signal of the conversation of the novice A to the skilled person B via the second HMD 50. Further, when acquiring an acoustic signal of a conversation of the skilled person B via the second HMD 50, for example, the robot remote operation control device 600 provides a voice signal of the conversation of the skilled person B to the novice A via the first HMD 10.

<Controller>

The first controller 20 includes, for example, a sensor 21, a control part 22, a communication part 23, and a feedback means 24.

The sensor 21 is, for example, an acceleration sensor, a gyroscope sensor, a magnetic force sensor, etc. The control part 22 tracks a movement of each finger, for example, based on detection results detected by a plurality of types of sensors included in the sensor 21. Further, based on the detection result of the sensor 21, the control part 22 acquires information (hereinafter referred to as operator arm information) indicating a posture or a position of the operator's arm part, such as an orientation, a movement of each finger, and a movement of the hand. The operator arm information includes, for example, information over the entire human arm such as hand position/posture information, finger angle information of each finger, elbow position/posture information, and movement tracking information of each part. The operator arm information is an example of operation information. The control part 22 transmits the acquired operator arm information to the robot remote operation control device 600 via the first terminal device 40.

The communication part 23 is a wireless module for using Bluetooth (registered trademark) or the like, and has an antenna and a transmission/reception device. The communication part 23 communicates with the first terminal device 40 via short-range wireless communication according to the control of the control part 22. The disclosure is not limited thereto, and the communication part 23 may include a communication interface such as an NIC, and may communicate with the first terminal device 40, the robot 400, or the robot remote operation control device 600 via the network NW.

The feedback means 24 feeds back feedback information (pressure, temperature, etc.) from an end effector of the robot 400 to the operator according to the control of the control part 22.

The feedback means 24 includes, for example, a means for reproducing a feeling or a sense obtained on the robot 400 side and a means for reproducing a motion of the robot 400. The means for reproducing a feeling or a sense obtained on the robot 400 side is, for example, a means for reproducing a sense or a feeling when the robot hand is in contact with an object or the like while the robot 400 is working. The means for reproducing a motion of the robot 400 is, for example, a means for reproducing a direction or a speed in which the robot arm of the robot 400 moves.

For example, the feedback means 24 includes a means (not shown) for applying vibration, a means (not shown) for applying air pressure, a means (not shown) for restraining a movement of the hand, a means (not shown) for enabling feeling a temperature, a means (not shown) for enabling feeling firmness or softness, etc. According to the control of the control part 22, the feedback means 24 reproduces a feeling or a sense obtained on the robot 400 side fed back from the robot 400, or a motion of the robot 400. Accordingly, the first controller 20 can transmit the remote operation of the novice A or the skilled person B to the novice A.

The control part 22 controls the feedback means 24 based on the feedback information received from the robot remote operation control device 600. The details of the feedback information will be described later.

<Environment Sensor>

The first environment sensor 30 includes, for example, a photographing device 31, a sensor 32, an object position detection part 33, a control part 34, and a communication part 35. The second environment sensor 70 and the third environment sensor 500 also have the same functions, and detailed descriptions thereof will be omitted.

The photographing device 31 is, for example, an RGB camera, and the sensor 32 is, for example, a depth sensor. The photographing device 31 and the sensor 32 may also be distance sensors. In the first environment sensor 30, the positional relationship between the photographing device 31 and the sensor 32 is known.

Based on an image captured by the photographing device 31 and a detection result detected by the sensor 32, the object position detection part 33 is a three-dimensional position, a size, a shape, etc. of a target object in the captured image according to a known method. For example, referring to a pattern matching model or the like stored in the object position detection part 33, the object position detection part 33 performs image processing (edge detection, binarization processing, feature amount extraction, image enhancement processing, image extraction, pattern matching processing, etc.) on the image captured by the photographing device 31 to estimate a position of the object. When a plurality of objects are detected from the captured image, the object position detection part 33 detects the position for each object.

The control part 34 transmits information indicating the position of the object detected by the object position detection part 33, an image captured by the photographing device 31, and a sensor value detected by the sensor 32 to the robot remote operation control device 600 via the first terminal device 40. The information indicating the position of the object, the image captured by the photographing device 31, and the sensor value detected by the sensor 32 are included in an environment sensor value to be described later.

The communication part 35 is a wireless module for using Bluetooth (registered trademark) or the like, and has an antenna and a transmission/reception device. The communication part 35 communicates with the first terminal device 40 via short-range wireless communication. The disclosure is not limited thereto, and the communication part 35 may include a communication interface such as an NIC and may communicate with the first terminal device 40, the robot 400, or the robot remote operation control device 600 via the network NW.

The first environment sensor 30 may be a motion capture device, position information of the object may be detected by motion capture, and a GPS receiving device (not shown) including a position information transmission part may be attached to the object. In this case, the GPS receiving device may transmit the position information to the robot remote operation control device 600.

Configuration Example of Robot

Figure 26:
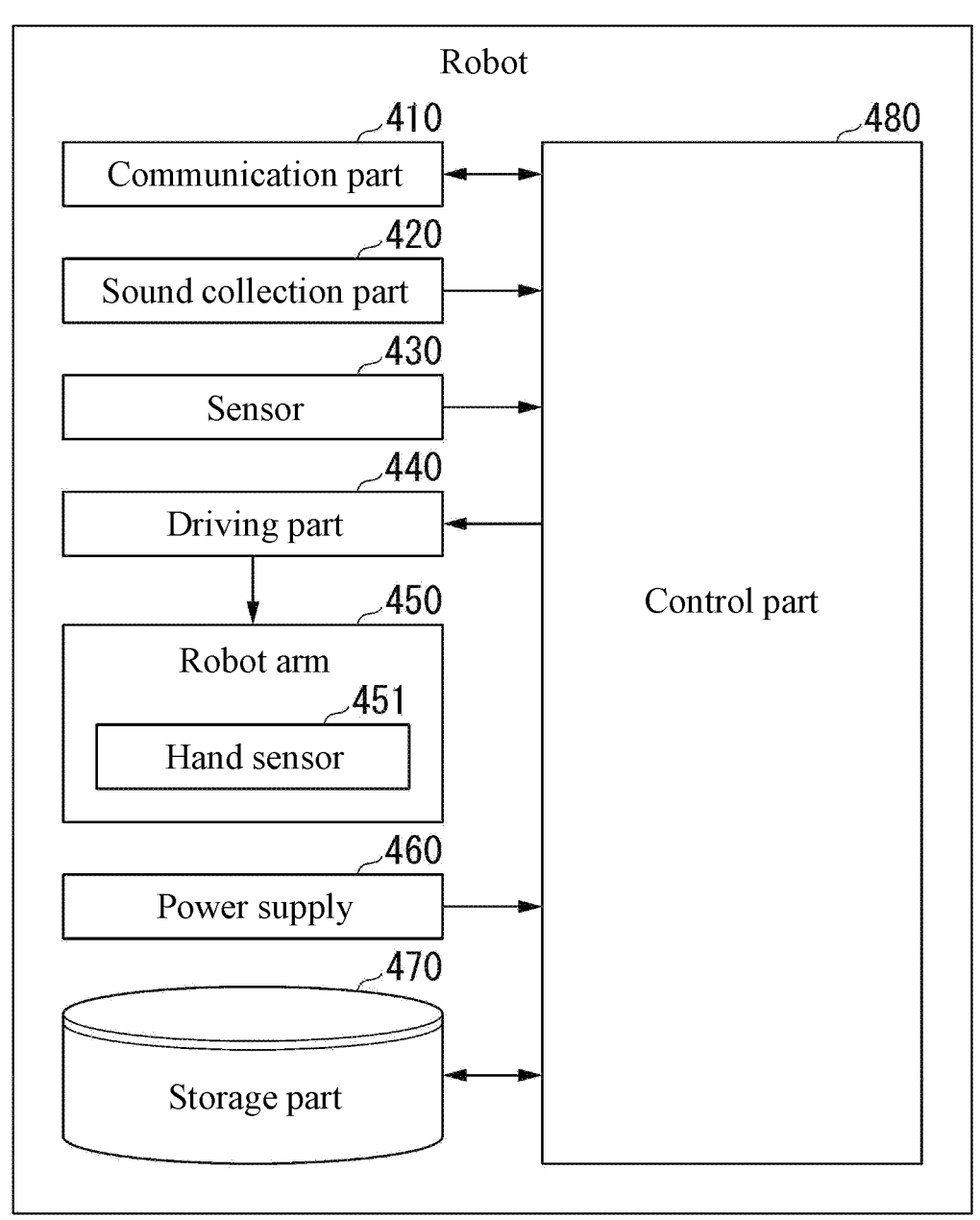
FIG. 26 is a functional block diagram of a robot.

FIG. 26 is a functional block diagram of the robot 400. The robot 400 includes, for example, a communication part 410, a sound collection part 420, a sensor 430, a driving part 440, a robot arm 450, a power supply 460, a storage part 470, and a control part 480.

The communication part 410 includes, for example, a communication interface such as an NIC. According to the control of the control part 480, the communication part 410 is connected to the first terminal device 40, the second terminal device 80, the third environment sensor 500, and the robot remote operation control device 600 via the network NW. The communication part 410 is a wireless module for using Bluetooth (registered trademark), has an antenna and a transmission/reception device, and may communicate with the third environment sensor 500 and the robot remote operation control device 600 via short-range wireless communication.

The sound collection part 420 is, for example, a microphone array including a plurality of microphones. The sound collection part 420 outputs a collected acoustic signal to the control part 480. The sound collection part 420 may have a voice recognition processing function. In this case, the sound collection part 420 outputs a voice recognition result to the control part 480.

The sensor 430 is, for example, an acceleration sensor, a gyroscope sensor, a magnetic force sensor, a joint encoder of each joint, etc. For example, the sensor 430 is attached to each joint, the head part, etc. of the robot 400. The sensor 430 outputs information indicating a detected detection result to the control part 480.

The driving part 440 drives each part (arms, fingers, legs, head, torso, waist, etc.) of the robot 400 according to the control by the control part 480. The driving part 440 drives, for example, the robot arm 450. The robot arm 450 includes, for example, an actuator, a gear, an artificial muscle, etc. Further, the robot arm 450 includes a hand sensor 451. The hand sensor 451 includes, for example, a means (not shown) for sensing a temperature, a means (not shown) for sensing firmness or softness, etc.

The power supply 460 supplies electric power to each part of the robot 400. The power supply 460 may include, for example, a rechargeable battery or a charging circuit.

The storage part 470 is realized by, for example, a RAM (random access memory), a ROM (read only memory), an HDD (hard disk drive), etc. The storage part 470 stores a program executed by a processor and also stores various information such as motion parameters for causing the robot 400 to move.

The control part 480 executes control for causing the robot 400 to move according to remote operation and executes control for causing the robot 400 to move without remote operation. In the former case, the control part 480 causes the robot 400 to move according to the control information generated by the robot remote operation control device 600.

In the latter case, the control part 480 performs voice recognition processing (speech section detection, sound source separation, sound source localization, noise suppression, sound source identification, etc.) on an acoustic signal collected by the sound collection part 420. When the result of voice recognition includes a motion instruction for the robot 400, the control part 480 controls the motion of the robot 400 based on the voice-based motion instruction. Further, the control part 480 may perform image processing (edge detection, binarization processing, feature amount extraction, image enhancement processing, image extraction, pattern matching processing, etc.) on an image captured by the third environment sensor 500 or the like based on information stored in the storage part 470, and control the motion of the robot 400 based on the voice recognition result and the image processing result.

Configuration Example of Robot Remote Operation Control Device 600

Figure 27:
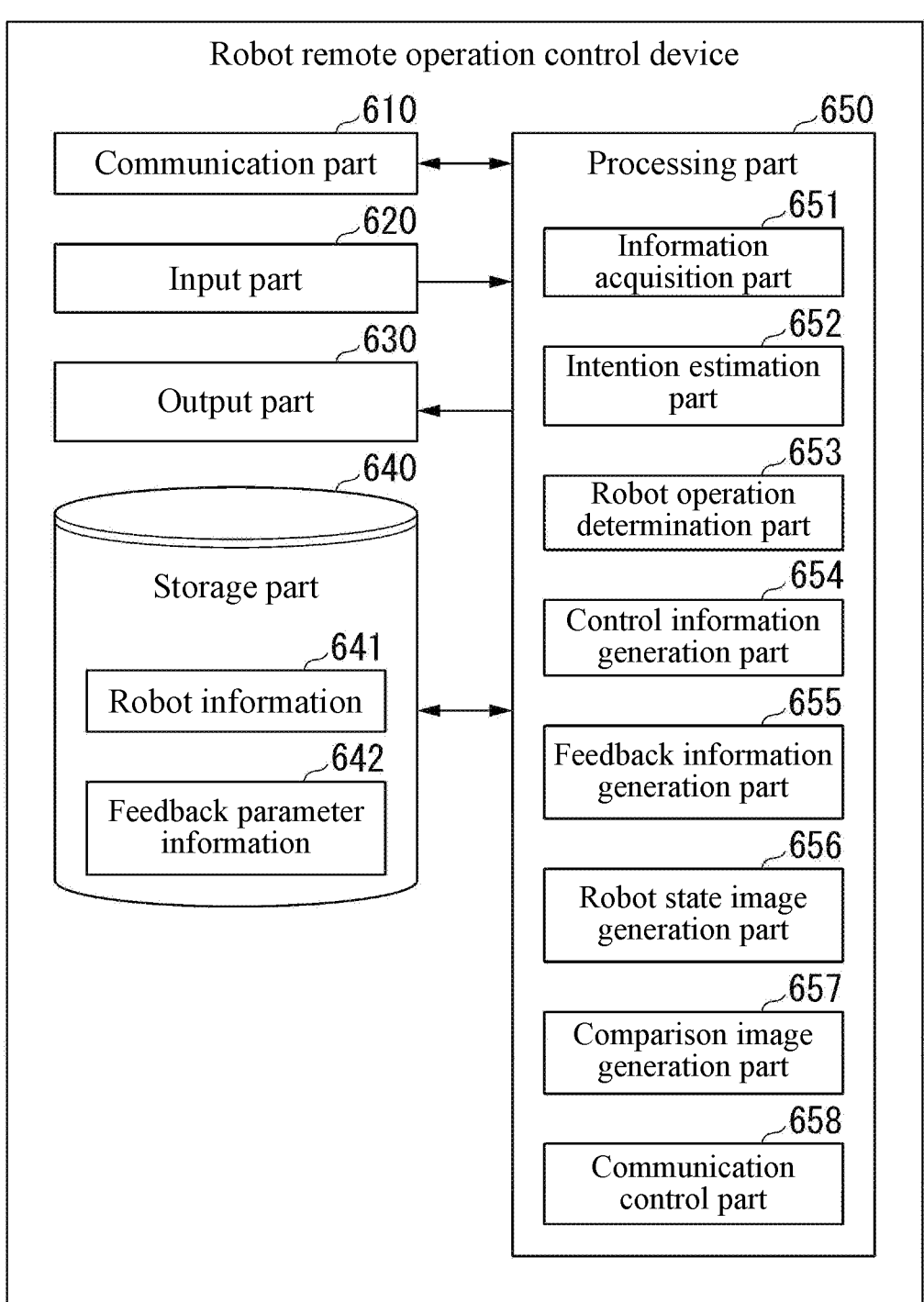
FIG. 27 is a functional block diagram of a robot remote operation control device.

FIG. 27 is a functional block diagram of the robot remote operation control device 600. The robot remote operation control device 600 includes, for example, a communication part 610, an input part 620, an output part 630, a storage part 640, and a processing part 650.

The communication part 610 includes, for example, a communication interface such as an NIC. According to the control by the processing part 650, the communication part 610 communicates with the first terminal device 40, the second terminal device 80, the robot 400, and the third environment sensor 500 via the network NW.

The input part 620 includes, for example, a part or all of various keys, buttons, dial switches, mice, etc. The output part 630 includes, for example, an LCD, an organic EL display device, a speaker, a projector, etc. The storage part 640 is realized by, for example, a RAM, a ROM, an HDD, etc. The storage part 640 stores a program executed by a processor, and also stores robot information 641, feedback parameter information 642, etc. Details of each information will be described later.

The processing part 650 includes, for example, an information acquisition part 651, an intention estimation part 652, a robot operation determination part 653, a control information generation part 654, a feedback information generation part 655, a robot state image generation part 656, a comparison image generation part 657, and a communication control part 658. A part or all of these functional parts are realized by, for example, executing a program (software) by a processor such as a CPU (central processing unit) or a GPU (graphics processing unit). Further, a part or all of these components may be realized by hardware (circuit part; including a circuitry) such as an LSI (large scale integration), an ASIC (application specific integrated circuit), an FPGA (field-programmable gate array), etc., or may be realized by collaboration of software and hardware. The program may be stored in the storage part 640 of the robot remote operation control device 600 in advance, or the program may be stored in a removable storage medium such as a DVD or a CD-ROM and installed to the storage part 640 by attaching the storage medium to a drive device.

For example, the information acquisition part 651 acquires first operation information from the first terminal device 40 via the network NW. The first operation information is information indicating an operation inputted by the novice A via the first controller 20 which receives an operation on the robot 400 (i.e., the remote operation target). Further, the information acquisition part 651 acquires second operation information from the second terminal device 80 via the network NW. The second operation information is information indicating an operation inputted by the skilled person B via the second controller 60 which receives an operation on the robot 400 (i.e., the remote operation target). The first operation information and the second operation information include, for example, operator arm information and the like.

Further, the information acquisition part 651 acquires first operator sensor value information from the first terminal device 40 via the network NW. The first operator sensor value information is information indicating a detection result of detecting a state change of the novice A (i.e., the first operator) by the sensor, and includes, for example, information indicating the detection result of the sensor mounted on the first HMD 10 or the first controller 20. Further, the information acquisition part 651 acquires second operator sensor value information from the second terminal device 80 via the network NW. The second operator sensor value information is information indicating a detection result of detecting a state change of the skilled person B (i.e., the second operator) by the sensor, and includes, for example, information indicating the detection result of the sensor mounted on the second HMD 50 or the second controller 60. The first operator sensor value information and the second operator sensor value information include, for example, visual line information, head motion information, etc. detected by the first HMD 10 or the second HMD 50.

Further, the information acquisition part 651 acquires first environment sensor value information from the first terminal device 40 via the network NW. The first environment sensor value information is information indicating a detection result of detecting, by the sensor, an environment change of the surroundings in which the novice A (i.e., the first operator) is remotely operating the robot 400, and includes, for example, information indicating the detection result of the sensor mounted in the first environment sensor 30. Further, the information acquisition part 651 acquires second environment sensor value information from the second terminal device 80 via the network NW. The second environment sensor value information is information indicating a detection result of detecting, by the sensor, an environment change of the surroundings in which the skilled person B (i.e., the second operator) is remotely operating the robot 400, and includes, for example, information indicating the detection result of the sensor mounted in the second environment sensor 70. Further, the information acquisition part 651 acquires third environment sensor value information from the third environment sensor 500 via the network NW. The third environment sensor value information is information indicating the detection result of detecting, by the sensor, an environmental change of the surroundings of the robot 400 being remotely operated by the first operator, the second operator, etc., and includes, for example, information indicating the detection result of the sensor mounted in the third environment sensor 500. The first environment sensor value information, the second environment sensor value information, and the third environment sensor value information include, for example, object position information, an image captured by the photographing device 31, a sensor value detected by the sensor 32, etc.

The intention estimation part 652 estimates a motion intention of the operator based on information acquired by the information acquisition part 651. For example, the intention estimation part 652 estimates a motion intention of the operator using at least one of the visual line information, the operator arm information, and the head motion information. The intention estimation part 652 may also estimate the intention by using the environment sensor values.

Further, the intention estimation part 652 may estimate an intention of a motion which the operator is trying to perform by inputting the operator sensor value and the visual line information acquired by the information acquisition part 651 into a trained model. By generating control information based on such estimation results and controlling the robot 400 based on the generated control information, the robot 400 can execute accurate alignment even when the operator does not perform a remote operation of accurate alignment. Therefore, it is possible to cause the robot 400 to perform the work with high accuracy. The trained model is, for example, data in which operator sensor values and visual line information are inputted in advance, and a work that the operator is going to perform is learned as teacher data.

The robot operation determination part 653 determines an operation method for an operation object operated by the robot 400 based on a motion intention estimated by the intention estimation part 652, a detection result detected by the sensor 430 of the robot 400, and a result of image processing on an image captured by the photographing device of the third environment sensor 500. The operation method for the operation object includes, for example, various operation methods such as a gripping method for gripping the operation object, a movement method for moving the operation object, and a deformation method for deforming the operation object.

Referring to the storage part 640, the control information generation part 654 generates control information for causing the robot 400 (the remote operation target) to move based on the first operation information or the second operation information acquired by the information acquisition part 651. For example, the control information generation part 654 refers to the robot information 641, acquires motion parameters corresponding to an operation performed by the operator, and generates control information for causing the robot 400 to move based on the acquired motion parameters. The robot information 651 is, for example, information associated with motion parameters corresponding to operation amounts.

The control information generation part 654 may generate control information for causing the robot 400 to move based on the operation method determined by the robot operation determination part 653. Accordingly, the intention of the operator can be estimated, and the robot 400 can be caused to perform a motion closer to the intention of the operator based on the estimation result.

Further, the control information generation part 654 may generate control information for causing the robot 400 to move based on the first operator sensor information or the first environment sensor value information in addition to the first operation information. Further, the control information generation part 654 generate control information for causing the robot 400 to move based on the second operator sensor information or the second environment sensor value information in addition to the second operation information.

Further, the control information generation part 654 may generate control information for causing the robot 400 to move based on a result of synthesizing the content of the remote operation performed by the novice A (i.e., the first operator) and the content of the remote operation performed by the skilled person B (i.e., the second operator). For example, the control information generation part 654 generates control information based on a total value of a motion parameter corresponding to the first operation information and a motion parameter corresponding to the second operation information. The disclosure is not limited thereto, and the control information generation part 654 may generate control information based on a value obtained by subtracting the motion parameter corresponding to the second operation information from the motion parameter corresponding to the first operation information. The method of synthesizing the content of the remote operation performed by the novice A (i.e., the first operator) and the content of the remote operation performed by the skilled person B (i.e., the second operator) is not limited thereto, and various existing methods may be adopted. Accordingly, it is possible to cause the robot 400 to move according to remote operation performed by two or more operators. Therefore, the work of the novice A can be instructed by the skilled person B in real time.

Further, when synthesizing the content of the remote operation performed by the first operator and the content of the remote operation performed by the second operator, the control information generation part 654 may generate control information in which the operation of the second operator is prioritized as compared to the first operator. For example, when executing the operation performed by the first operator and the operation performed by the second operator at the same time, the control information generation part 654 performs a first weighting on the motion parameter based on the operation performed by the first operator, and performs a second weighting, which is greater than the first weighting, on the motion parameter based on the operation performed by the second operator to generate control information. The first weighting may be 0, and the operation performed by the first operator may not be reflected in the control information. Further, when an operation direction of the first operator and an operation direction of the second operator are different, the control information generation part 654 may generate control information so as to move in the operation direction of the second operator. Accordingly, the remote operation performed by the second operator can be reflected more closely in the motion of the robot 400 than the remote operation performed by the first operator, and the remote operation performed by the first operator can be modified to the remote operation performed by the second operator.

Further, when synthesizing the content of the remote operation performed by the first operator and the content of the remote operation performed by the second operator, the control information generation part 654 may continuously execute a remote operation timing of the first operator and a remote operation timing of the second operator. For example, the control information generation part 654 may generate control information so that a motion corresponding to the remote operation performed by the second operator is executed immediately after a motion corresponding to the remote operation performed by the first operator is executed. Accordingly, it is possible to modify to the remote operation performed by the second operator immediately after the remote operation performed by the first operator.

Based on the motion of the robot 400 executed based on the operation inputted by the novice A (i.e., the first operator), the feedback information generation part 655 generates second feedback information for transmitting the operation content performed by the first operator to the second operator via the second controller 60. Further, based on the motion of the remote operation target executed based on the operation inputted by the skilled person B (i.e., the second operator), the feedback information generation part 655 generates first feedback information for transmitting the operation content performed by the second operator to the first operator via the first controller 20. Accordingly, the motion of the robot or the like executed by the remote operation of one operator can be transmitted to another operator.

For example, the feedback information generation part 655 refers to the feedback parameter information 642 of the storage part 640, and based on the control information generated by the control information generation part 654, generates the first feedback information which feeds back a motion content of the robot 400 (i.e., the remote operation target) to the first controller 20. Further, the feedback information generation part 655 refers to the feedback parameter information 652 of the storage part 640, and based on the control information generated by the control information generation part 654, generates the second feedback information which feeds back a motion content of the robot 400 (i.e., the remote operation target) to the second controller 60. The feedback information generation part 655 refers to the feedback parameter information 642 and acquires feedback parameters corresponding to the control information to generate the feedback information based on the acquired feedback parameters. The feedback parameter information 642 is, for example, information associated with motion parameters of the robot 400 or feedback parameters corresponding to operation amounts.

For example, when the robot 400 is remotely operated by the first operator, to feed back the motion of the robot 400 executed based on the content of the remote operation performed by the first operator to the second operator, the feedback information generation part 655 generates second feedback information for causing the second controller 60 to reproduce the motion of the remotely operated robot 400. On the other hand, when the robot 400 is remotely operated by the second operator, to feed back the motion of the robot 400 executed based on the content of the remote operation performed by the second operator to the first operator, the feedback information generation part 655 generates first feedback information for causing the first controller 20 to reproduce the motion of the remotely operated robot 400.

As described above, when the control information generation part 654 generates control information based on the result of synthesizing the content of the remote operation performed by the first operator and the content of the remote operation performed by the second operator, to feed back the motion of the robot 400 executed based on the synthesis result to the first operator and the second operator, the feedback information generation part 655 may generate the first feedback information for causing the first controller 20 to reproduce the motion of the remotely operated robot 400, and the second feedback information for causing the second controller 60 to reproduce the motion of the remotely operated robot 400.

Further, as described above, when synthesizing the content of the remote operation performed by the first operator and the content of the remote operation performed by the second operator, in the case where the control information generation part 654 generates control information in which the remote operation performed by the second operator is prioritized as compared to the first operator, the feedback information generation part 655 may generate the first feedback information so that the motion of the robot 400 is preferential fed back to the first operator as compared to the second operator. For example, the feedback information generation part 655 generates the first feedback information and the second feedback information in which the content of the feedback to the first operator is emphasized as compared to the content of the feedback to the second operator. Emphasizing the feedback content includes, for example, applying vibration, applying air pressure with a stronger pressure, restraining the movement of the hand, etc.

Further, based on the detection result detected by the sensor 430 or the hand sensor 451 of the robot 400, the feedback information generation part 655 generates third feedback information for transmitting a feeling or a sense obtained on the robot 400 side to the first operator via the first controller 20. Further, based on the detection result detected by the sensor 430 or the hand sensor 451 of the robot 400, the feedback information generation part 655 generates fourth feedback information for transmitting a feeling or a sense obtained on the robot 400 side to the second operator via the second controller 60. Accordingly, it is possible to transmit to the operator a feeling or a sense obtained when the operator actually operates the remote operation target rather than the remote operation using the robot 400.

The robot state image generation part 656 performs, for example, image processing (edge detection, binarization, feature amount extraction, image enhancement, image extraction, clustering processing, etc.) on the image captured by the photographing device 31 of the third environment sensor 500.

Further, based on the information (hereinafter referred to as image processing result information) indicating the result of the image processing described above and the control information generated by the control information generation part 654, the robot state image generation part 656 estimates a position or a movement of the hand of the robot 400, estimates a movement of the operator's hand, and creates a robot state image to be displayed on the first HMD 10 or the second HMD 50 based on the estimated results.

The robot state image may include information related to a process to be performed by the robot remote operation control device 600, error information, and system state information indicating a state of the system.

The comparison image generation part 657 generates an image data of a comparison image showing a comparison result between an operation inputted by the first operator and an operation inputted by the second operator. The image data of the comparison image is an image data to be displayed on a first display part (e.g., a display part of the first HMD 10) for the first operator or a second display part (e.g., a display part of the second HMD 50) for the second operator. The comparison image includes, for example, an image showing the difference between the remote operation performed by the first operator and the remote operation performed by the second operator, or an image which emphasizes the remote operation performed by the second operator more than the remote operation performed by the first operator. Accordingly, the first operator can confirm with the image his/her own erroneous operation modified by the second operator or the difference between his/her own operation and the operation performed by the second operator.

The communication control part 658 controls the communication part 610 to communicate with the first terminal device 40, the second terminal device 80, the robot 400, and the third environment sensor 500 via the network NW.

Example of Comparison Image

Figure 28:
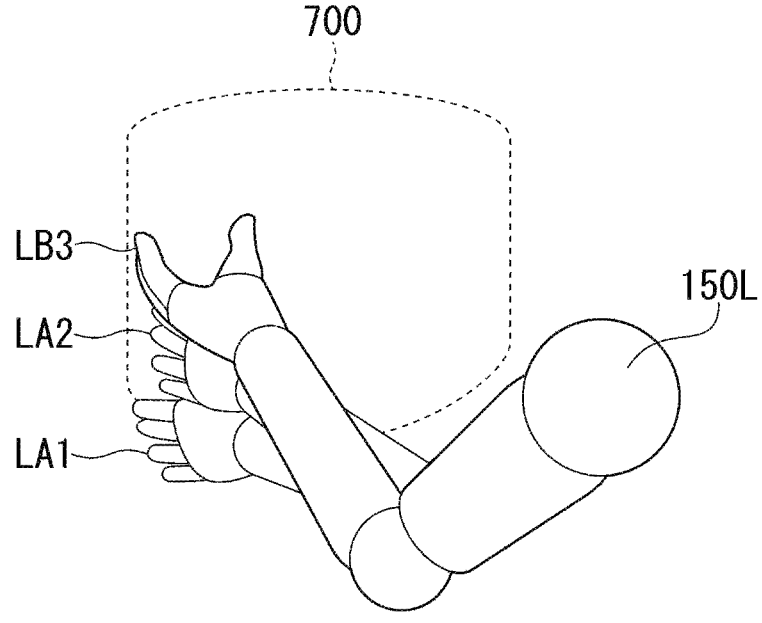
FIG. 28 is a view showing an example of a comparison image.

FIG. 28 is a view showing an example of a comparison image. The shown comparison image is, for example, an example of a comparison image generated according to a novice A and a skilled person B performing a remote operation when deforming an operation object 700. In the shown comparison image, a robot arm 150L of the left hand of the robot 400 is displayed, and images of a robot arm of the right hand of the robot 400 and other parts are omitted.

For example, the novice A remotely operates the robot 400 to make a teacup by using a potter's wheel. The skilled person B remotely operates the robot 400 to support teacup making of the novice A. It is assumed that the operation object 700 is, for example, clay placed on the potter's wheel. The work performed by the novice A and the skilled person B is not limited thereto and includes various works such as lathe processing, plate painting, and glass work.

A robot arm image LA1 is an image showing a status of the robot arm 150L when it is remotely operated by the novice A at a first timing. A robot arm image LA2 is an image showing a status of the robot arm 150L when it is remotely operated by the novice A at a second timing. A robot arm image LB3 is an image showing a status of the robot arm 150L when it is remotely operated by the skilled person B at a third timing. The first timing is an oldest timing, the second timing is a timing following the first timing, and the third timing is a timing following the second timing.

From the shown comparison image, it can be learned that the skilled person B modifies the operation of the novice A of the first timing and the second timing to the position of the third timing. By displaying this comparison image on the first HMD 10, the novice A can easily recognize the difference between his/her remote operation and the remote operation performed by the skilled person B. Further, by displaying this comparison image on the second HMD 50, the skilled person B can verbally convey the points of work and the modified spots while sharing the comparison image with the novice A.

In the figure, although the comparison image shows an example displaying two arm images when the novice A performs remote operation, the disclosure is not limited thereto, and one arm image may be displayed. Further, although the comparison image shows an example displaying one arm image when the skilled person B performs remote operation, the disclosure is not limited thereto, and two or more arm images may be displayed.

<Sequence Diagram (1)>

Figure 29:
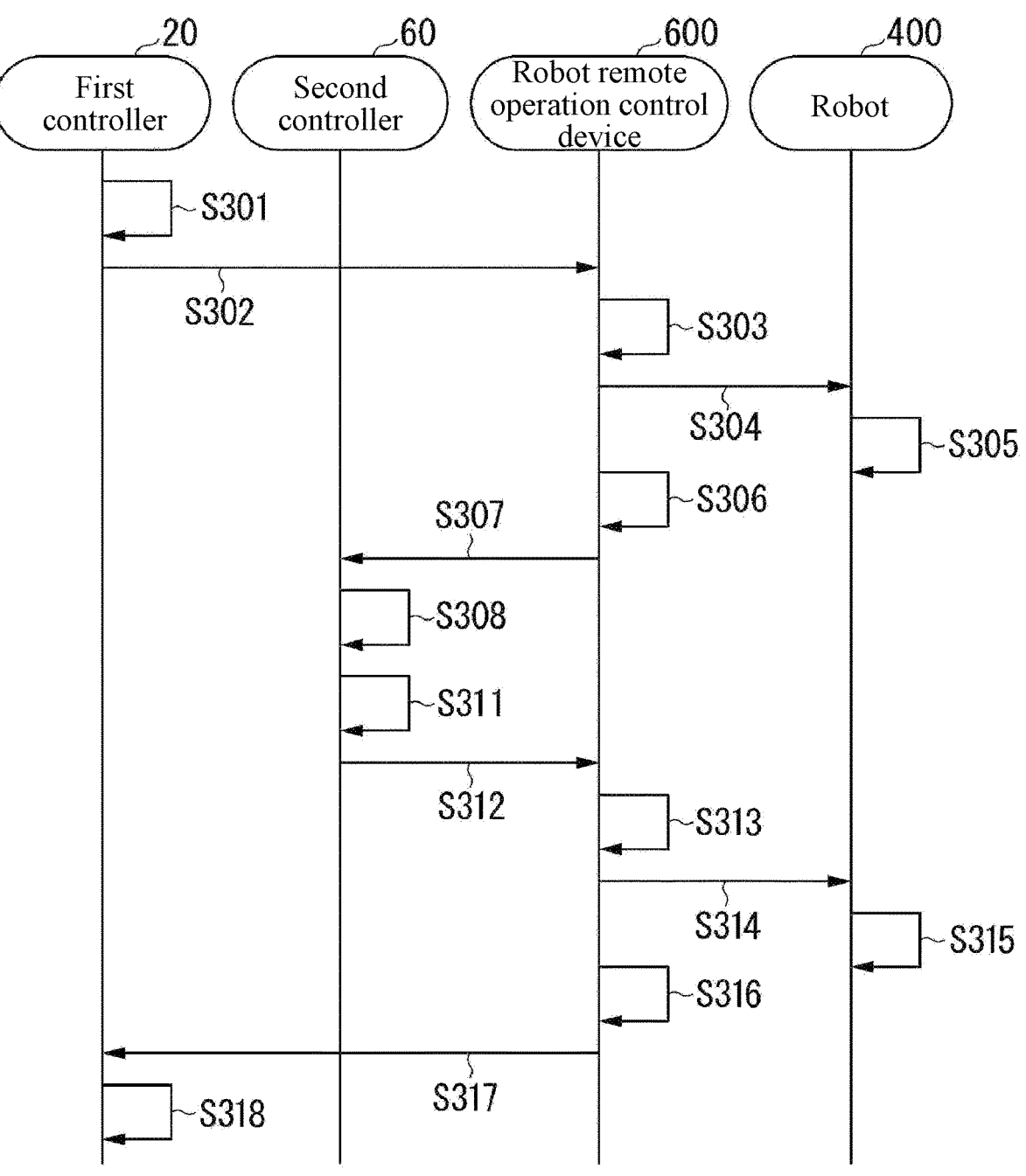
FIG. 29 is a sequence diagram showing an example of a processing in the robot remote operation control system.

FIG. 29 is a sequence diagram showing an example of a processing in the robot remote operation control system 2 of FIG. 24. Herein, an example in which the second operator performs remote operation after the first operator performs remote operation, and the robot 400 is controlled based on operation information will be described.

First, the first controller 20 generates first operation information based on an operation inputted from the first operator (step S301), and transmits the first operation information to the robot remote operation control device 600 via the first terminal device 40 (step S302). The robot remote operation control device 600 generates control information based on the received first operation information (step S303) and transmits the control information to the robot 400 (step S304). The robot 400 moves the robot arm 350 or the like based on the received control information (step S305). On the other hand, the robot remote operation control device 600 generates second feedback information based on the control information generated in step S303 (step S306), and transmits the generated second feedback information to the second controller 60 via the second terminal device 80 (step S307). The second controller 60 reproduces a motion of the robot 400 executed by the remote operation of the first operator in step S301 based on the received feedback information (step S308).

Next, the second controller 60 generates second operation information based on an operation inputted from the second operator (step S311), and transmits the second operation information to the robot remote operation control device 600 via the second terminal device 80 (step S312). The robot remote operation control device 600 generates control information based on the received second operation information (step S313) and transmits the control information to the robot 400 (step S314). The robot 400 moves the robot arm 350 or the like based on the received control information (step S315). On the other hand, the robot remote operation control device 600 generates first feedback information based on the control information generated in step S313 (step S316), and transmits the generated first feedback information to the first controller 20 via the first terminal device 40 (step S317). The first controller 20 reproduces a motion of the robot 400 executed by the remote operation of the second operator in step S311 based on the received feedback information (step S318).

<Flowchart (1)>

Figure 30:
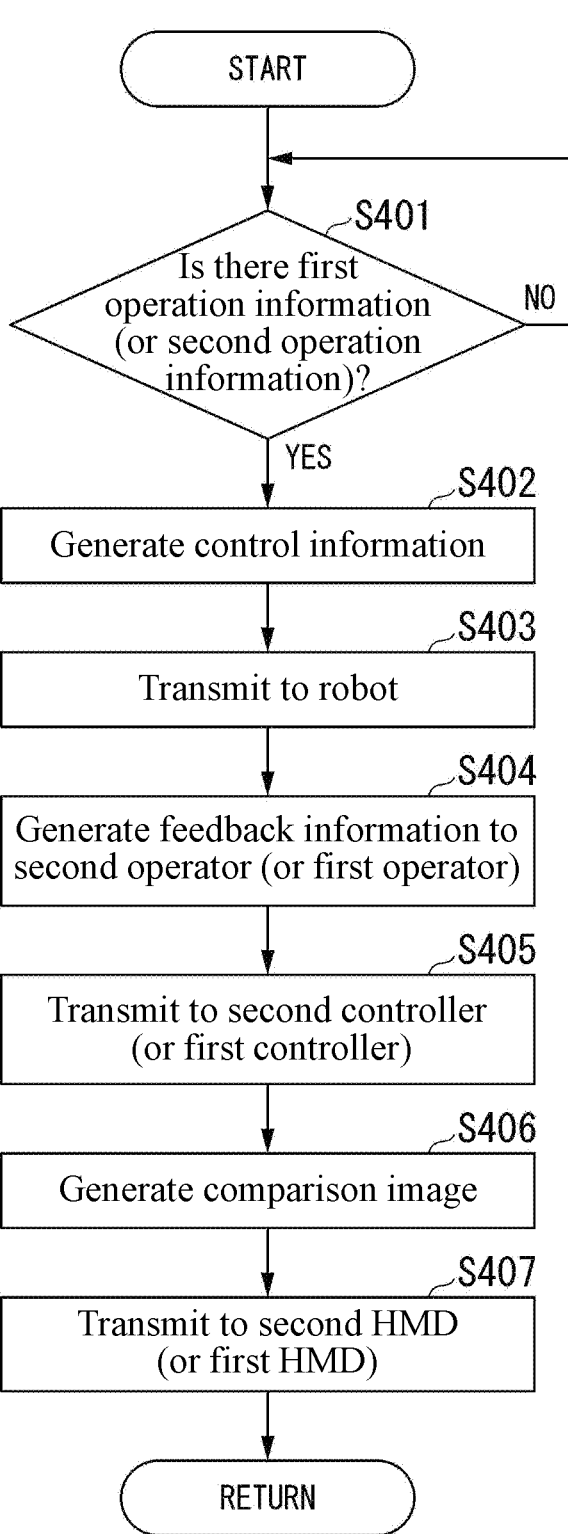
FIG. 30 is a flowchart showing an example of a processing by the robot remote operation control device.

FIG. 30 is a flowchart showing an example of a processing by the robot remote operation control device 600. Herein, an example in which the second operator performs remote operation after the first operator performs remote operation, and the robot 400 is controlled based on operation information will be described. Further, the processes by the intention estimation part 652 and the robot operation determination part 653 and the process by the robot state image generation part 656 will be omitted.

First, the information acquisition part 651 determines whether first operation information (or second operation information) has been acquired (step S401). When the first operation information (or the second operation information) has been acquired, the control information generation part 654 generates control information for causing the robot 400 to move based on the acquired first operation information (or second operation information) (step S402), and transmits the generated control information to the robot 400 (step S403).

Next, the feedback information generation part 655 generates second feedback information when the control information is generated based on the first operation information, and generates first feedback information when the control information is generated based on the second operation information (step S404). Then, the communication control part 658 transmits the second feedback information to the second controller 60, and transmits the first feedback information to the first controller 20 (step S405).

Next, when the control information has been generated based on the first operation information, and before this, the control information has been generated based on the second operation information, the comparison image generation part 657 generates an image data of a first comparison image showing a comparison result between the operation inputted by the first operator and the operation inputted by the second operator (step S406). On the other hand, when the control information has been generated based on the second operation information, and before this, the control information has been generated based on the first operation information, the comparison image generation part 657 generates an image data of a second comparison image showing a comparison result between the operation inputted by the second operator and the operation inputted by the first operator. Then, the communication control part 658 transmits the image data of the first comparison image to the first HMD 10 and transmits the image data of the second comparison image to the second HMD 50 (step S407).

<Sequence Diagram (2)>

Figure 31:
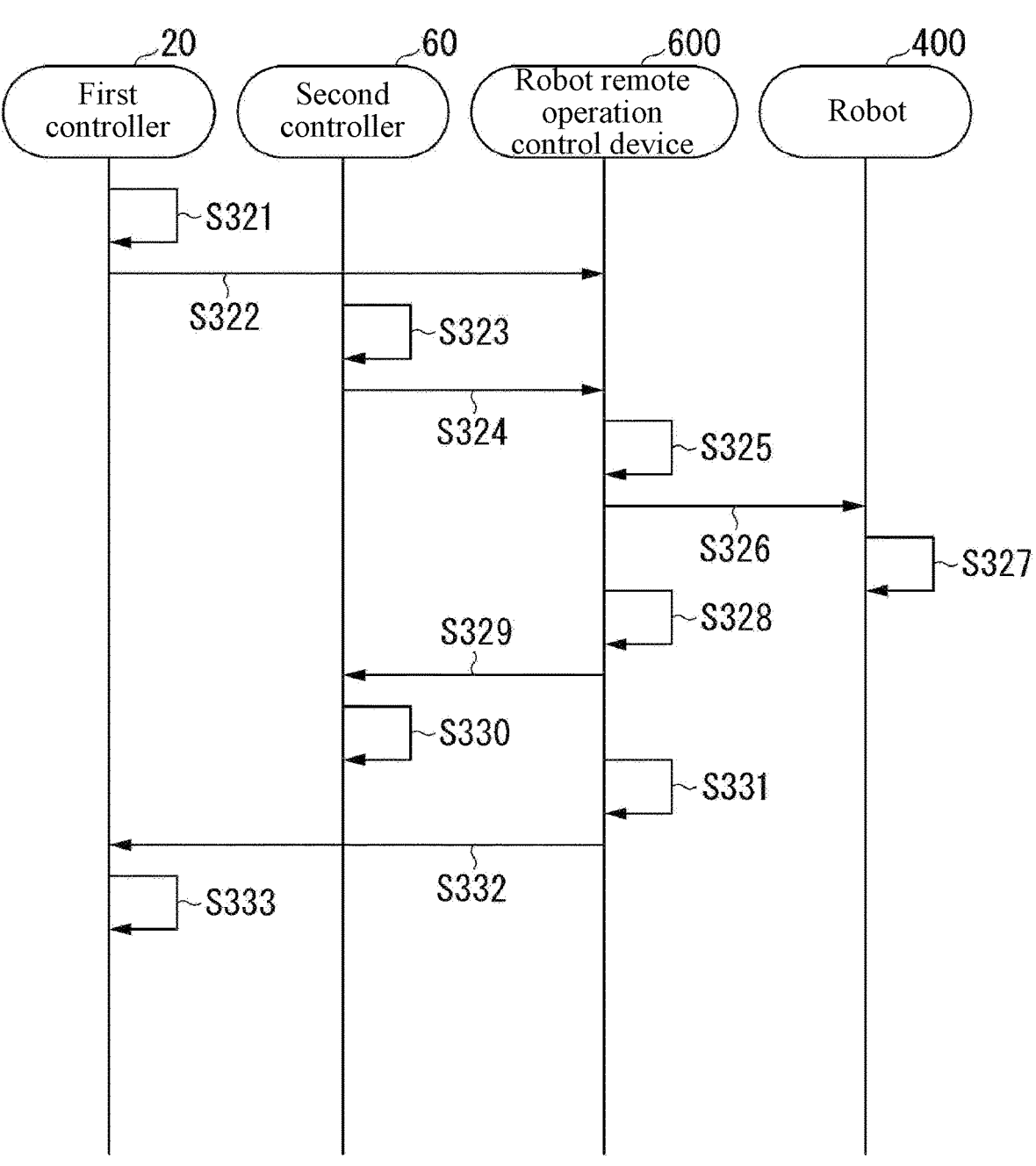
FIG. 31 is a sequence diagram showing another example of a processing in the robot remote operation control system.

FIG. 31 is a sequence diagram showing another example of a processing in the robot remote operation control system 2 of FIG. 24. Herein, an example in which the remote operation of the first operator and the remote operation of the second operator are performed at a same timing, and the robot 400 is controlled based on operation information will be described. The same timing is not limited to an identical time, but includes a case with a time difference of several seconds.

First, the first controller 20 generates first operation information based on an operation inputted from the first operator (step S321), and transmits the first operation information to the robot remote operation control device 600 via the first terminal device 40 (step S322). At the same timing, the second controller 60 generates second operation information based on an operation inputted from the second operator (step S323), and transmits the second operation information to the robot remote operation control device 600 via the second terminal device 80 (step S324).

Next, based on the received first operation information and the received second operation information, the robot remote operation control device 600 generates control information which synthesizes a content of the remote operation performed by the first operator and a content of the remote operation performed by the second operator (step S325), and transmits the control information to the robot 400 (step S326). The robot 400 moves the robot arm 450 or the like based on the received control information (step S327).

Next, the robot remote operation control device 600 generates second feedback information based on the control information generated in step S325 (step S328), and transmits the generated second feedback information to the second controller 60 via the second terminal device 80 (step S329). The second controller 60 reproduces a motion of the robot 400 executed by the remote operation of the first operator in step S321 based on the received feedback information (step S330).

Further, the robot remote operation control device 600 generates first feedback information based on the control information generated in step S325 (step S331), and transmits the generated first feedback information to the first controller 20 via the first terminal device 40 (step S332). The first controller 20 reproduces a motion of the robot 400 executed by the remote operation of the second operator in step S323 based on the received feedback information (step S333).

<Flowchart (2)>

Figure 32:
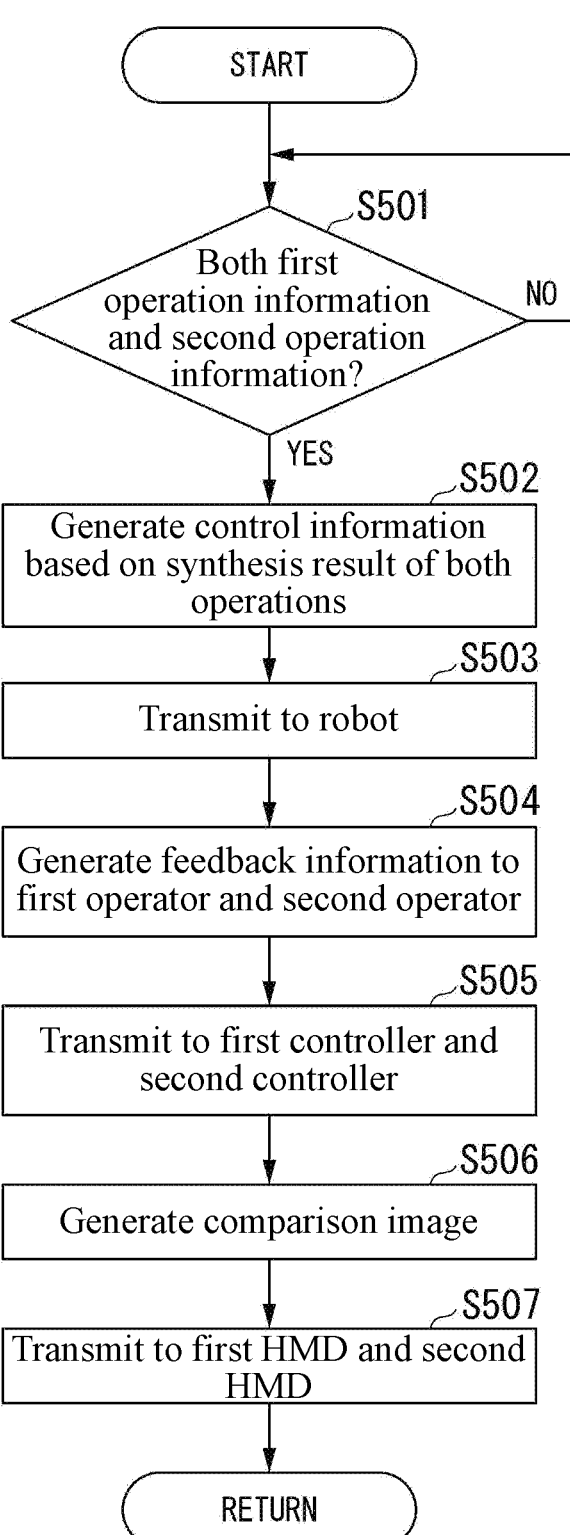
FIG. 32 is a flowchart showing another example of a processing by the robot remote operation control device.

FIG. 32 is a flowchart showing another example of a processing by the robot remote operation control device 600. Herein, an example in which the remote operation of the first operator and the remote operation of the second operator are performed at a same timing, and the robot 400 is controlled based on operation information will be described. Further, the processes by the intention estimation part 652 and the robot operation determination part 653 and the process by the robot state image generation part 656 will be omitted.

First, the information acquisition part 651 determines whether first operation information and second operation information have been acquired (step S501). When the first operation information and the second operation information have been acquired, based on the acquired first operation information and the acquired second operation information, the control information generation part 654 generates control information synthesizing a content of the remote operation performed by the first operator and a content of the remote operation performed by the second operator (step S502), and transmits the generated control information to the robot 400 (step S503).

Next, the feedback information generation part 655 generates first feedback information and second feedback information based on the control information generated in step S502 (step S504). Then, the communication control part 658 transmits the first feedback information to the first controller 20 and transmits the second feedback information to the second controller 60 (step S505).

Next, the comparison image generation part 657 generates an image data of a comparison image based on the first operation information and the second operation information acquired in step S501 (step S506). Then, the communication control part 658 transmits the image data of the generated comparison image to the first HMD 10 and the second HMD 50 (step S507).

According to the above embodiment, a remote operation control system in which an operator remotely operates a remote operation target that is an object of reality or a virtual object of a virtual world includes an information acquisition part 651, a control information generation part 654, and a feedback information generation part 655. The information acquisition part 651 acquires first operation information indicating an operation inputted by a first operator via a first controller 20 which receives an operation on the remote operation target, and second operation information indicating an operation inputted by a second operator via a second controller 60 which receives an operation on the remote operation target. The control information generation part 654 generates control information for causing the remote operation target to move based on the first operation information and the second operation information acquired by the information acquisition part 651. Based on the control information, the feedback information generation part 655 generates first feedback information which feeds back a motion content of the remote operation target to the first controller 20, and generates second feedback information which feeds back a motion content of the remote operation target to the second controller 60. Accordingly, it is possible to feel an operation performed by another operator on the same remote operation target.

Modification Example

A part or all of the processes of the management server 100, the robot device 200, and the operation terminal 300 in the embodiments may be realized by AI (artificial intelligence) technology. Further, among the information stored in the functional parts or the storage parts included in the management server 100, the robot device 200, and the operation terminal 300, a part or all functional parts or information may be included in other devices.

Further, in the above embodiments, information representing the operator, information related to the action, etc. are arranged in a location arranged in space and outputted; however, for example, when the user is arranged in a seat in a virtual space in a WEB conference mode or the like, the arrangement may be changed so that only a designated person is in front of the user in his/her view.

Further, the management server 100 may transmit history information, intention estimation information, etc. related to the operation to the robot maker terminal 800. Accordingly, they may be used at the robot maker terminal 800 or for developing products, updating programs, etc. In this case, for a company or an operator that has performed eco-operation (e.g., low power operation, low load operation, or low communication volume operation) of the robot device 200, or a company which provides a robot control method suitable for telework characteristics, a discount or a fee reduction service for using the system may be provided. Accordingly, it is possible to promote the provision of information from the user, which can be useful for improving the service.

Further, in the above embodiments, although it has been mainly described that a plurality of operators operate one robot device 200, one operator may operate a plurality of robot devices 200. In this case, the sensor information or the like detected by each of the plurality of robot devices 200 are displayed on the image display part 322 of the HMD 320. Further, the management server 100 may transmit history information, intention estimation information, etc. related to the operation to the robot maker terminal 800. Accordingly, they may be used at the robot maker terminal 800 or for developing products, updating programs, etc. In this case, for a company or an operator that has performed eco-operation (e.g., low power operation, low load operation, or low communication volume operation) of the robot device 200, or a company which provides a robot control method suitable for telework characteristics, a discount or a fee reduction service for using the system may be provided. Accordingly, it is possible to promote the provision of information from the user, which can be useful for improving the service.

Further, in the above embodiments, it has been shown as an example that when one robot device 200 is operated by a plurality of operators, each operation intention or work status is displayed; however, for example, information related to the intention estimation result, the work status, and the operator described above may be provided among a plurality of robot devices 200 present within a predetermined distance, or among robot devices that are collaborating with each other. Accordingly, by using the intention estimation function between robots, it becomes more likely to share consciousness than between humans. Further, since it is possible to acquire the status of the robot devices 200 in the surroundings, group work or the like can be smoothly performed.

In the embodiments described above, for example, a management server includes a communication part 110, an acquisition part 130, an intention estimation part, and a motion control part. The communication part 110 communicates with one or more robot devices 200 and one or more operation terminals 300 which remotely operate at least one of the one or more robot devices 200 via a network NW. The acquisition part 130 acquires an operation content inputted by the operation terminal 300. The intention estimation part estimates an intention of an operator of the operation terminal 300 based on the operation content acquired by the acquisition part. The motion control part controls a motion of the robot device 200 based on an intention result estimated by the intention estimation part. Accordingly, it is possible to more appropriately cause the robot to move.

In the embodiments described above, a management server 100 includes a communication part 110, an acquisition part 130, a management part 140, and an output control part 156. The communication part 110 communicates with one or more operation terminals 300 via a network NW. The acquisition part 130 acquires information related to an action of an operator of the operation terminal 300. The management part 140 manages an arrangement location of the operator in space. The output control part 156 arranges information based on information representing the operator and information related to the action in the arrangement location in space of the operator managed by the management part 140, and outputs the arranged information to the operation terminal 300. Accordingly, it is possible to provide information that makes one feel as if he/she is in the work space even during remote operation.

Further, according to the above embodiments, when performing telework by remotely operating a robot, it is possible to use various devices for more general purposes and operate them as a team. Further, in the past, even if remote operation was performed, only limited work could be performed with a limited dedicated robot; however, according to this embodiment, anyone may easily perform telework with a highly versatile robot.

Specifically, according to the above embodiments, for example, by coordinating the position (arrangement location) of the operator in the virtual space (workplace) and arranging information indicating a working state of the operator in the virtual space based on this position, it is possible to output a state (an appearance of people working in the same space) seen from one's own position in the virtual space to an image (image of the visual device) seen by the operator. Further, according to the above embodiments, when performing telework by remotely operating the robot device, it is possible to use various devices for more general purposes and operate them as a team. Further, in the past, even if remote operation was performed, only limited work could be performed with a limited dedicated robot; however, according to this embodiment, anyone may easily perform telework with a highly versatile robot.

Further, according to the embodiments, the information of robots and the information of sensors (information which may include confidential information of the company) can be managed separately, and a server capable of dealing with confidentiality can be provided. Further, operators performing remote operation may access the same server and can share the control right or sensor information of the same robot or different robots. For example, when operating the same robot device, a plurality of operators may operate different arms, so that a senior and a junior can operate the same arm of the same robot at the same time, and upon sharing sensor information such as the tactile sense, addition and subtraction of forces may be performed. Further, in the case of operating different robots, the intention estimation function is shared, and by disclosing the intention of another person, mutual understanding of intention becomes possible. Further, by using the intention estimation function, it is possible to issue a warning against collision when going in a same direction or when trying to take a same object. Further, according to the embodiments, one operator may operate two robots. In this case, for example, when a large desk is to be carried by the two robots, one robot is brought to an end of the desk in advance and performs synchronous processing with another robot. Further, the another robot is brought to another end, and when the desk is to be lifted, the another robot lifts the desk together by synchronous processing. Further, in the embodiments, it is possible to perform work more accurately than humans calling to each other to move. Further, in the embodiments, when one operator causes many robots to perform the same work, the supported teleoperation function can absorb individual differences of robots and individual differences of work target objects.

The embodiments described above may be expressed as follows.

A server, in which a computer of a server performing communication between a moving body and a portable terminal of a user of the moving body includes a storage device which stores a program; and a hardware processor, and the hardware processor executes the program stored in the storage device to communicate with one or more robot devices and one or more operation terminals which remotely operate at least one of the one or more robot devices via a network, acquire an operation content inputted by the operation terminal, estimate an intention of an operator of the operation terminal based on the acquired operation content, and control a motion of the robot device based on an estimated intention result.

The embodiments described above may be expressed as follows.

A management server, in which a computer of a server performing communication between a moving body and a portable terminal of a user of the moving body includes a storage device which stores a program; and a hardware processor, and the hardware processor executes the program stored in the storage device to communicate with one or more operation terminals via a network, acquire information related to an action of an operator of the operation terminal, manage an arrangement location of the operator in space, and arrange information based on information representing the operator and information related to the action to the managed arrangement location of the operator in space, and output the arranged information to the operation terminal.

The embodiments described above may be expressed as follows.

A remote operation control system includes a storage device which stores a program; and a hardware processor, and with the hardware processor executing the program stored in the storage device, an operator remotely operates a remote operation target that is an object of reality or a virtual object of a virtual world, the remote operation control system being configured to acquire first operation information indicating an operation inputted by a first operator via a first controller which receives an operation on the remote operation target, and second operation information indicating an operation inputted by a second operator via a second controller which receives an operation on the remote operation target, generate control information for causing the remote operation target to move based on the acquired first operation information and the acquired second operation information, and generate, based on the control information, first feedback information which feeds back a motion content of the remote operation target to the first controller, and generate second feedback information which feeds back a motion content of the remote operation target to the second controller.

Although the disclosure has been described above based on the embodiments, the disclosure is not limited to these embodiments, and various modifications and replacements may be added without departing from the gist of the disclosure.

What is claimed is:

1. A management server comprising:

a communication transceiver which communicates with one or more robot devices and one or more operation terminals that remotely operate at least one of the one or more robot devices via a network; and a processor configured to:

acquire an operation content inputted by the operation terminal and robot control information related to a motion of the robot device and sensor information detected by a sensor provided in the robot device;

estimate an intention of an operator of the operation terminal based on the operation content, and update intention estimation information, wherein the intention includes an intention that the operator makes the one or more robot devices to perform actions and predictions of the actions;

generate motion control information for causing the target robot device among the one or more robot devices to move based on an intention result and the updated intention estimation information, so as to control the motion of the target robot device; and set different access rights to a first storage part and a second storage part wherein the first storage part stores the robot control information and the intention estimation and the second storage part stores user-specific sensor information so as to be capable of acquiring any of the robot control information and the user-specific sensor information when the set access right is confirmed, wherein the robot control information is control information for moving the robot device.

2. The management server according to claim 1, wherein the processor is further configured to make a strength of the access right of the user-specific sensor information greater than a strength of the access right of the robot control information.

3. The management server according to claim 1, wherein when the processor is controlling a motion of one robot device based on operation contents acquired from a plurality of operation terminals, the processor is configured to generate motion control information of the robot device based on a priority of the operator who operates the operation terminal.

4. The management server according to claim 3, wherein when a same or similar operation contents are acquired from the plurality of operation terminals by the processor, the processor is further configured to control a motion of the robot device by prioritizing an operation content from an operator having a high priority.

5. The management server according to claim 3, wherein the processor is further configured to estimate an intention of each of the operators of a plurality of operation terminals operating the one robot device, and output an intention estimation result of each of the operators to each of the plurality of operation terminals.

6. A remote operation system comprising:

the management server according to claim 1;

the one or more robot devices; and the one or more operation terminals.

7. The management server of claim 1, the processor is further configured to:

acquire another operation content inputted by a second operation terminal and robot control information related to a second motion of the robot device and sensor information detected by the sensor provided in the robot device, estimate a second intention of the second operator of the second operation terminal based on the second operation content and update a second intention estimation information, wherein the second intention includes an intention that the second operator makes the target robot of the one or more robot devices to perform a second action, in response to the first intention not being in conflict with the second intention, generate a second motion control information for causing a second component of the target robot device to move based on the second intention estimated from the second operator and the updated intention estimation information so as to control the motion of the second component of the target robot device, and in response to the first intention being in conflict with the second intention, causing the second component of the target robot device to move and not the first component of the target robot device as the second operator has a higher priority in the different access rights than the first operator.

8. A remote operation method, wherein a computer communicates with one or more robot devices and one or more operation terminals which remotely operate at least one of the one or more robot devices via a network, acquires an operation content inputted by the operation terminal and robot control information related to a motion of the robot device and sensor information detected by a sensor provided in the robot device, estimates an intention of an operator of the operation terminal based on the acquired operation content, and updates intention estimation information, wherein the intention includes an intention that the operator makes the robot devices to perform actions and predictions of the actions, generates motion control information for causing a target robot device among the robot devices to move based on an estimated intention result and the updated intention estimation information, so as to control a motion of the target robot device, sets different access rights to a first storage part and a second storage part wherein the first storage part stores the robot control information and the intention estimation and the second storage part stores user-specific sensor information so as to be capable of acquiring any of the robot control information and the user-specific sensor information when the set access right is confirmed, wherein the robot control information is control information for moving the robot device.

9. A non-transitory computer readable storage medium, storing a program causing a computer to communicate with one or more robot devices and one or more operation terminals which remotely operate at least one of the one or more robot devices via a network, acquire an operation content inputted by the operation terminal and robot control information related to a motion of the robot device and sensor information detected by a sensor provided in the robot device, estimate an intention of an operator of the operation terminal based on the acquired operation content, and updates intention estimation information, wherein the intention includes an intention that the operator makes the robot devices to perform actions and predictions of the actions, generates motion control information for causing a target robot device among the robot devices to move based on an estimated intention result and the updated intention estimation information, so as to control a motion of the target robot device, and sets different access rights to a first storage part and a second storage part wherein the first storage part stores the robot control information and the intention estimation, and the second storage part stores user-specific sensor information so as to be capable of acquiring any of the robot control information and the user-specific sensor information when the set access right is confirmed, wherein the robot control information is control information for moving the robot device.

* * * * *